United States Patent
Cudahy et al.

(10) Patent No.: US 6,567,822 B1
(45) Date of Patent: May 20, 2003

(54) GENERATING A DATA REQUEST GRAPHICAL USER INTERFACE FOR USE IN AN ELECTRONIC SUPPLY CHAIN VALUE ASSESSMENT

(75) Inventors: Gregory C. Cudahy, Roswell, GA (US); Jeffrey Miller, Alpharetta, GA (US); Douglas W. Allvine, Atlanta, GA (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/531,830

(22) Filed: Mar. 21, 2000

(51) Int. Cl.[7] ............................................... G06F 17/30
(52) U.S. Cl. ................... 707/104.1; 707/102
(58) Field of Search ............................... 707/104.1, 102

(56) References Cited

U.S. PATENT DOCUMENTS

| | | | | |
|---|---|---|---|---|
| 5,913,061 A | * | 6/1999 | Gupta et al. ................ 709/310 |
| 5,946,662 A | * | 8/1999 | Ettl et al. ...................... 705/14 |
| 5,950,173 A | * | 9/1999 | Perkowski .................... 705/26 |
| 5,953,707 A | * | 9/1999 | Huang et al. .................. 705/10 |
| 6,038,668 A | * | 3/2000 | Chipman et al. ............ 713/201 |
| 6,085,493 A | * | 7/2000 | DeBusk et al. ............... 53/445 |
| 6,148,291 A | * | 11/2000 | Radicon ....................... 705/28 |
| 6,151,582 A | * | 11/2000 | Huang et al. .................. 705/10 |
| 6,167,378 A | * | 12/2000 | Webber, Jr. ..................... 705/8 |
| 6,192,370 B1 | * | 2/2001 | Primsch ................... 707/103 R |
| 6,236,955 B1 | * | 5/2001 | Summers ....................... 703/6 |
| 6,256,676 B1 | * | 7/2001 | Taylor et al. ............... 709/246 |
| 6,275,812 B1 | * | 8/2001 | Haq et al. ..................... 705/11 |
| 6,321,212 B1 | * | 11/2001 | Lange ........................... 705/1 |
| 6,338,097 B1 | * | 1/2002 | Krenzke et al. .............. 705/32 |

OTHER PUBLICATIONS

"Andersen Colsulting Launches Web–Based Tool for Global Supply Chain 'Tune–ups'." Business Wire. Jan. 27, 1999.
McMurchie, Laura Lyne. "Andersen Calls for Supply Chain Synchronization." Computing Canada. Feb. 26, 1999.

* cited by examiner

Primary Examiner—Wayne Amsbury
(74) Attorney, Agent, or Firm—Oppenheimer Wolff & Donnelly LLP

(57) ABSTRACT

A system, method and article of manufacture are provided for generating a data request graphical user interface during project assessment. First, a request form including a plurality of fields relating to an assessment is displayed utilizing a network. Data is then received in the fields utilizing the network in response to displaying the request form. Then, the data is stored in a database. The stored data is then used in an assessment of a project.

18 Claims, 50 Drawing Sheets

GENERATING A DATA REQUEST GRAPHICAL USER INTERFACE FOR USE IN AN ELECTRONIC SUPPLY CHAIN VALUE ASSESSMENT

FIELD OF THE INVENTION

The present invention relates to computer databases and more particularly to network-based supply chain valuations.

BACKGROUND OF THE INVENTION

In today's global economy, a fully integrated and collaborative supply chain is critical. In a market where time is critical, assessment and a subsequent action plan must be implemented in minimal time. Such assessment and action plans are necessary for industry-specific situations. To date, there is no automated assessment process for supply chain value systems.

In general, supply chains can be placed into one of two categories: tightly coupled or loosely coupled. A tightly coupled supply chain is one in which there is little substitution of vendors or suppliers of materials and parts within the supply chain. These types of supply chains are characterized by complex bills of materials and by products that have a higher sophistication with requirements that are more detailed and more deeply involved. Tightly coupled supply chains are generally lean in that they are characterized by a low inventory environment. An example of a tightly coupled supply chain is the automotive industry. On the other hand, a loosely coupled supply chain is one in which there is relatively heavy substitution between vendors and suppliers of products and parts. An example of a loosely coupled supply chain is a consumer packaged goods supply chain such as one driven by customer demand at a large retail store.

Conventional planning processes implemented by enterprises in either type of supply chain are not characterized by close cooperation. Generally, the supply chains are composed of separate enterprises with each running a separate transactional execution system. The degree of planning across the enterprises to plan for the whole supply chain is relatively nonexistent. Consequently, it becomes difficult to effectively coordinate and create business relationships that efficiently and effectively fills customers needs. It is desirable to plan for the entire supply chain, as closely to real time as possible, and to propagate information forward and backward between enterprises.

There is thus a need for a diagnostic application and structured knowledge base that may be utilized during a supply chain value assessment. Such application and structured knowledge base preferably facilitates a broad understanding of a supply chain, and provides a consistent approach to identify supply chain opportunities.

SUMMARY OF THE INVENTION

A system, method and article of manufacture are provided for generating a data request graphical user interface during project assessment. First, a request form including a plurality of fields relating to an assessment is displayed utilizing a network. Data is then received in the fields utilizing the network in response to displaying the request form. Then, the data is stored in a database. The stored data is then used in an assessment of a project.

In one embodiment of the present invention, the assessment may be a supply chain value assessment. The fields each may relate to a key performance indicator. The data entered into the fields may also be used to calculate the key performance indicator. In another embodiment, the request form may be capable of being temporarily stored with the stored data for allowing a user to enter remaining data at a later date. An identification of the user may also be verified prior to the storage of the data in the database.

BRIEF DESCRIPTION OF THE DRAWINGS

The invention will be better understood when consideration is given to the following detailed description thereof. Such description makes reference to the annexed drawings wherein:

FIG. 7F-1 illustrates an interface for entering questions in accordance with one embodiment of the present invention;

DETAILED DESCRIPTION OF THE PREFERRED EMBODIMENTS

Figure 1:
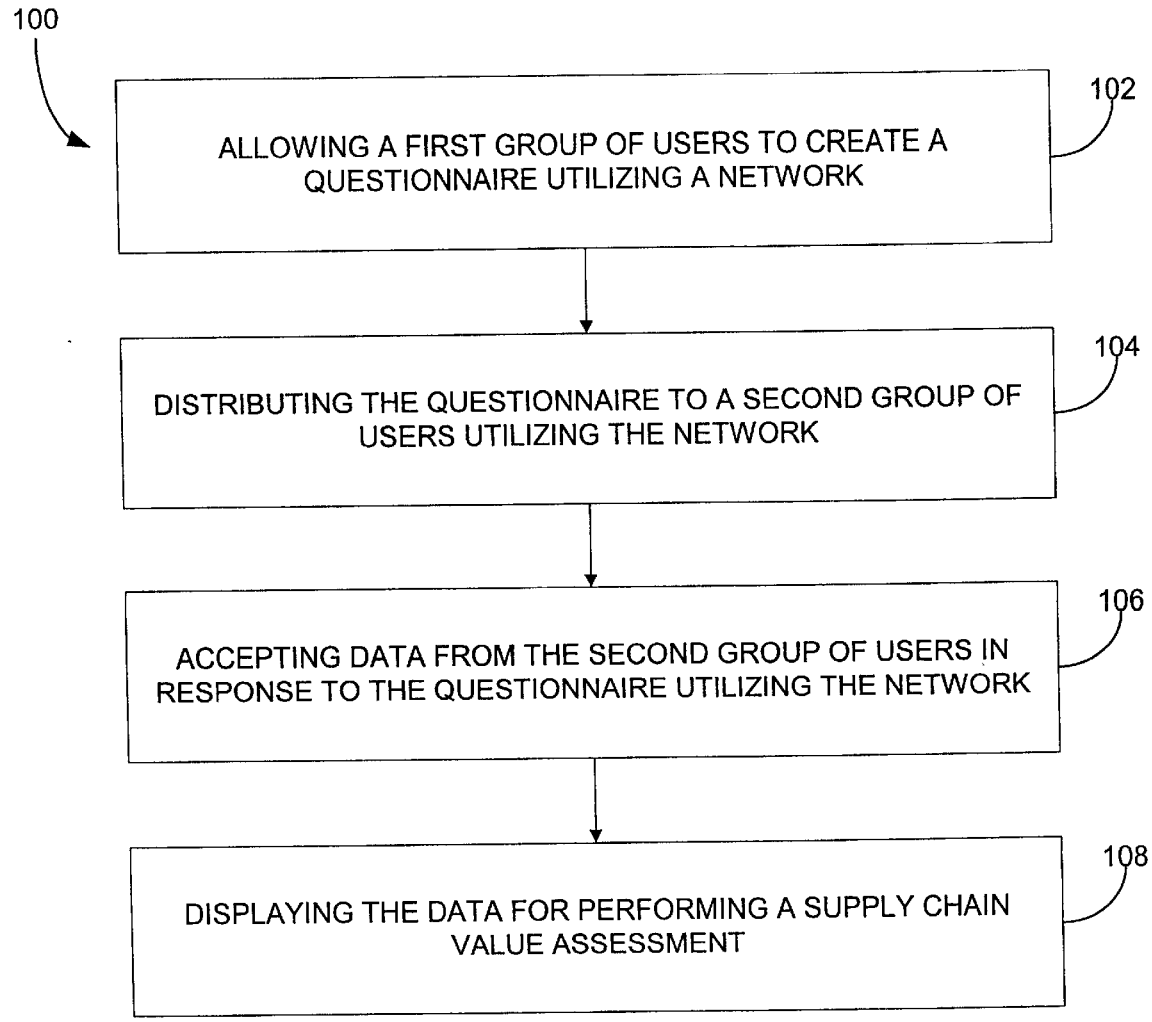
FIG. 1 is a flowchart illustrating a process for affording a network-based supply chain value assessment in accordance with an embodiment of the present invention.

FIG. 1 is a flowchart illustrating a process 100 for affording a network-based supply chain value assessment in accordance with an embodiment of the present invention. In operation 102, a first group of users is allowed to create a questionnaire utilizing a network. The questionnaire is then distributed to a second group of users utilizing the network in operation 104. Next, in operation 106, data from the second group of users in response to the questionnaire utilizing the network is accepted. The data is then displayed for performing a supply chain value assessment in operation 108.

In one embodiment of the present invention, the assessment may be a supply chain value assessment. The data may also be displayed in the form of a chart. In another embodiment, the network may include a wide area network. The network may also include the Internet.

The present invention is specifically tailored for affording a network-based supply chain framework. Provided is an on-line supply chain diagnostic application and a structured knowledge base for supply chain assessments. The present system facilitates a broad understanding of a client's supply chain, leverages one's experience and knowledge, and provides a proven and consistent approach to identify supply chain opportunities. By employing the Internet, the present invention streamlines the flow of information and enhances collaboration with clients, and allows worldwide access to a central knowledge repository and benchmark database.

Figure 2:
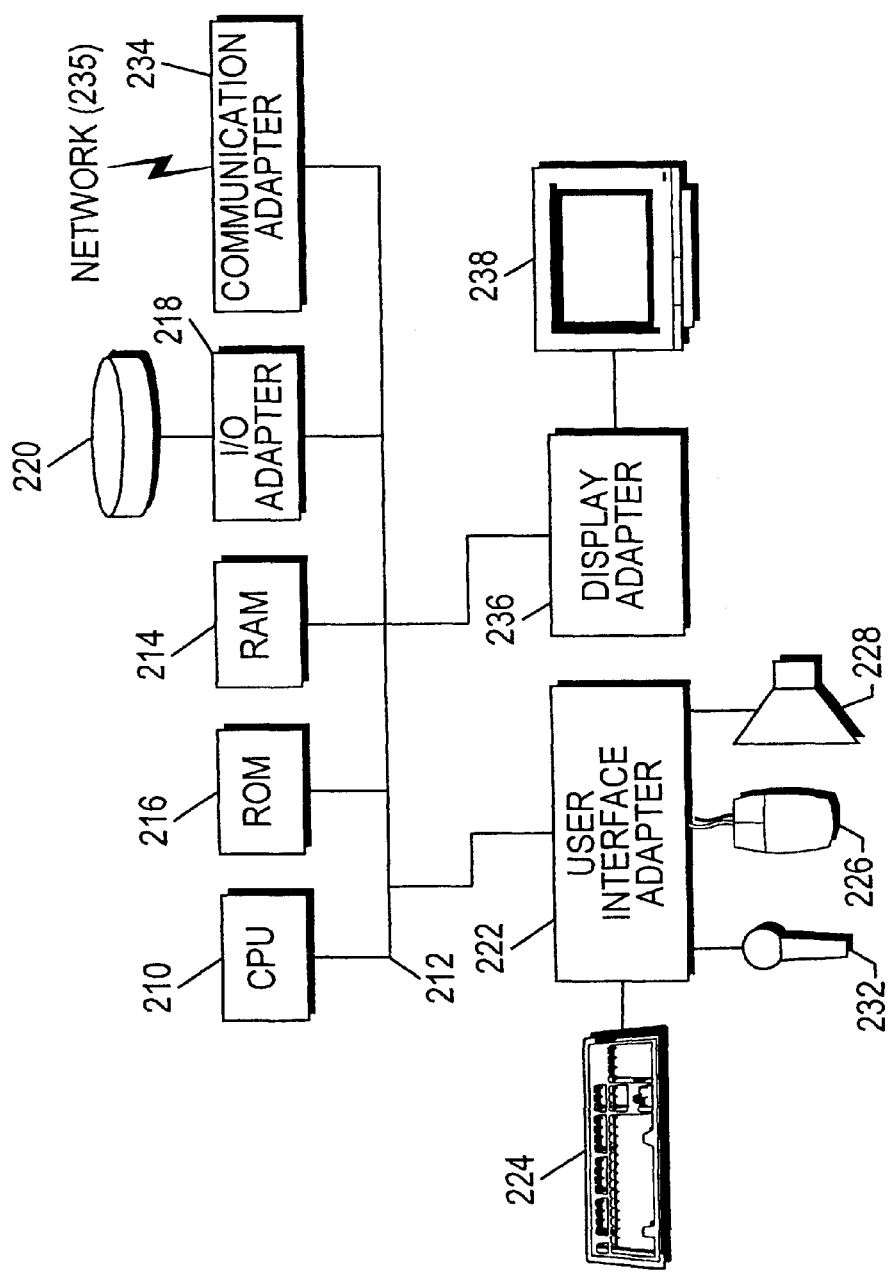
FIG. 2 is a schematic diagram of a hardware implementation of one embodiment of the present invention.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 2, which illustrates a typical hardware configuration of a workstation in accordance with a preferred embodiment having a central processing unit 210, such as a microprocessor, and a number of other units interconnected via a system bus 212. The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network (e.g., a data processing network) and a display adapter 236 for connecting the bus 212 to a display device 238. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other.

Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that one can call when he wants those individual behaviors in a program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language—2.0" (Nov. 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the abovementioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Figure 3:
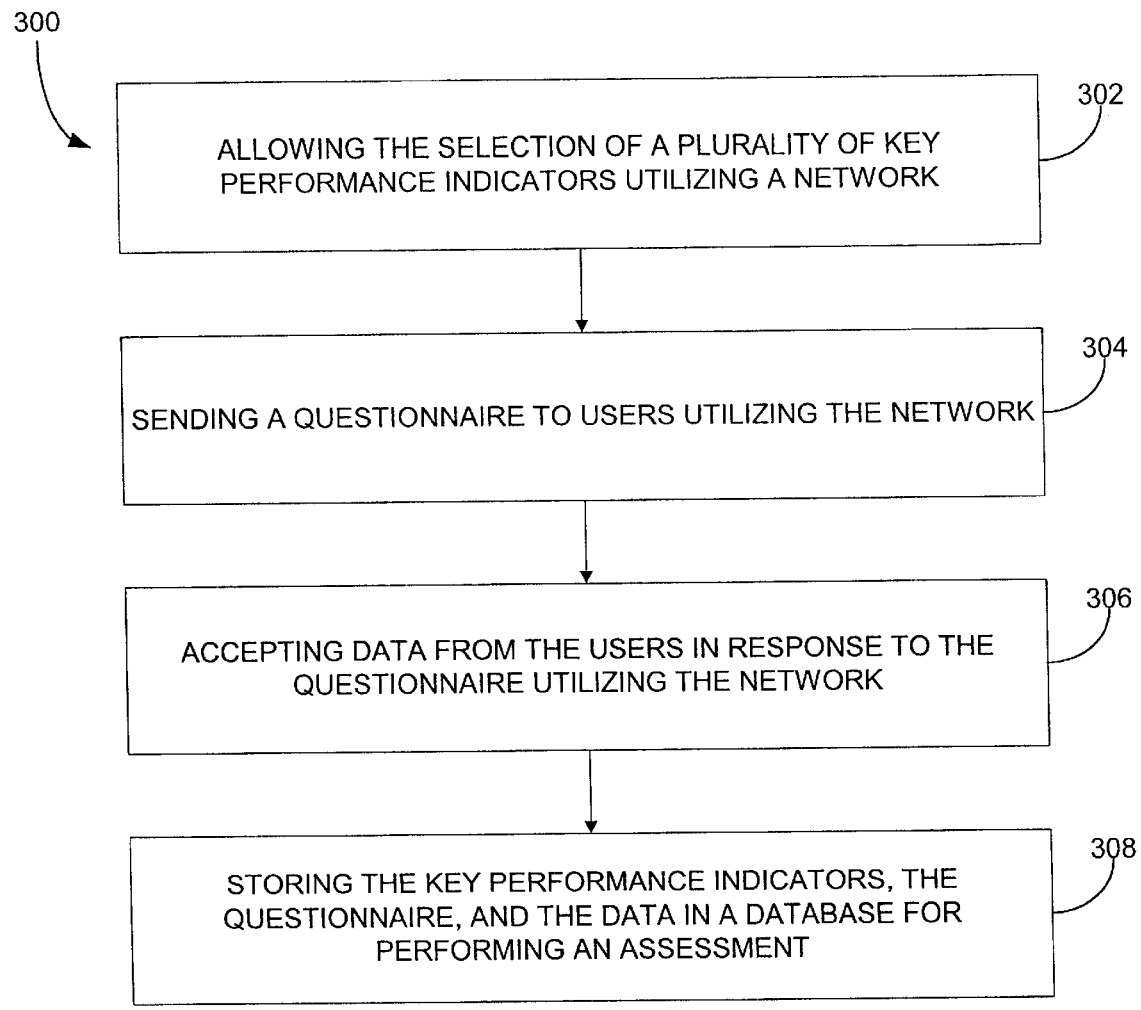
FIG. 3 is a flowchart illustrating a process for generating a project in an electronic supply chain value assessment in accordance with an embodiment of the present invention.

FIG. 3 is a flowchart illustrating a process 300 for generating a project in an electronic supply chain value assessment in accordance with an embodiment of the present invention. First, the selection of a plurality of key performance indicators is allowed utilizing a network in operation 302. Then, in operation 304, a questionnaire is sent to users utilizing the network. Data from the users is accepted in response to the questionnaire utilizing the network in operation 306. Finally, the key performance indicators, the questionnaire, and the data are stored in a database for performing an assessment in operation 308.

In one embodiment of the present invention, the assessment may also be a supply chain value assessment. In an aspect of the present invention, a plurality of projects may be assigned with an identifier so that operations 302–308 may be performed for each project. Another embodiment may be that the network is a wide area network. As an option, the wide area network may include the Internet. Additionally, the data may include government codes. Still yet, the selection of personnel may be performed using a personnel list, wherein only the selected personnel are allowed access to the database.

Figure 3A:
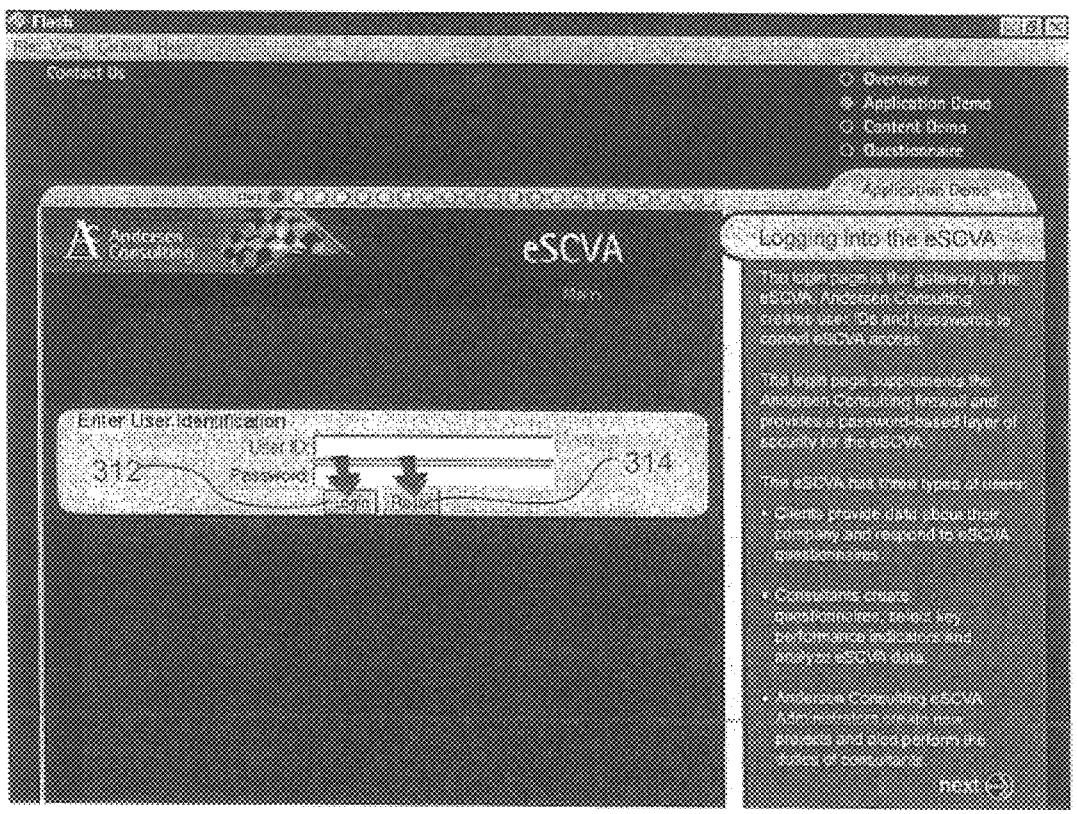
FIG. 3A illustrates an interface for logging into the database of the present invention for creating a new project in accordance with an embodiment of the present invention.

FIG. 3A illustrates an interface 310 for logging into the database of the present invention for creating a new project in accordance with an embodiment of the present invention. The login page 310 is the gateway to the present invention. The present invention allows the creation of user IDs and passwords to control access to the present invention. The login page supplements the firewall and provides a password-based layer of security for the present invention.

The present invention has three types of users:

Clients provide data about their company and respond to questionnaires.

Consultants that create questionnaires, select key performance indicators and analyze data associated with the present invention.

Administrators that create new projects and also perform the duties of consultants.

As shown in FIG. 3A, a login button 312 validates the user ID and password. A Reset button 314 clears the User ID and Password fields. Further, a help button provides page specific help is available by clicking on the Find Help option.

Figure 3B:
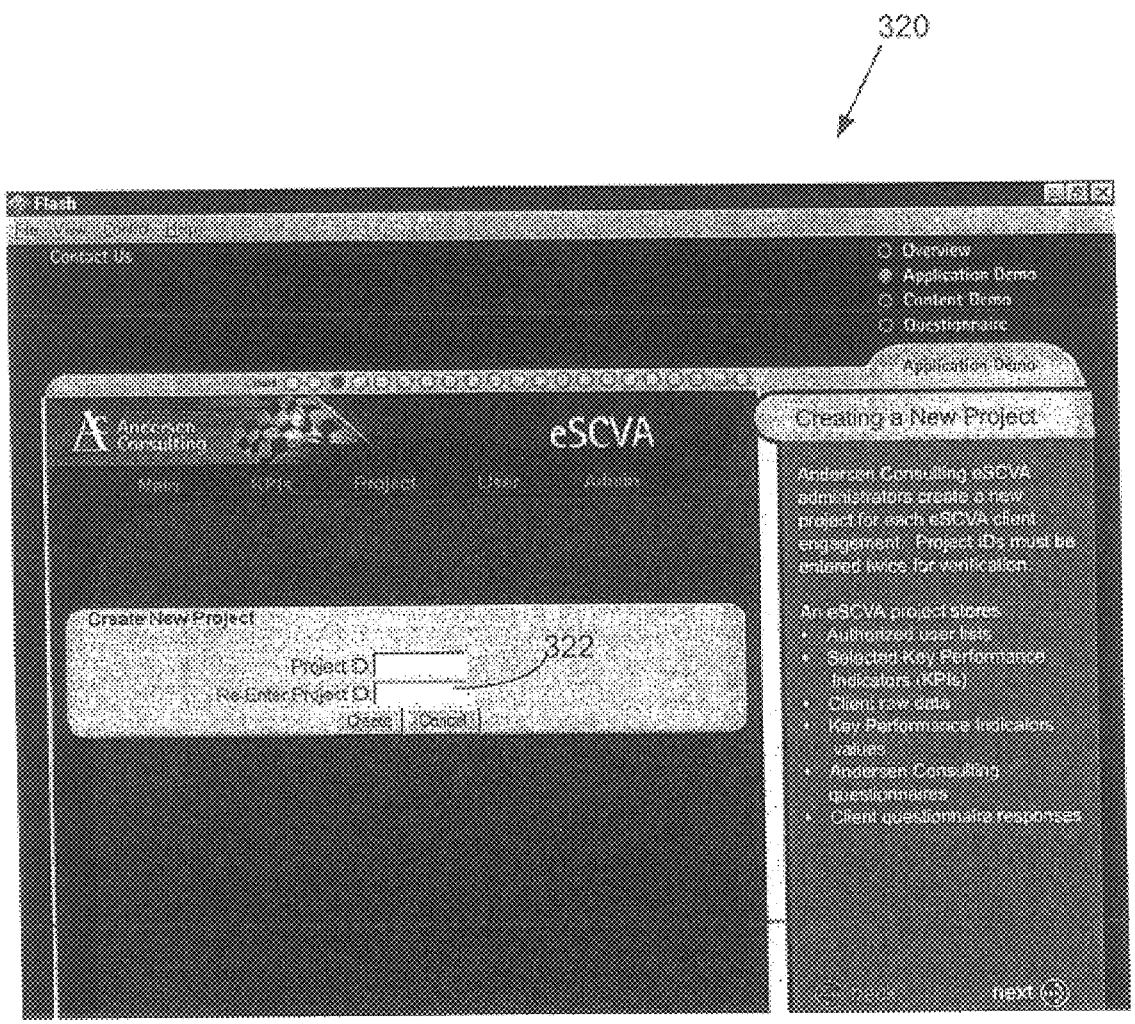
FIG. 3B illustrates an interface for creating a new project in accordance with an embodiment of the present invention.
Figure 3C:
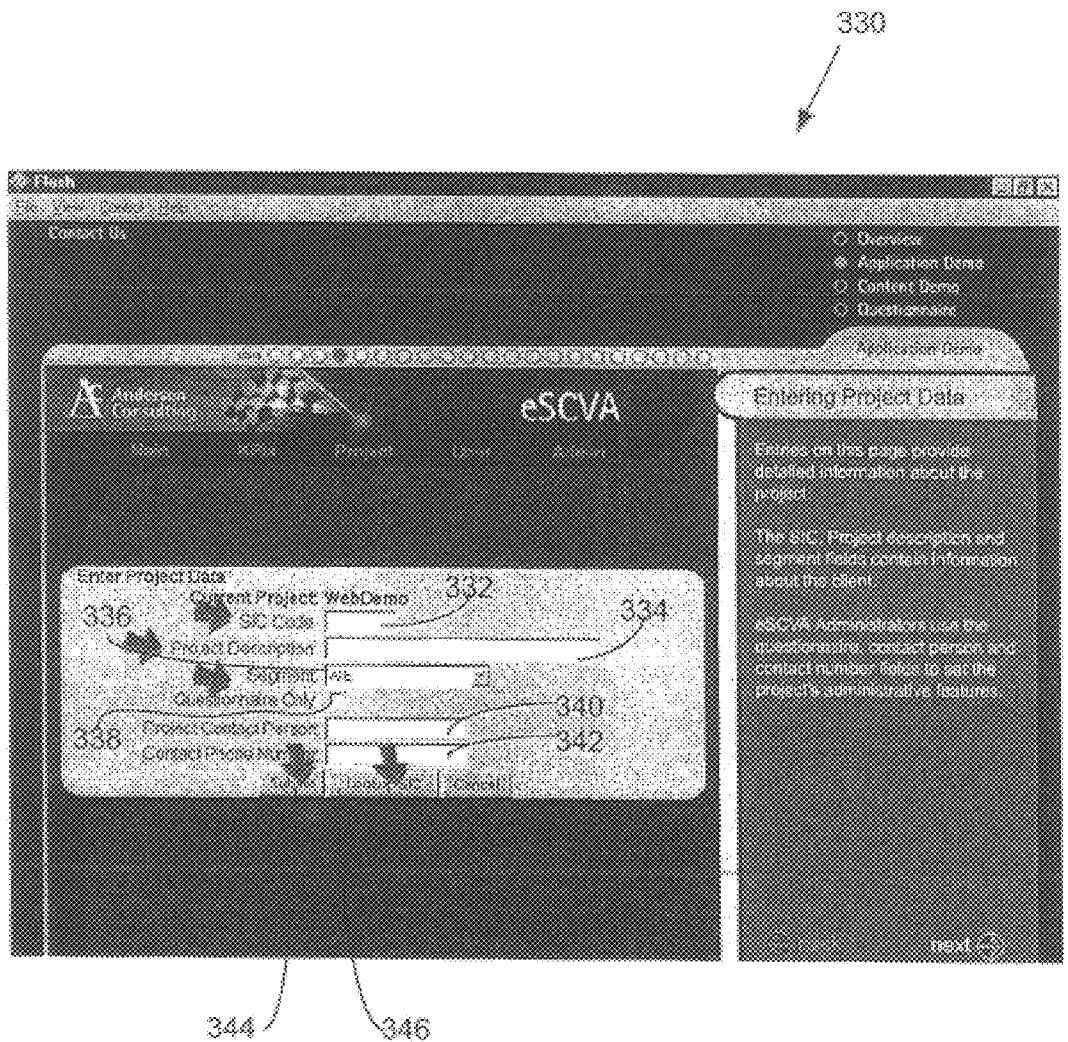
FIG. 3C illustrates an interface for entering project data in accordance with an embodiment of the present invention.

FIG. 3B illustrates an interface 320 for creating a new project in accordance with an embodiment of the present invention, as set forth in FIG. 3. Administrators create a new project for each client engagement. Project IDs may be entered twice in log-in fields 322 for verification. The present invention stores:

Authorized user lists
Selected Key Performance Indicators (KPIs)
Client raw data
Key Performance Indicators values
Andersen Consulting questionnaires
Client questionnaire responses FIG. 3C illustrates an interface 330 for entering project data in accordance with an embodiment of the present invention. It should be noted that entries on this page provide detailed information about the project. The SIC field 332, project description field 334, and segment field 336 contain information about the client. Administrators may use the questionnaire field 338, contact person field 340 and contact number fields 342 to set the project's administrative features.

The SIC code field 332 may be used to enter SIC information into the database of the present invention. It should be noted that the US government established specific industry codes to standardize industry classification. The project description field 334 can be used to add a text description of the project. The segment field 336 is subsets of industries. For example, PC Hardware and Consumer are both subsets of the Electronics and High Tech Industry. The submit button 344 may be clicked to save the project data in the database of the present invention. Further, the look-up SIC button 346 may be used to display a searchable SIC guide if one does not know the SIC code for a client.

Figure 3D:
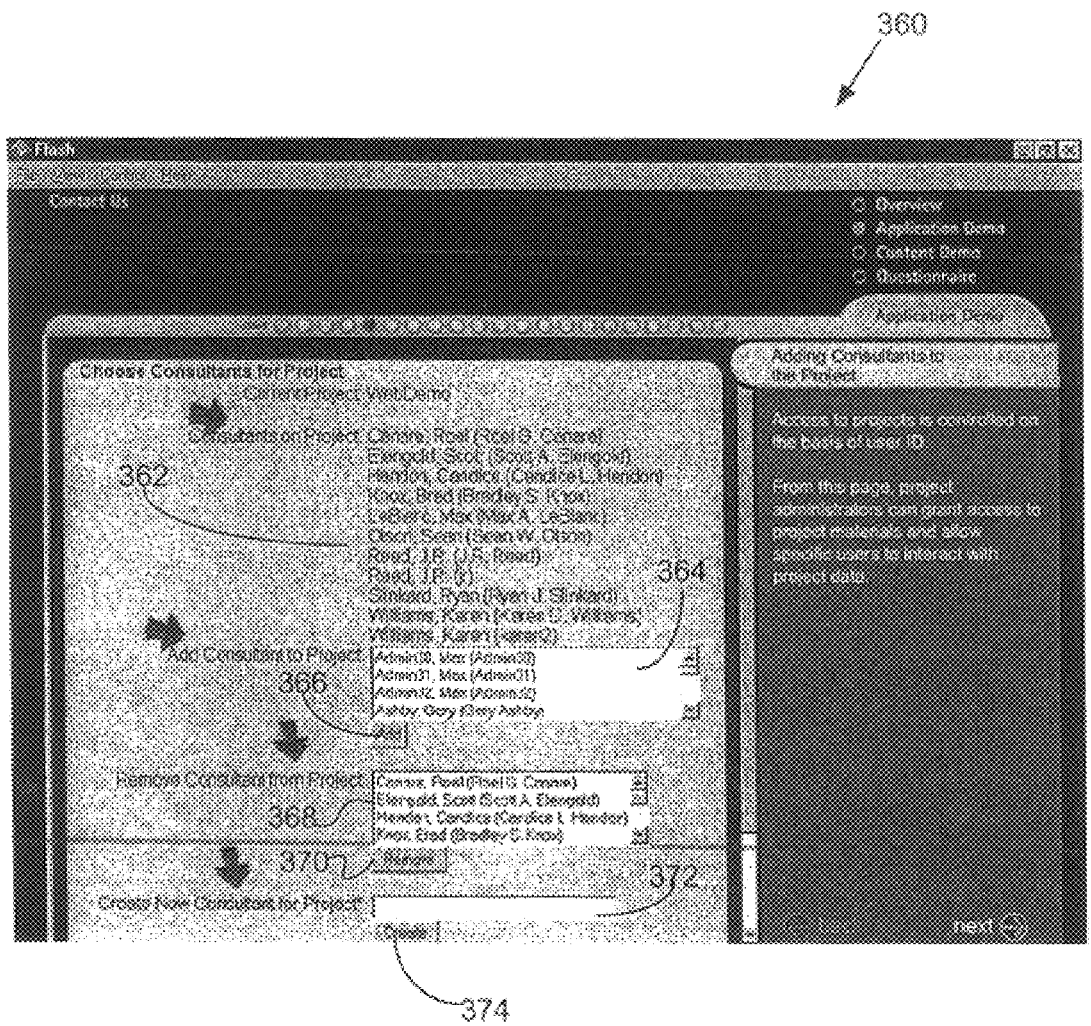
FIG. 3D illustrates an interface for adding consultants to a project in accordance with an embodiment of the present invention.

FIG. 3D illustrates an interface 360 for adding consultants to a project in accordance with an embodiment of the present invention. It should be noted that access to projects is controlled on the basis of user ID. From this page 360, project administrators can grant access to project materials and allow specific users to interact with project data.

A consultants list 362 includes company personnel with access to this project's data. An add consultant field 364 lists personnel with access to the present invention. An add button 366 may be clicked to grant highlighted users access to this project. A remove consultant field 368 may be used to revoke access to this project by selecting a user from the remove consultant field 368 and clicking on a remove button 370. Further included is a create new consultant field 372 for adding new consultants to the present invention by entering a new user ID and clicking on a create button 374.

Figure 3E:
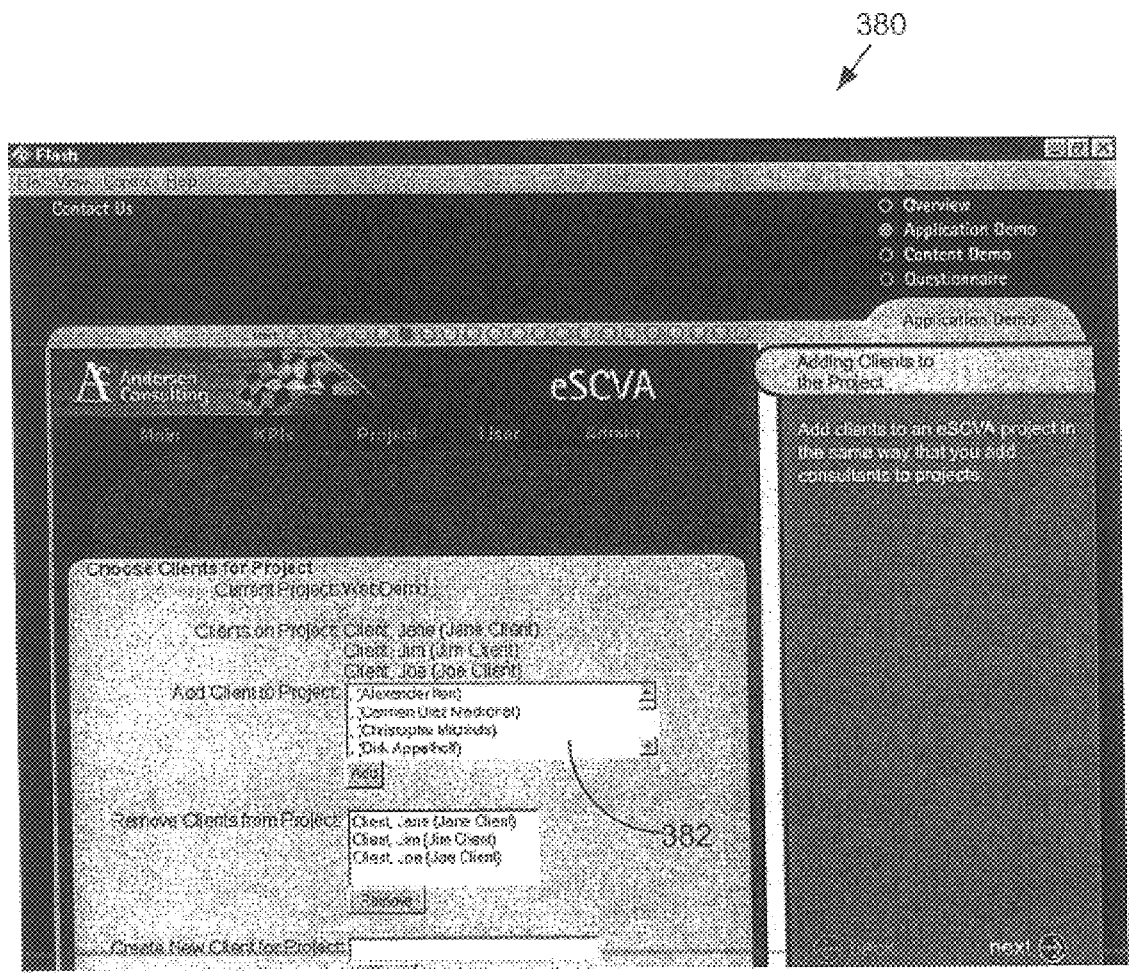
FIG. 3E illustrates an interface for adding clients to a project in accordance with an embodiment of the present invention.

FIG. 3E illustrates an interface 380 for adding clients to a project in accordance with an embodiment of the present invention. An add clients field 382 allows a user to add client to a project in the same way that one would add consultants to projects.

Figure 3F:
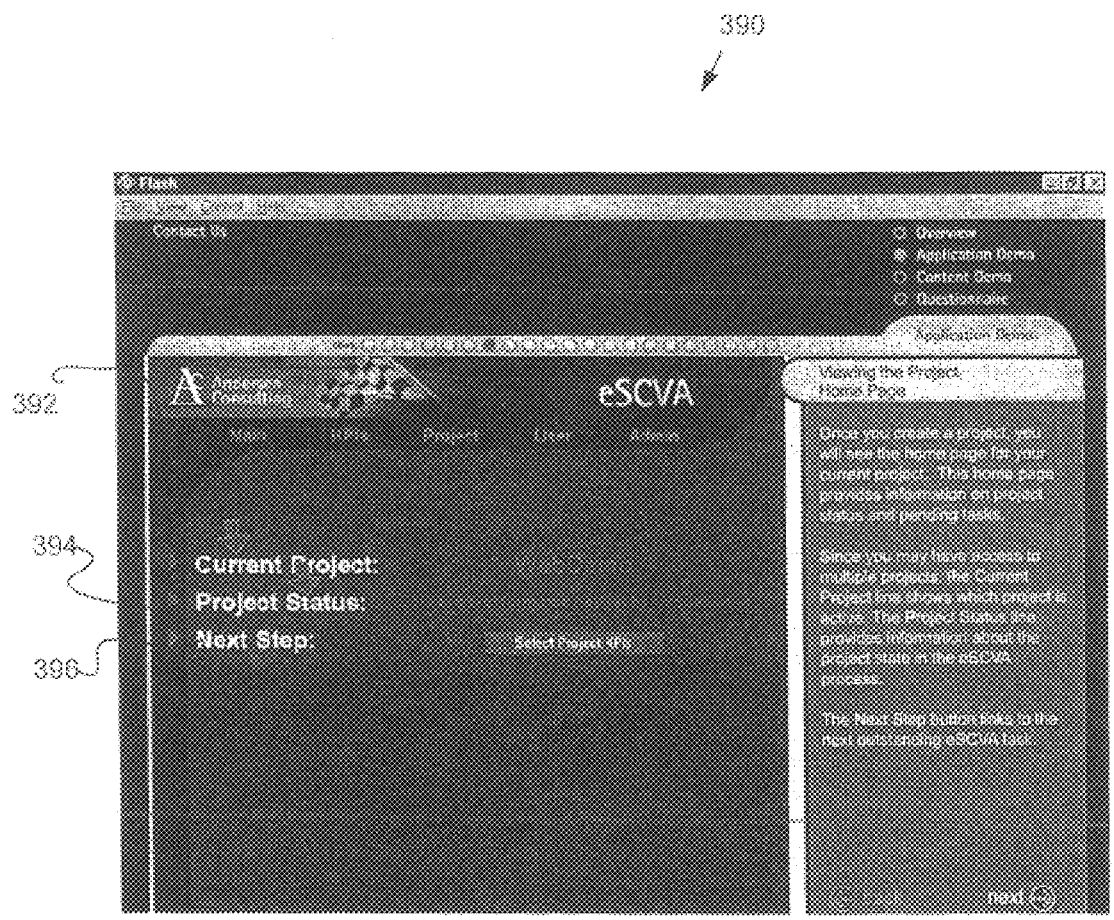
FIG. 3F illustrates an interface for viewing a project home page in accordance with an embodiment of the present invention.

FIG. 3F illustrates an interface 390 for viewing a project home page in accordance with an embodiment of the present invention. Once project is created, one may view the home page for a current project. This home page provides information on project status and pending tasks. Since one may have access to multiple projects, the current interface 390 shows which project is active. The interface 390 provides information about the project state in the process.

A next step button links to the next outstanding task of the present invention. A current project field 392 identifies the name of the project the user is viewing. Further, a project status field 394 and next step field 396 are automatically updated by the present invention.

Figure 4:
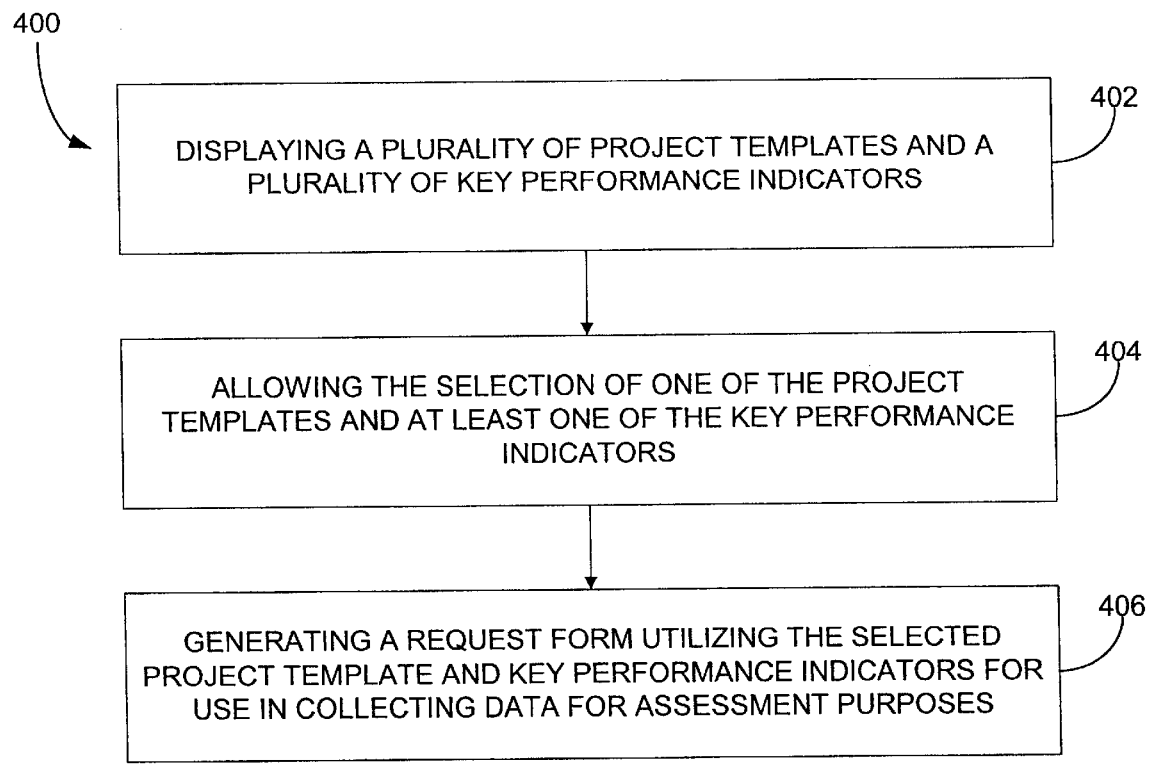
FIG. 4 is a flowchart illustrating a process for selecting key performance indicators during an assessment in accordance with an embodiment of the present invention.

FIG. 4 is a flowchart illustrating a process 400 for selecting key performance indicators during an assessment in accordance with an embodiment of the present invention. In operation 402, a plurality of project templates and a plurality of key performance indicators are displayed. Then, in operation 404, the selection of one of the project templates and at least one of the key performance indicators is allowed. Further, a request form is generated utilizing the selected project template and key performance indicators for use in collecting data for assessment purposes in operation 406.

In one embodiment of the present invention, the assessment may be a supply chain value assessment. In an aspect of the present invention, the project templates may be organized in terms of types of industries. Each project template may also have a plurality of key performance indicators associated therewith. In another embodiment, the network may include the Internet. The descriptions of the key performance indicators may be displayed for facilitating the selection in operation 404.

Figure 4A:
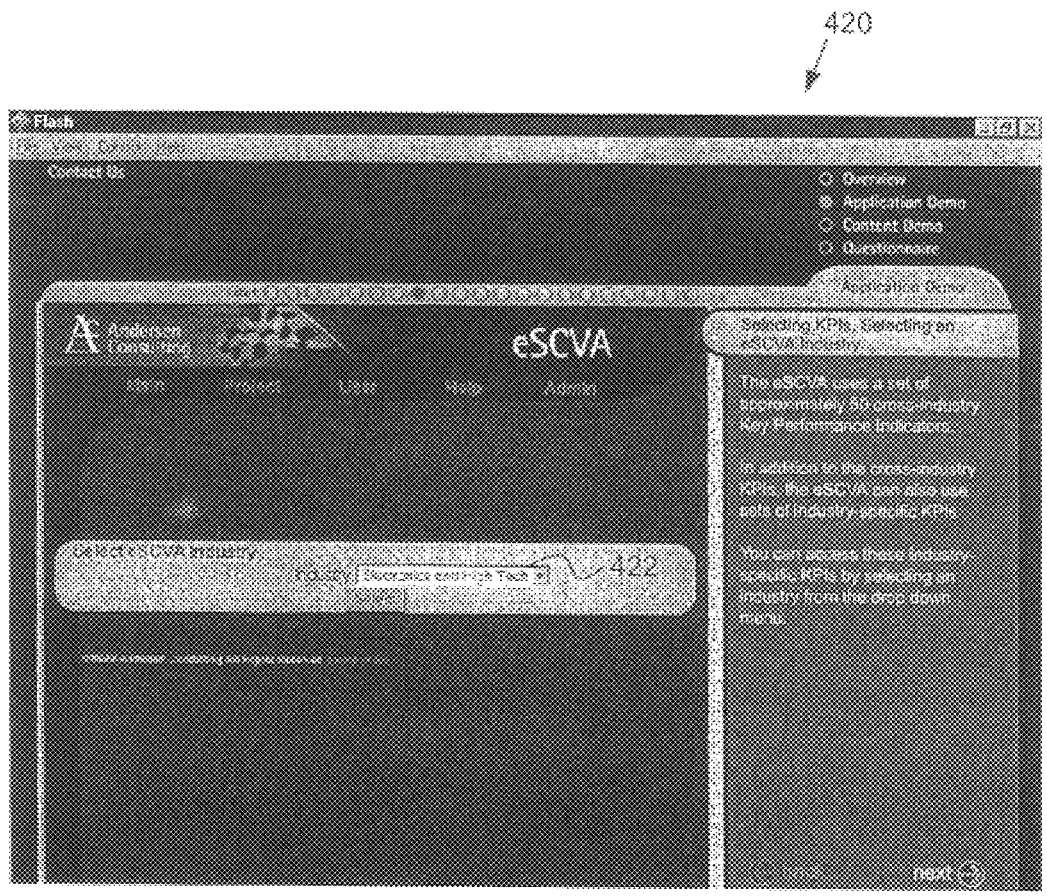
FIG. 4A illustrates an interface for selecting key performance indicators (KPI's) and an industry in accordance with an embodiment of the present invention.

FIG. 4A illustrates an interface 420 for selecting key performance indicators (KPI's) and an industry in accordance with an embodiment of the present invention, as set forth in FIG. 4. The present invention uses a set of approximately 50 cross-industry Key Performance Indicators. In addition to the cross-industry KPIs, the present invention can also use sets of industry-specific KPIs. One can access these industry-specific KPIs by selecting an industry from the drop down menu 422.

Figure 4B:
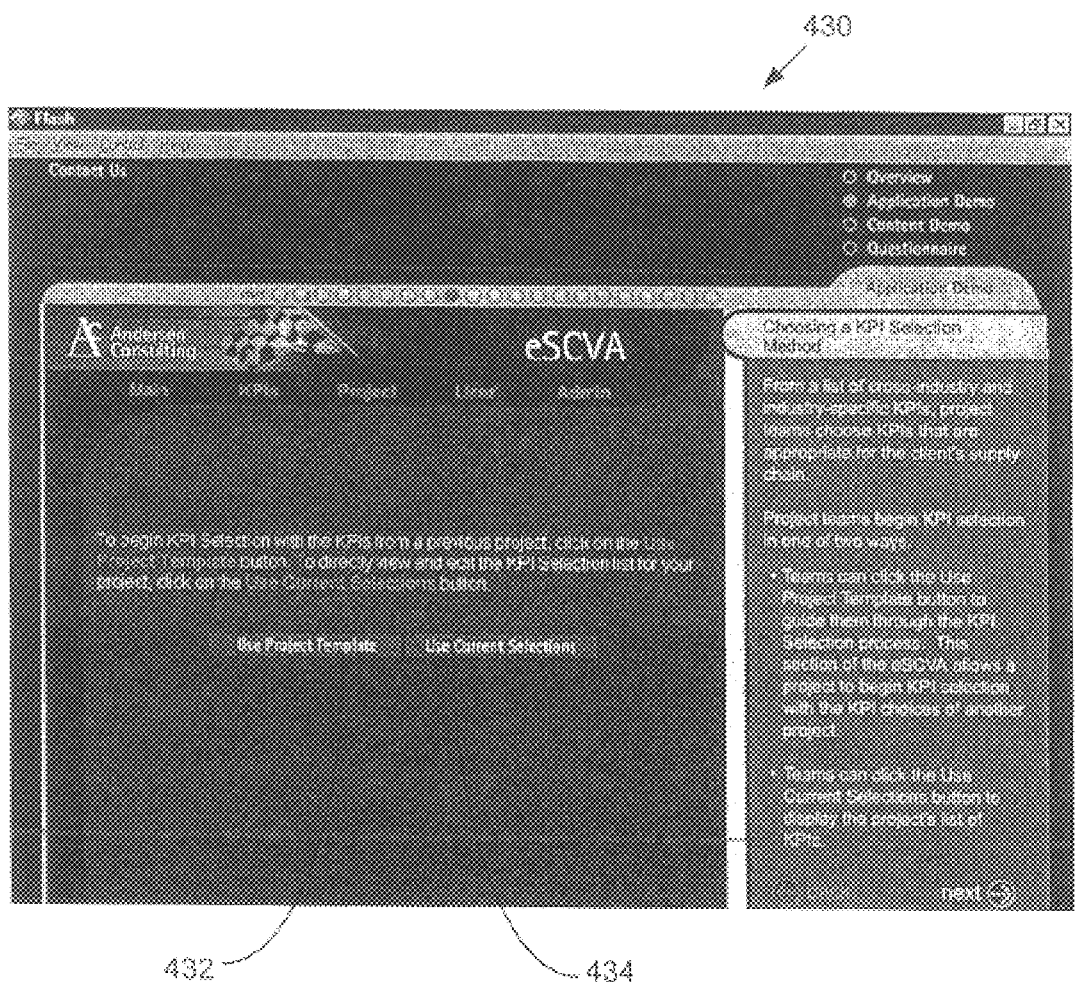
FIG. 4B is an illustration of an interface that allows a user to choose a key performance indicator method in accordance with an embodiment of the present invention.

FIG. 4B is an illustration of an interface 430 that allows a user to choose a key performance indicator method in accordance with an embodiment of the present invention. From a list of cross-industry and industry-specific KPIs, project teams may choose KPIs that are appropriate for the client's supply chain. Project teams may begin KPI selection in one of two ways:

Teams can click the use project template button 432 to guide them through the KPI selection process. This section of the present invention allows a project to begin KPI selection with the KPI choices of another project. Teams can also click the use current selections button 434 to display the project's list of KPIs.

Project templates store the KPI selections of the present invention and allows one to leverage the experience of previous projects. Rather than beginning KPI selection from a blank page, the present invention allows one to begin with the KPI selections from similar engagements. One can choose a project template from a list of projects in the selected industry. After one clicks on the use template button 432 of FIG. 4B, the present invention copies the project template's KPIs to the current project's list of KPIs. It should be noted that projects in the same industry as the current project will appear in this drop-down menu.

Figure 4C:
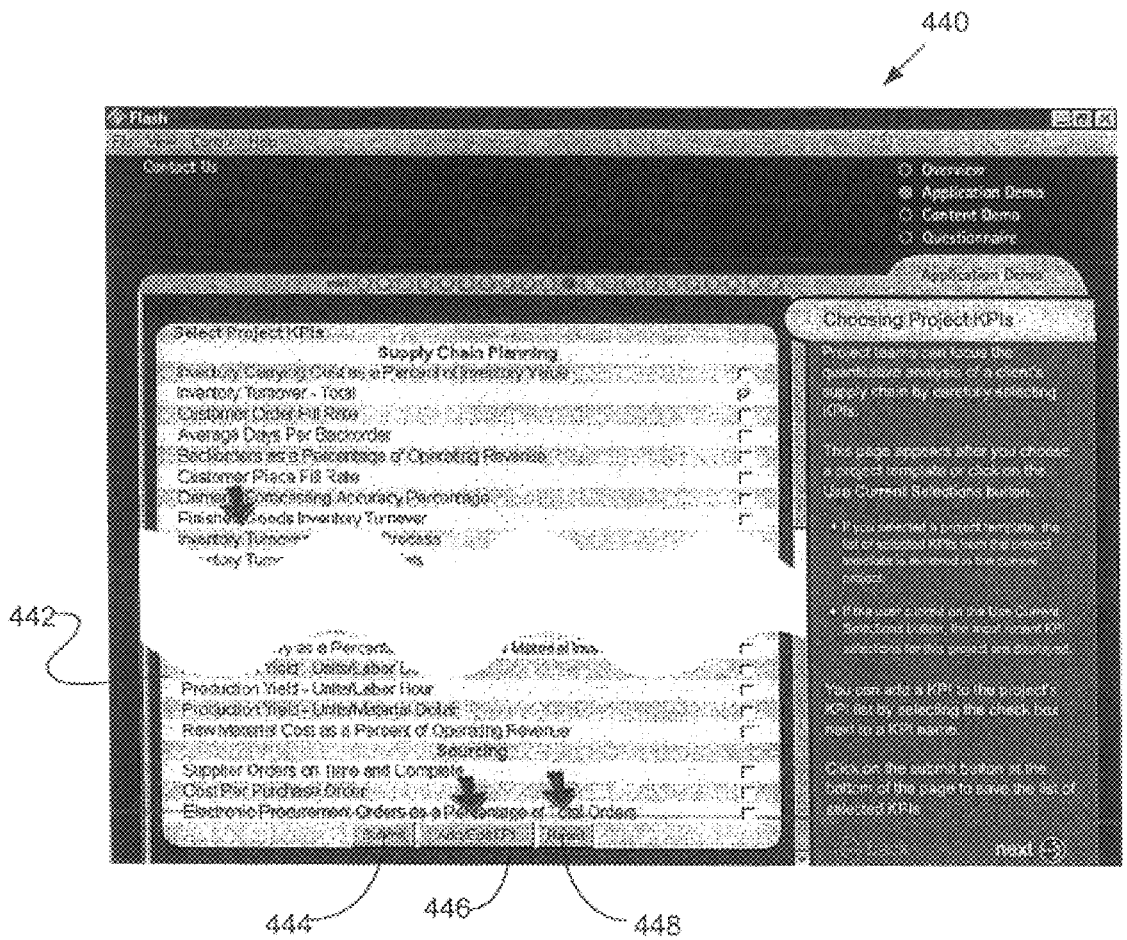
FIG. 4C is an interface for choosing project KPIs in accordance with an embodiment of the present invention.

FIG. 4C is an interface 440 for choosing project KPIs in accordance with an embodiment of the present invention. Project teams can focus the quantitative analysis of a client's supply chain by carefully selecting KPIs. This page appears after one chooses a project template or clicks on the use current selections button 434 of FIG. 4B.

If one selects a project template, the list of selected KPIs from the project template is mirrored in the current project. If the user clicks on the use current selections button 434, the most recent KPI selections for this project are displayed. One can add a KPI to the project's KPI list by selecting the check box next to a KPI name in list 442. Thereafter, the submit button 444 at the bottom of the page may be used to save the list of selected KPIs.

As shown in FIG. 4C detailed descriptions of each KPI can be accessed by clicking on a KPI name. Further, one can create new KPIs by clicking in the add/edit KPI button 446. Further, one can undo changes to the KPI selection page by clicking on the reset button 448.

Figure 5:
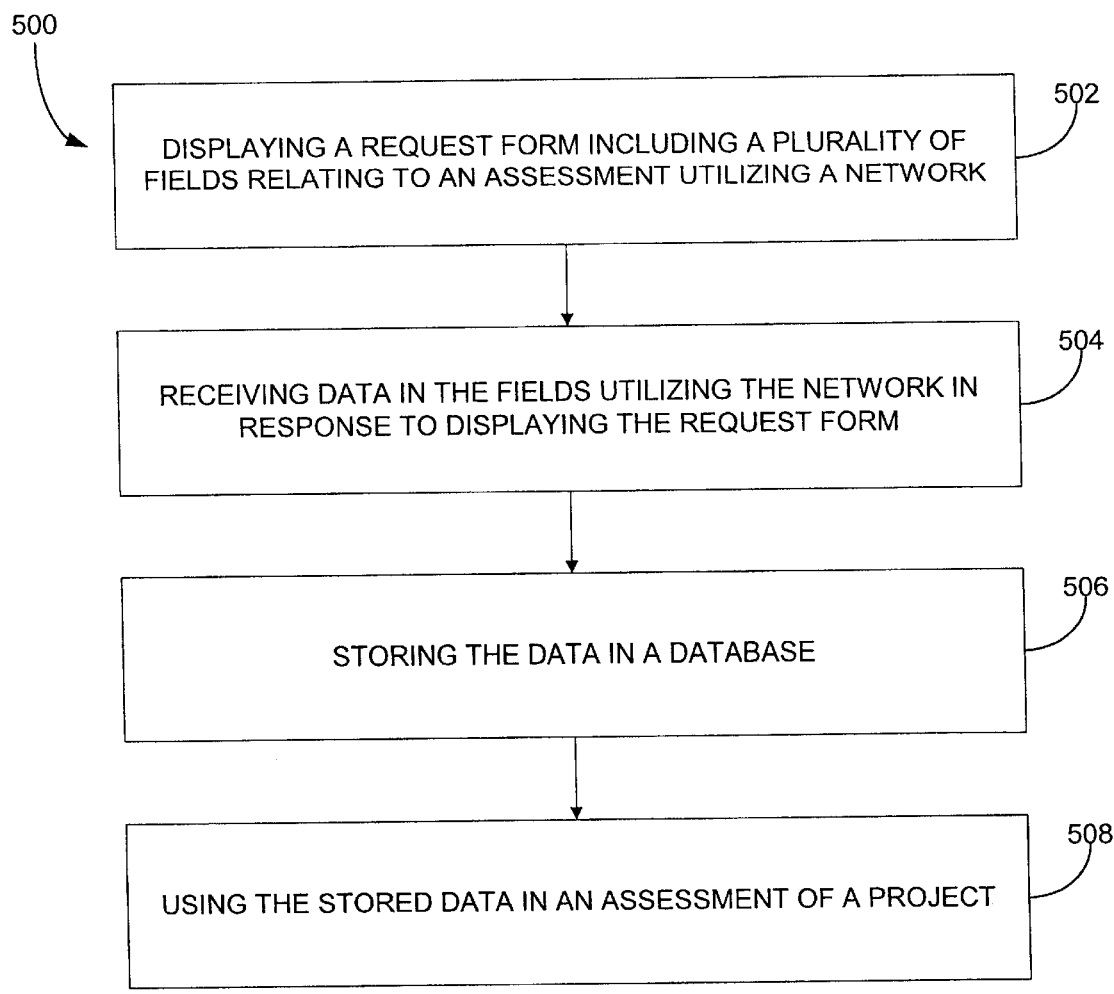
FIG. 5 is a flowchart illustrating a process for generating a data request graphical user interface during project assessment in accordance with an embodiment of the present invention.

FIG. 5 is a flowchart illustrating a process 500 for generating a data request graphical user interface during project assessment in accordance with an embodiment of the present invention. A request form including a plurality of fields relating to an assessment is displayed utilizing a network in operation 502. In operation 504, data is received in the fields utilizing the network in response to displaying the request form. Then, the data is stored in a database in operation 506. The stored data is then used in an assessment of a project in operation 508.

In one embodiment of the present invention, the assessment may be a supply chain value assessment. The fields each may relate to a key performance indicator. The data entered into the fields may also be used to calculate the key performance indicator. In another embodiment, the request form may be capable of being temporarily stored with the stored data for allowing a user to enter remaining data at a later date. An identification of the user may also be verified prior to the storage of the data in the database.

Figure 5A:
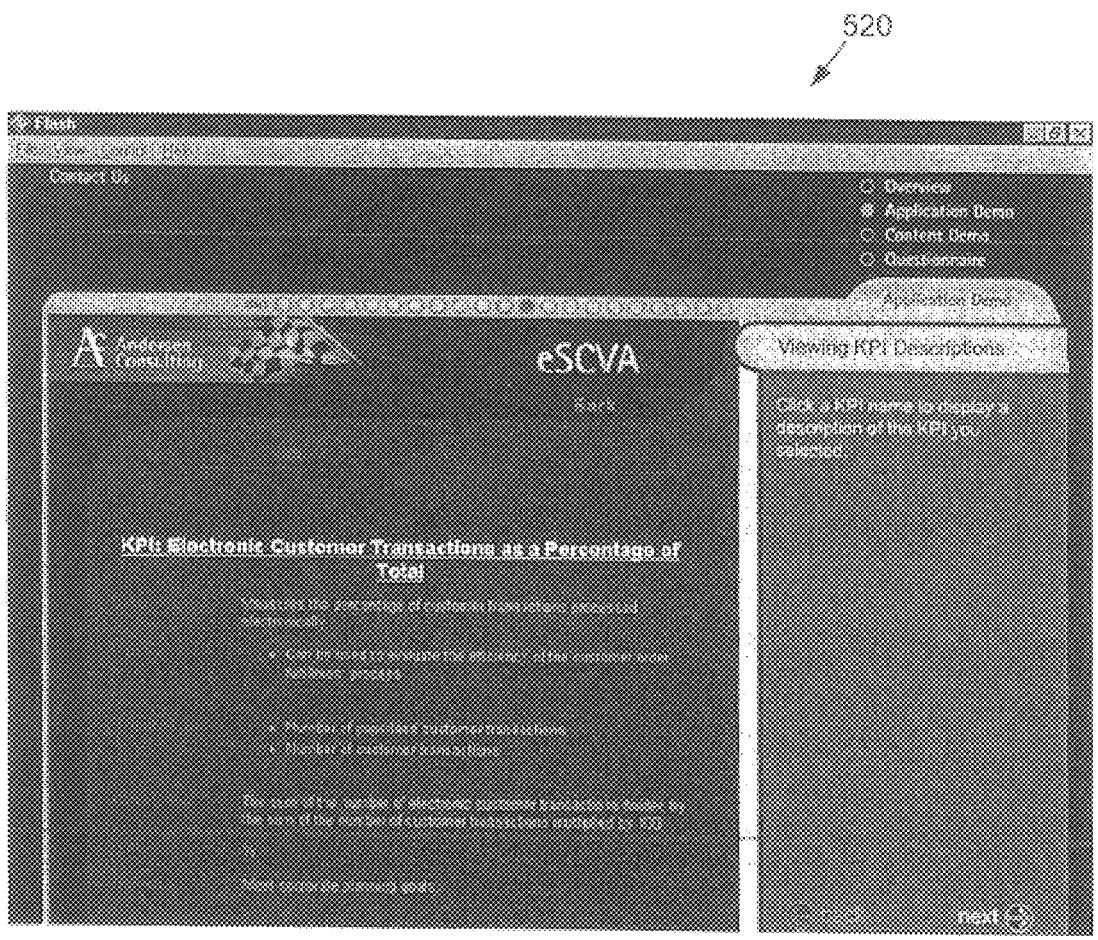
FIG. 5A illustrates an interface for viewing KPI descriptions in accordance with an embodiment of the present invention.

FIG. 5A illustrates an interface 520 for viewing KPI descriptions in accordance with an embodiment of the present invention. As shown, a user may click a KPI name to display a description of the KPI selected.

Figure 5B:
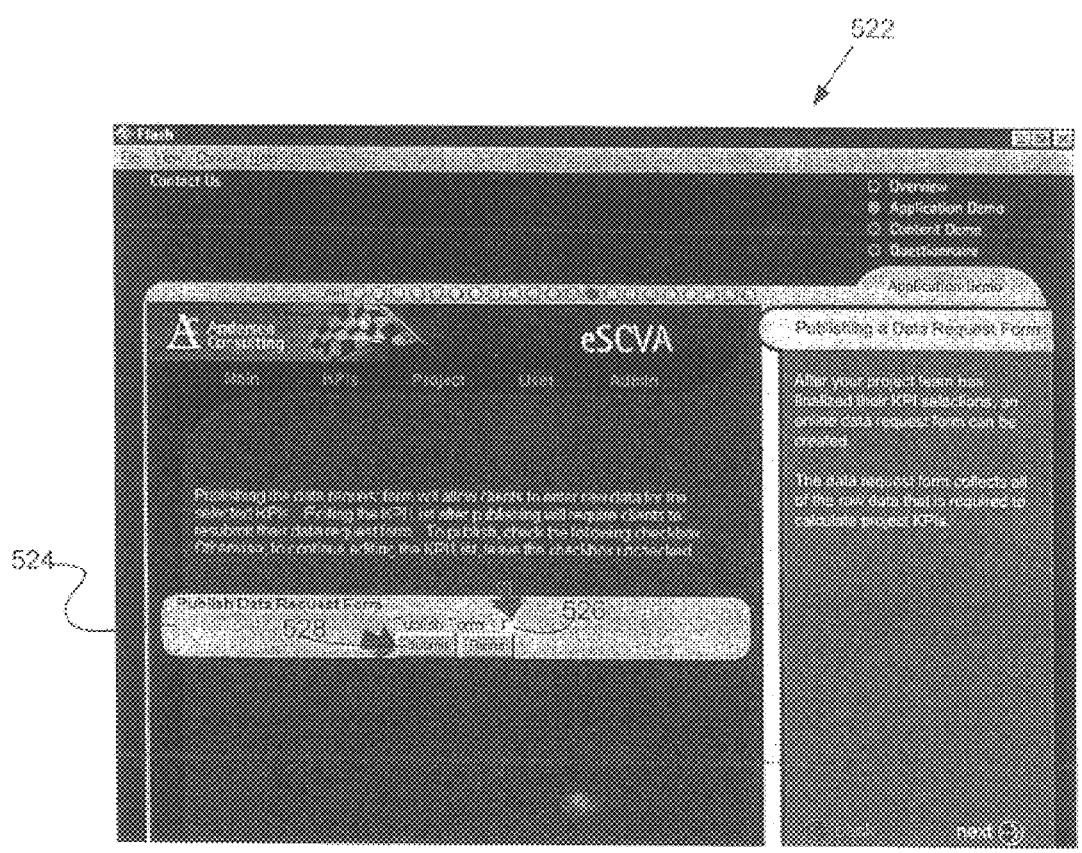
FIG. 5B illustrates an interface for publishing a data request form in accordance with an embodiment of the present invention.

FIG. 5B illustrates an interface 522 for publishing a data request form in accordance with an embodiment of the present invention, as set forth in FIG. 5. After a project team has finalized their KPI selections, an online data request form can be created. The data request form collects all of the raw data that is required to calculate project KPIs. A publish form box 524 includes a checkbox 526 to generate the data request form. A submit button 528 may be clicked to return to the project home page.

Once the data request form has been published, clients and consultants on a team can enter project raw data. The project home page informs one that the data request form is available. Click on the Enter Raw Data button to move to the data request form.

Figure 5C:
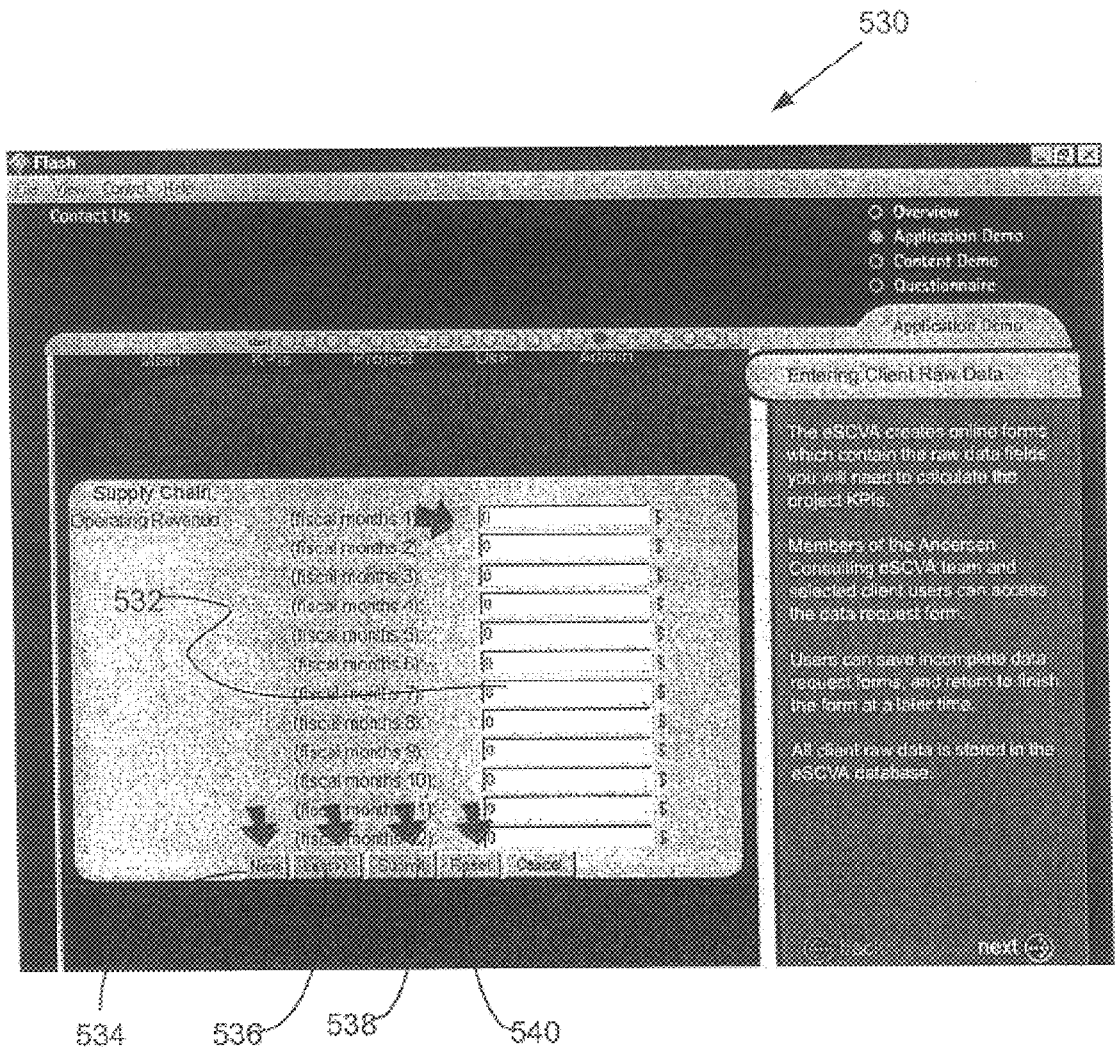
FIG. 5C illustrates an interface for entering client raw data in response to a user clicking on an enter raw data button on a project home page in accordance with an embodiment of the present invention.

FIG. 5C illustrates an interface 530 for entering client raw data in response to a user clicking on an enter raw data button on a project home page in accordance with an embodiment of the present invention. The present invention creates online forms which contain the raw data fields one will need to calculate the project KPIs. A team and selected client users can access the data request form. Users can save incomplete data request forms, and return to finish the form at a later time.

All client raw data is stored in a database. As shown in FIG. 5C, a plurality of operating revenues entry fields 532 allows clients and consultants to enter raw data in fields on the data request form. A next button 534 links the user to the next page in the data request form. A last button 536 sends the user to the last page in the data request form. Further, a submit button 538 allows a user to save the raw data to the database. Finally, a reset button 540 may be clicked to undo changes that have been entered on this page of the data request form.

Figure 5D:
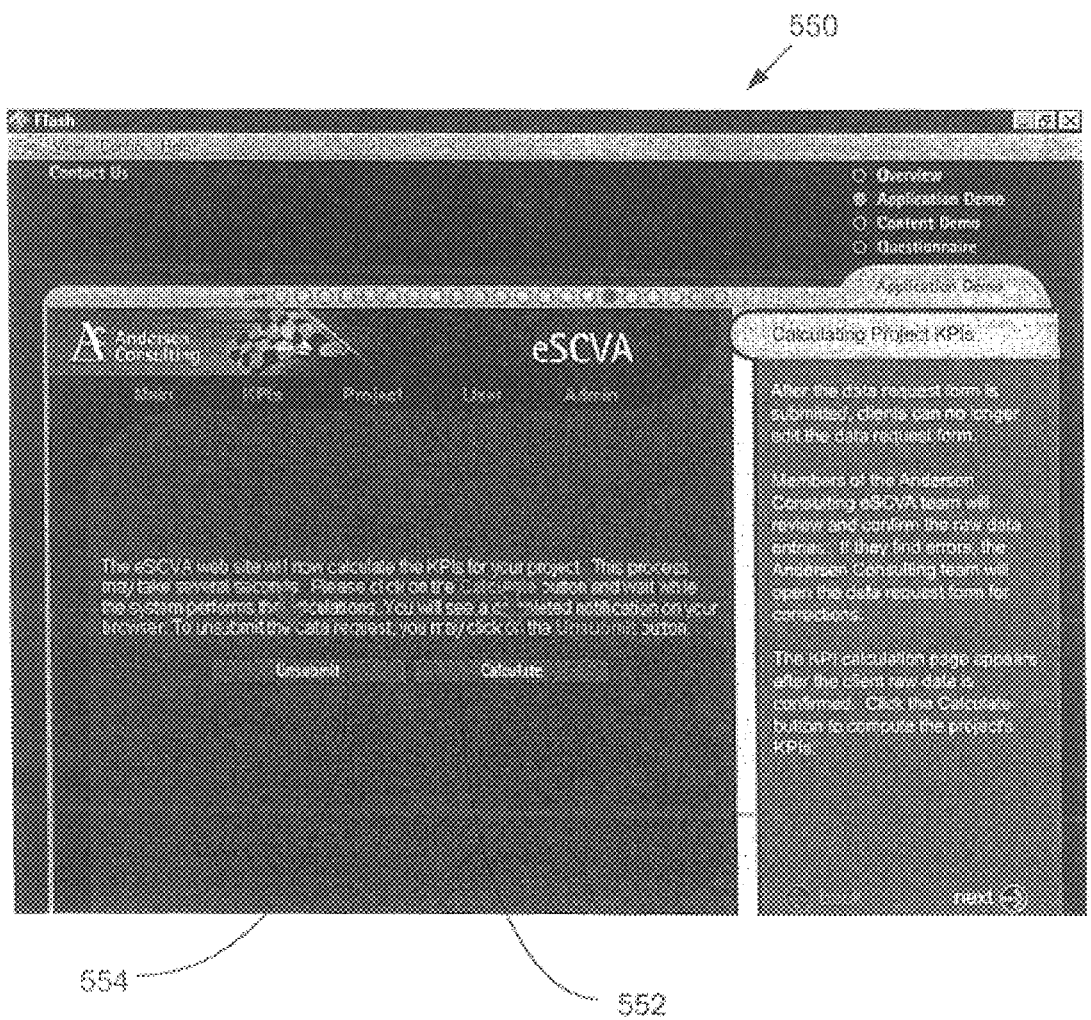
FIG. 5D illustrates an interface for calculating project key performance indicators in accordance with an embodiment of the present invention.

FIG. 5D illustrates an interface 550 for calculating project key performance indicators in accordance with an embodiment of the present invention. After the data request form is submitted, a client can no longer edit the data request form. A team may review and confirm the raw data entries. If the team finds errors, the they may open the data request form for corrections.

The KPI calculation page 550 appears after the client raw data is confirmed. One may click the calculate button 552 to compute the project's KPIs. An unsubmit button 554 allows editing of the data request form. A calculate button 556 to compute project KPIs.

Figure 6:
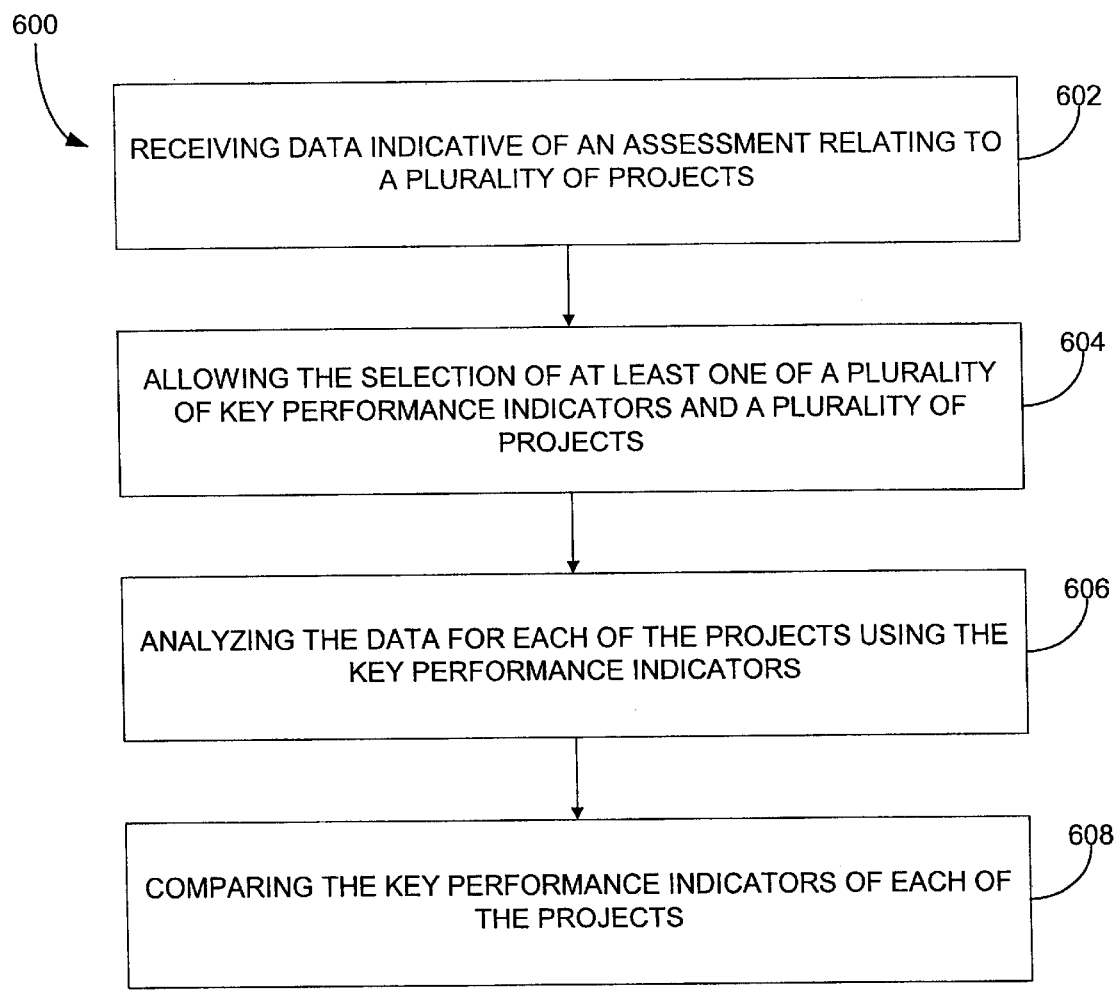
FIG. 6 is a flowchart illustrating a process for project comparison during an assessment in accordance with an embodiment of the present invention.

FIG. 6 is a flowchart illustrating a process 600 for project comparison during an assessment in accordance with an embodiment of the present invention. In operation 602, data indicative of an assessment relating to a plurality of projects is received. Then, the selection of at least one of a plurality of key performance indicators and a plurality of projects is allowed in operation 604. In operation 606, the data for each of the projects is analyzed using the key performance indicators. The key performance indicators of each of the projects are then compared in operation 608.

In one embodiment of the present invention, the assessment may be a supply chain value assessment. Further, the comparison may be limited to projects associated with a predetermined industry. The projects may also be sorted for facilitating the selection. In another embodiment, the projects may be sorted by at least one of industry, project, and personnel. A most current project may also be situated at a top of a list of the projects.

Figure 6A:
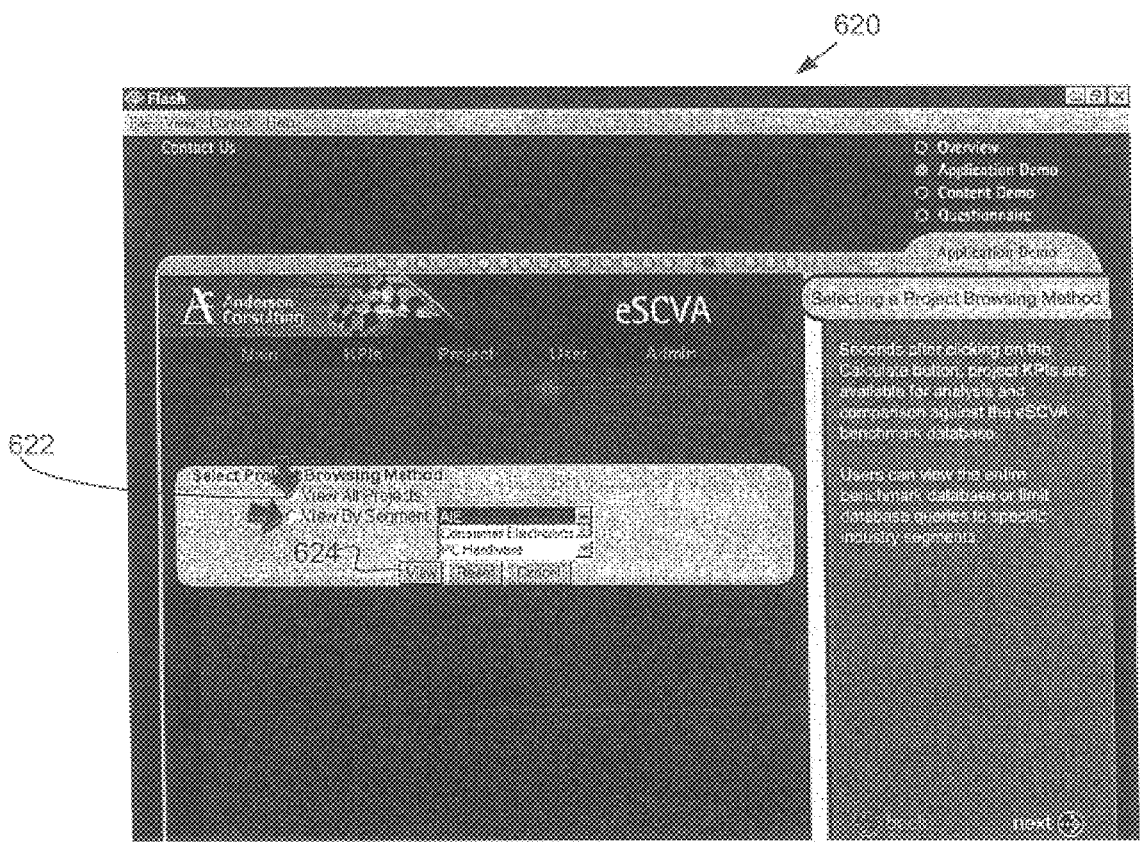
FIG. 6A is an interface for selecting a project browsing method in accordance with an embodiment of the present invention.

FIG. 6A is an interface 620 for selecting a project browsing method in accordance with an embodiment of the present invention. Seconds after clicking on the calculate button 552 of FIG. 5D, project KPIs are available for analysis and comparison against the benchmark database. Users can view the entire benchmark database or limit database queries to specific industry segments. The view all project radio button 622 may be selected to access all of the projects in the benchmark database. Further, the view by segment radio button 624 may be clicked to select segments from the menu box to limit the database to specific industry segments.

Figure 6B:
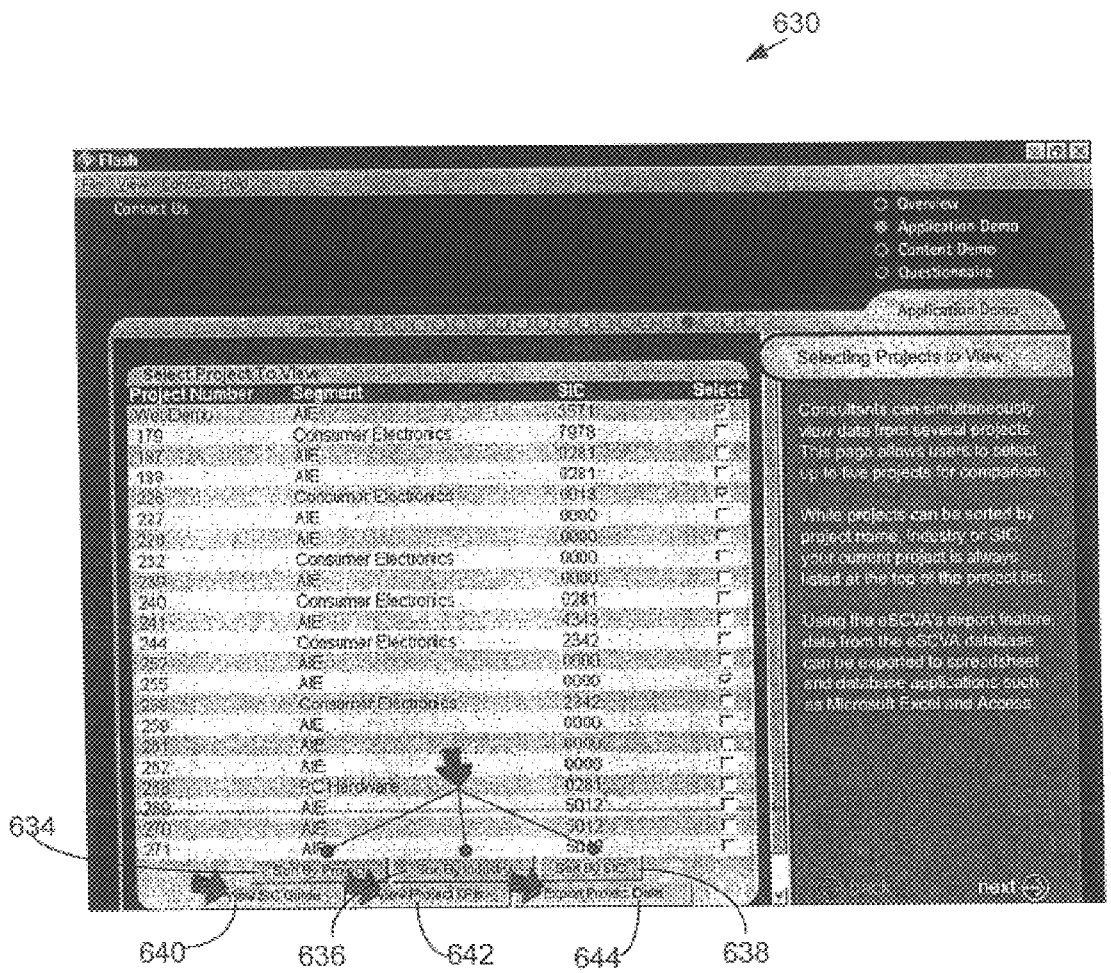
FIG. 6B illustrates an interface for selecting projects to view in accordance with an embodiment of the present invention.

FIG. 6B illustrates an interface 630 for selecting projects to view in accordance with an embodiment of the present invention, as set forth in FIG. 6. Consultants can simultaneously view data from several projects. This page 630 allows users to select up to five projects for comparison. While projects can be sorted by project name, industry or SIC, a current project is always listed at the top of the project list.

Using the export feature of the present invention, data from the database can be exported to spreadsheet and database applications such as Microsoft Excel and Access. The sort by project, sort by industry, sort by SIC buttons 634, 636, 638, respectively, may be clicked to reorder the project list. A view SIC guide button 640 allows a user to view a list of U.S. specific industry codes. A view project data button 642 allows a user to view data from the selected projects. An export project data button 644 allows a user to use the data export functionality.

Figure 6C:
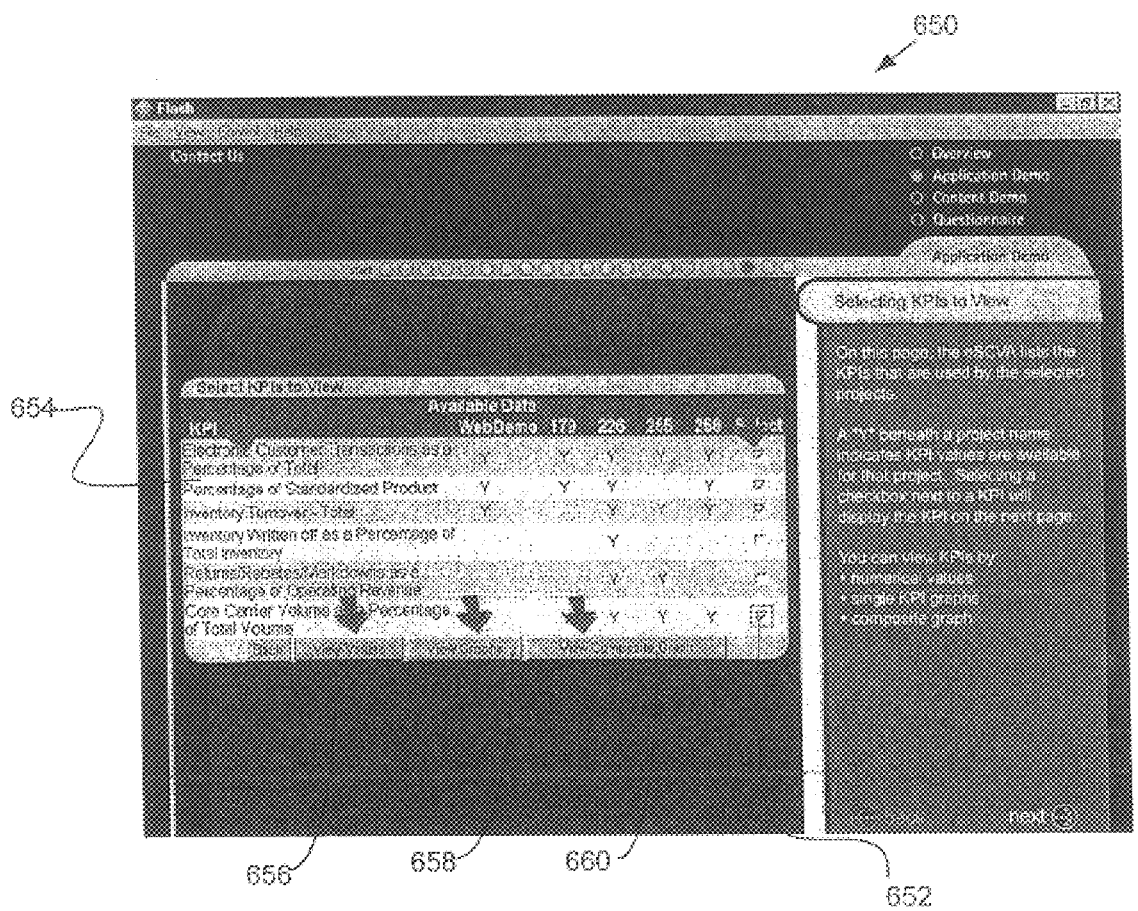
FIG. 6C illustrates an interface for selecting key performance indicators to view in accordance with an embodiment of the present invention.

FIG. 6C illustrates an interface 650 for selecting key performance indicators to view in accordance with an embodiment of the present invention. On this page, the present invention lists the KPIs that are used by the selected project. It should be noted that a "Y" beneath a project name indicates KPI values are available for that project. Selecting a checkbox 652 next to a KPI will display the KPI on the next page.

One can view KPIs by numerical values, single KPI graphs, or a composite graph. A user may select KPI names 654 to open a detailed description of the KPI. Checkboxes 652 may be selected to display the KPI on the next page. A view values button 656 may be clicked to display a table of the numerical KPI values. A view graphs button 658 may be clicked to show graphs for each of the selected KPIs. A view composite graph button 660 may be clicked to show a single graph that compares sets of KPIs.

Figure 6D:
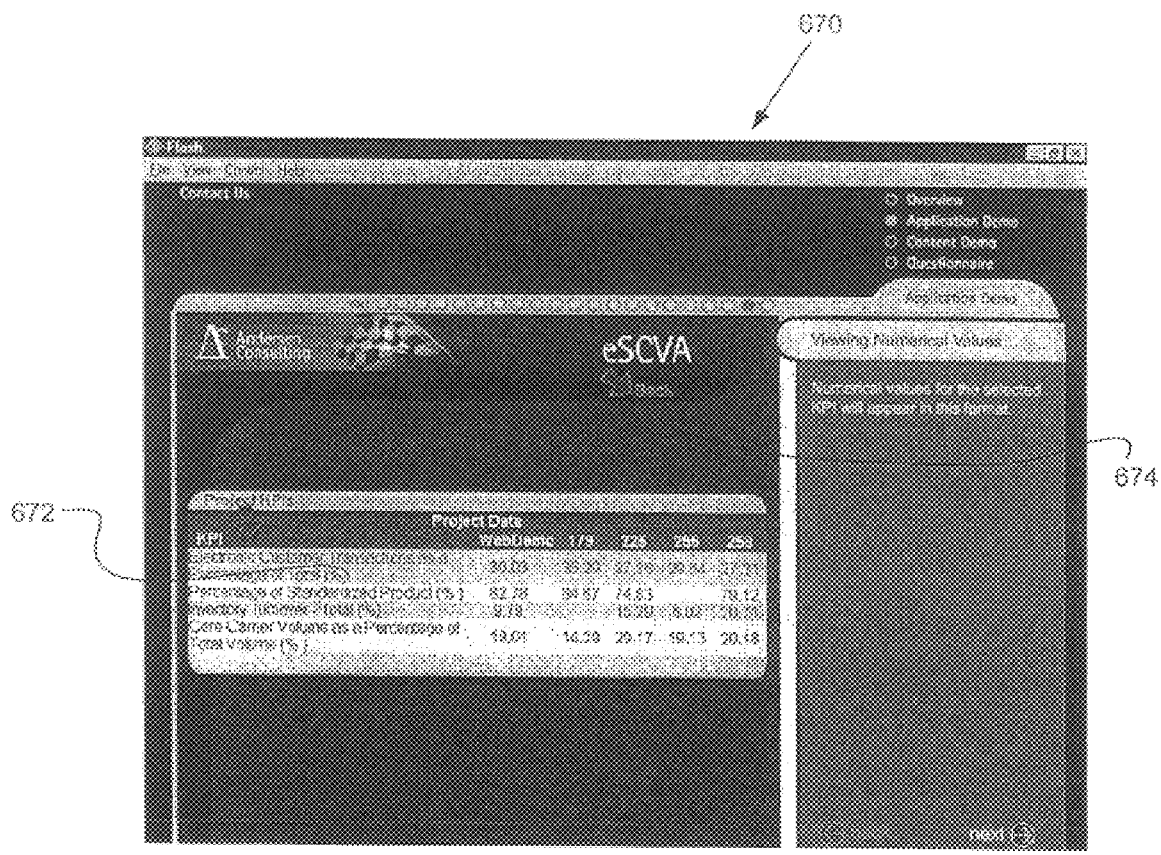
FIG. 6D illustrates an interface for viewing numerical values for the selected KPI in accordance with an embodiment of the present invention.

FIG. 6D illustrates an interface 670 for viewing numerical values for the selected KPI in accordance with an embodiment of the present invention. Numerical values for the selected KPI may appear in the format shown in FIG. 6D. A KPI names button 672 may be clicked to open a detailed description of the KPI. A back button 674 may be clicked to return to the KPI Selection page.

Figure 6E:
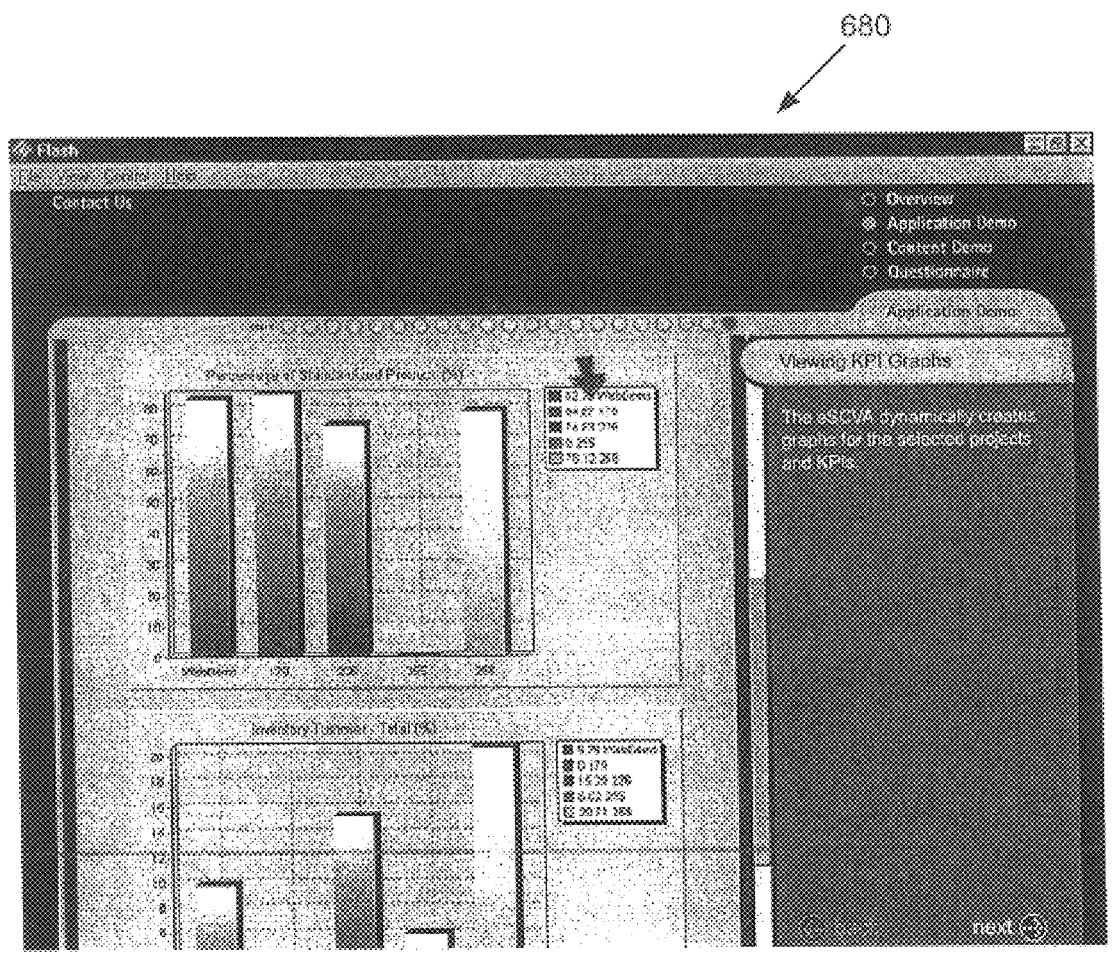
FIG. 6E illustrates an interface for viewing KPI graphs. The present invention dynamically creates graphs for the selected project and KPIs.

FIG. 6E illustrates an interface 680 for viewing KPI graphs. The present invention dynamically creates graphs for the selected project and KPIs.

Figure 6F:
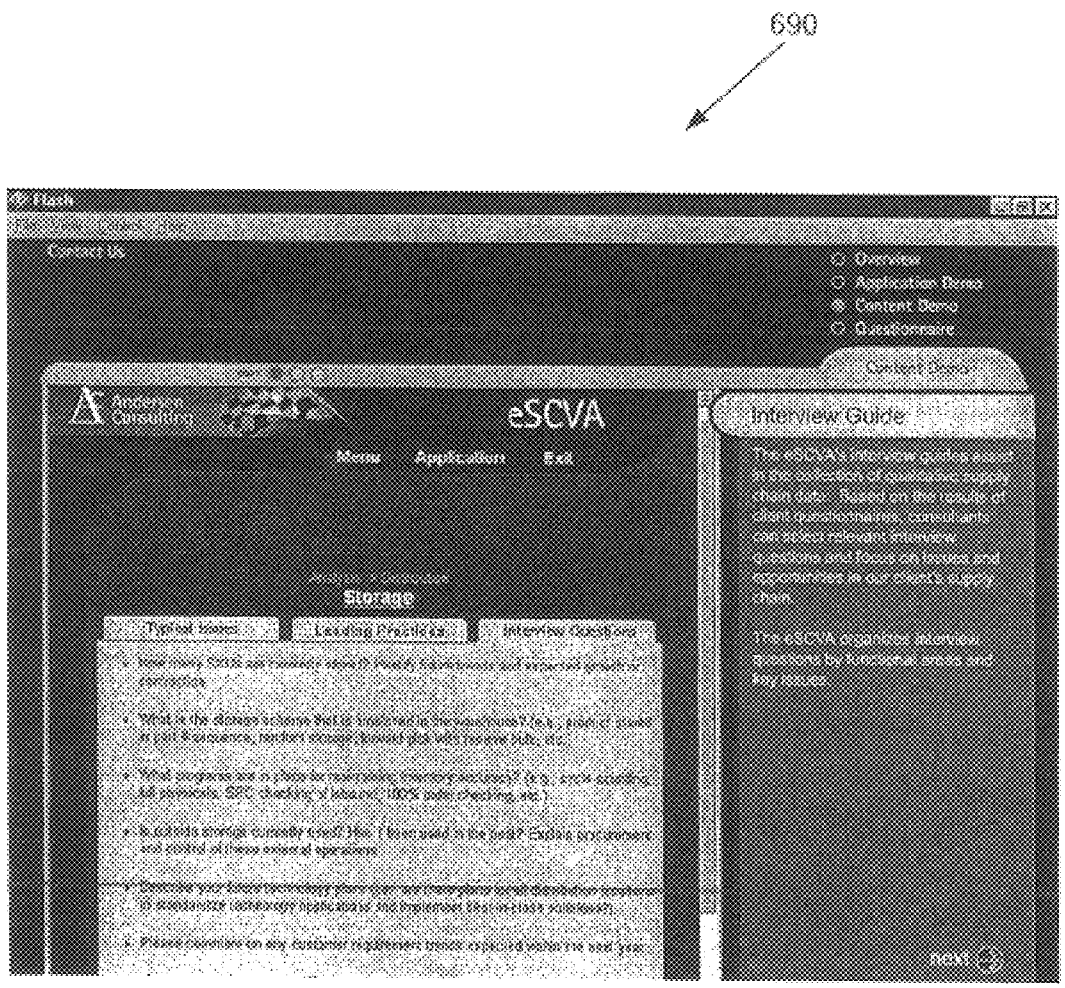
FIGS. 6F–6H illustrate various demonstration content of the present invention.
Figure 6G:
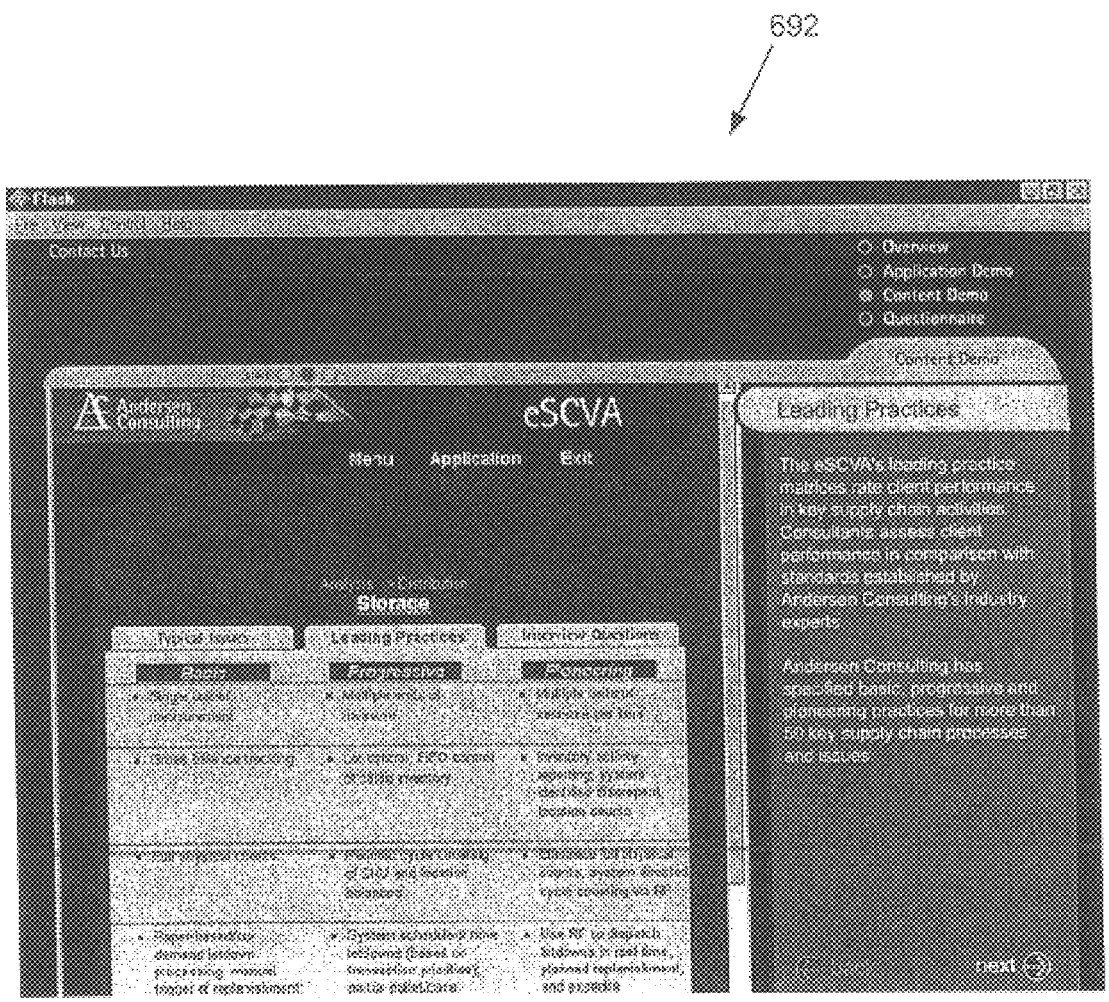
Figure 6H:
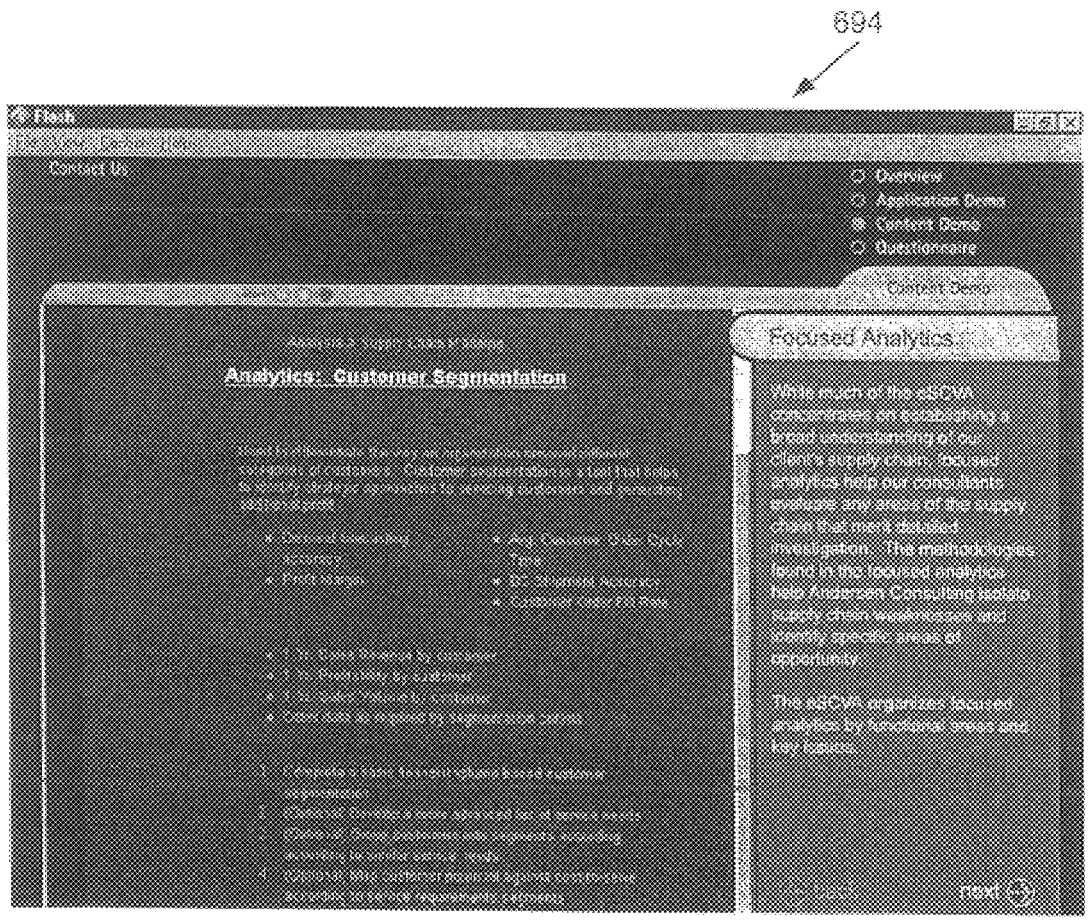

FIGS. 6F–6H illustrate various demonstration content of the present invention.

FIG. 6F illustrates interview guides 690 to assist in the collection of qualitative supply chain data. Based on the results of client questionnaires, consultants can select relevant interview questions and focus on issues and opportunities in a supply chain. The present invention organizes interview questions by functional areas and key issues.

FIG. 6G illustrates leading practices 692 in accordance with an embodiment of the present invention. The leading practice matrices of the present invention rate client performance in key supply chain activities. Consultants assess client performance in comparison with standards established by industry experts. The industry has specified basic, progressive and pioneering practices for more than 50 key supply chain processes and issues.

FIG. 6H illustrates focused analytics 694 in accordance with an embodiment of the present invention. While much of the present invention concentrates on establishing a broad understanding of a supply chain, focused analytics help consultants evaluate any areas of the supply chain that merit detailed investigation. The methodologies found in the focused analytics help the industry isolate supply chain weaknesses and identify specific areas of opportunity. The present invention organizes focused analytics by functional areas and key issues.

Figure 7:
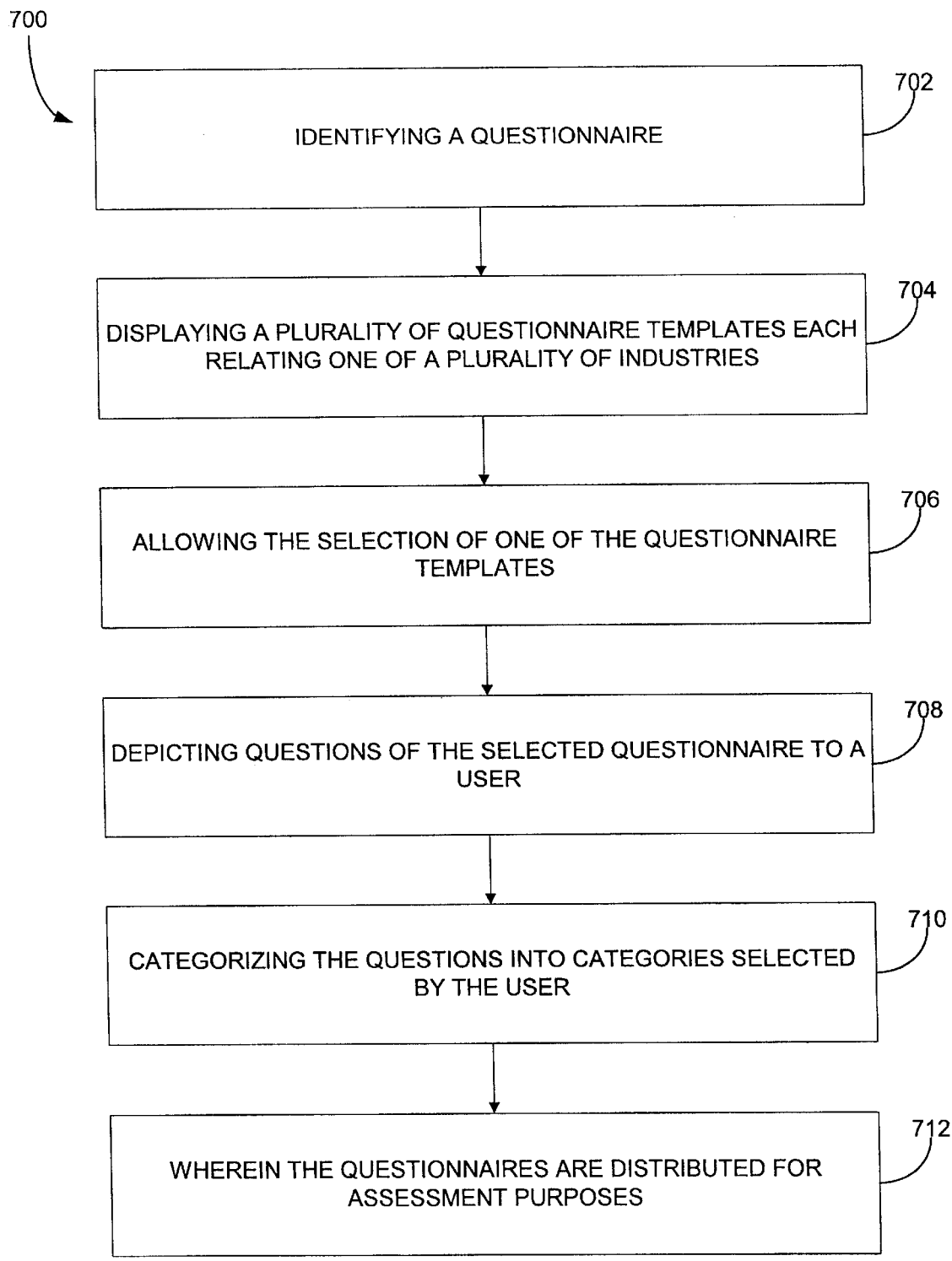
FIG. 7 is a flowchart illustrating a process for viewing results of a questionnaire for assessment purposes in accordance with an embodiment of the present invention.

FIG. 7 is a flowchart illustrating a process 700 for generating a questionnaire for assessment purposes in accordance with an embodiment of the present invention. A questionnaire is identified in operation 702. In operation 704, a plurality of questionnaire templates are displayed each relating one of a plurality of industries. Next, the selection of one of the questionnaire templates is allowed in operation 706. In operation 708, questions of the selected questionnaire are then depicted. The questions are subsequently categorized into categories selected by the user in operation 710. Further, the questionnaires are distributed for assessment purposes in operation 712.

In one embodiment of the present invention, the assessment may be a supply chain value assessment. In an aspect of the present invention, the questionnaires may be distributed via a wide area network. The wide area network may include the Internet. In another embodiment of the present invention, the questionnaire may also be edited.

Figure 7A:
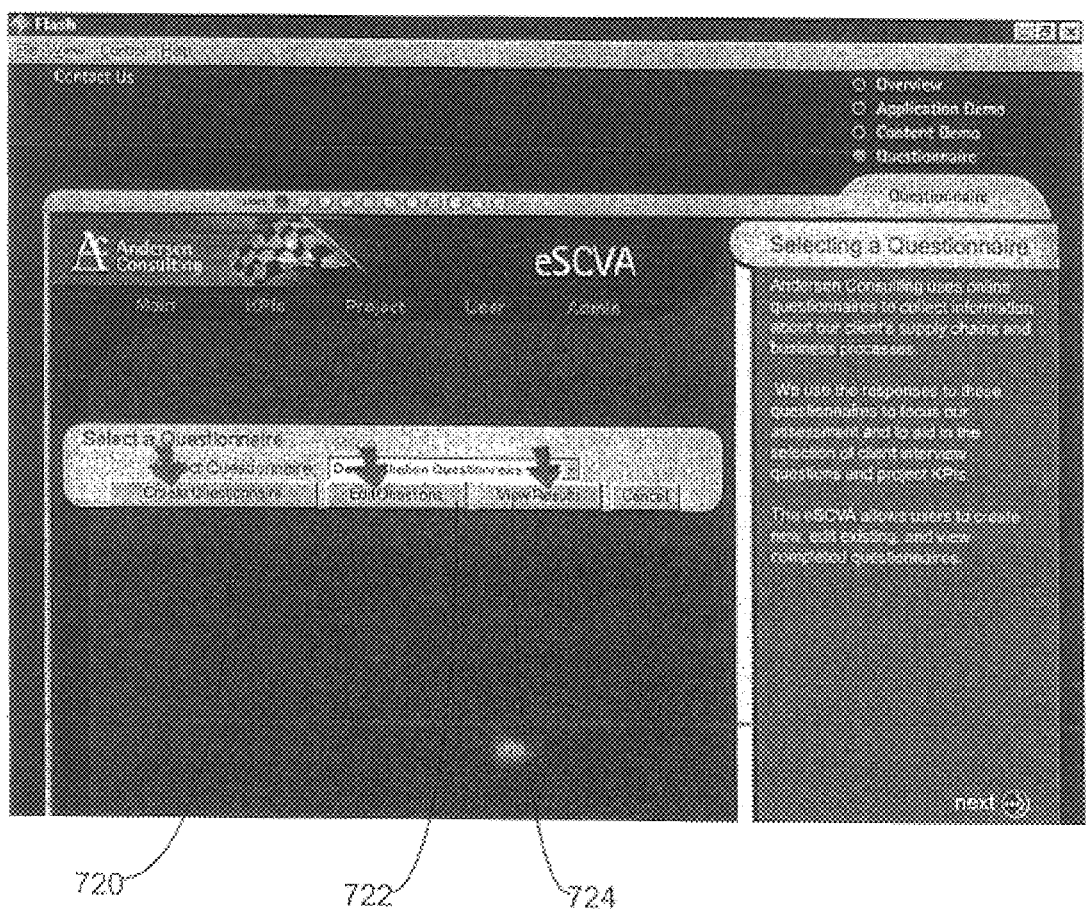
FIG. 7A illustrates an interface for selecting a questionnaire in accordance with an embodiment of the present invention.

FIG. 7A illustrates an interface for selecting a questionnaire in accordance with an embodiment of the present invention, as set forth in FIG. 7. The industry uses online questionnaires to collect information about client's supply chains and business processes. Users may utilize the responses to these questionnaires to focus assessment and to aid in the selection of client interview questions and project KPIs.

The present invention allows a user to create new, edit existing, and view completed questionnaires. A create questionnaire allows a user to create new questionnaires by clicking a button 720. An edit questionnaire button 722 may be clicked to modify existing questionnaires. A view results button 724 may also be clicked to view tabulated results for completed questionnaires.

Figure 7B:
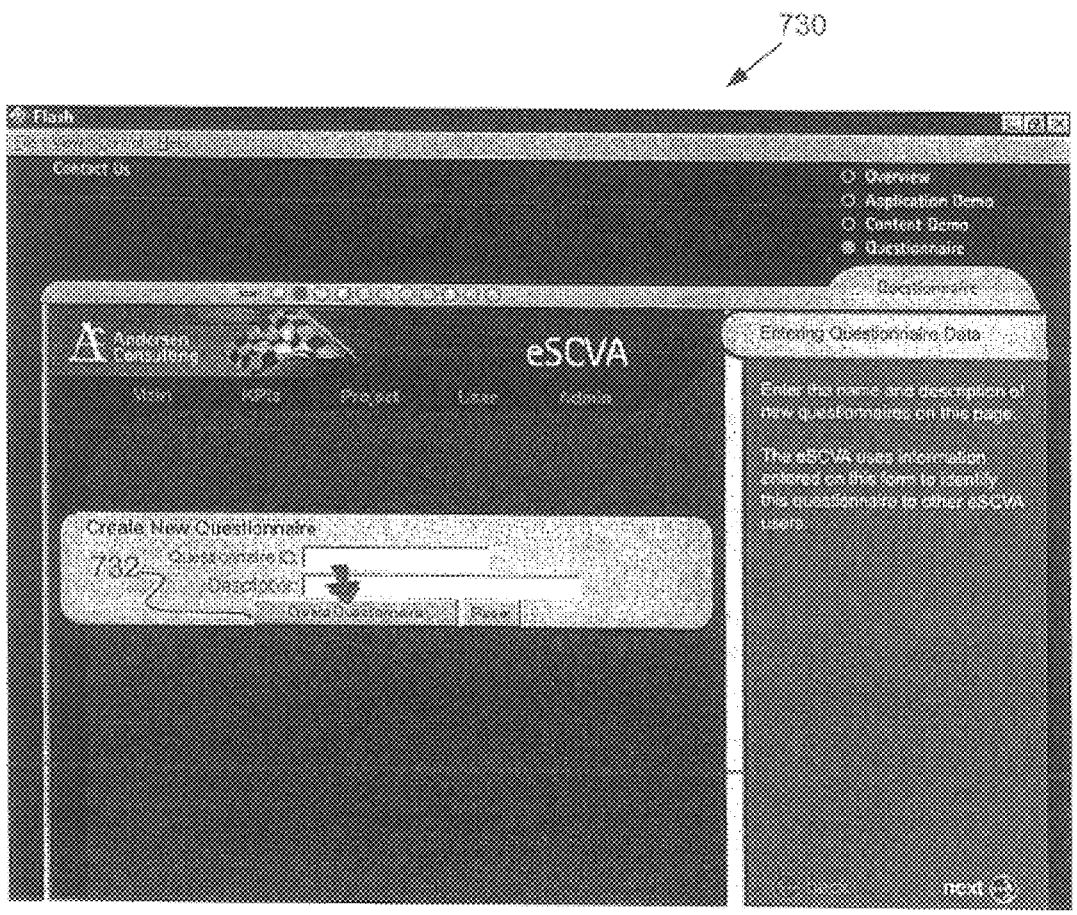
FIG. 7B illustrates an interface for entering questionnaire data in accordance with an embodiment of the present invention.

FIG. 7B illustrates an interface 730 for entering questionnaire data in accordance with an embodiment of the present invention. As shown, a user may enter the name and description of new questionnaires on this page. The present invention uses information entered on this form to identify this questionnaire to other users. A create questionnaire button 732 may be used to create a new questionnaire.

Figure 7C:
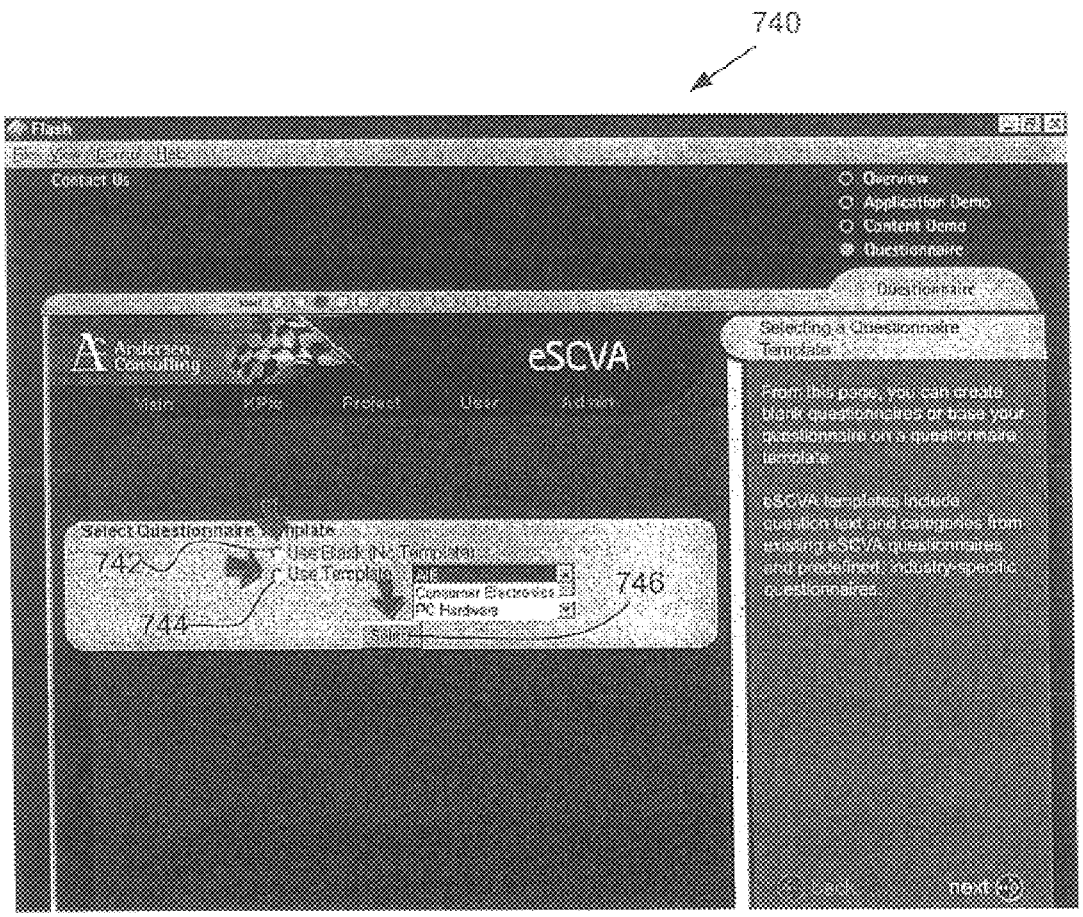
FIG. 7C illustrates an interface for selecting a questionnaire template to create blank questionnaires or base a questionnaire on a questionnaire template.

FIG. 7C illustrates an interface 740 for selecting a questionnaire template to create blank questionnaires or base a questionnaire on a questionnaire template. The templates include question text and categories from existing questionnaires and predefined, industry-specific questionnaires. A use blank radio button 742 may be used to create an unpopulated questionnaire. A use template radio button 744 may be used to create an empty template. A select button 746 may be used to move to the next page.

Figure 7D:
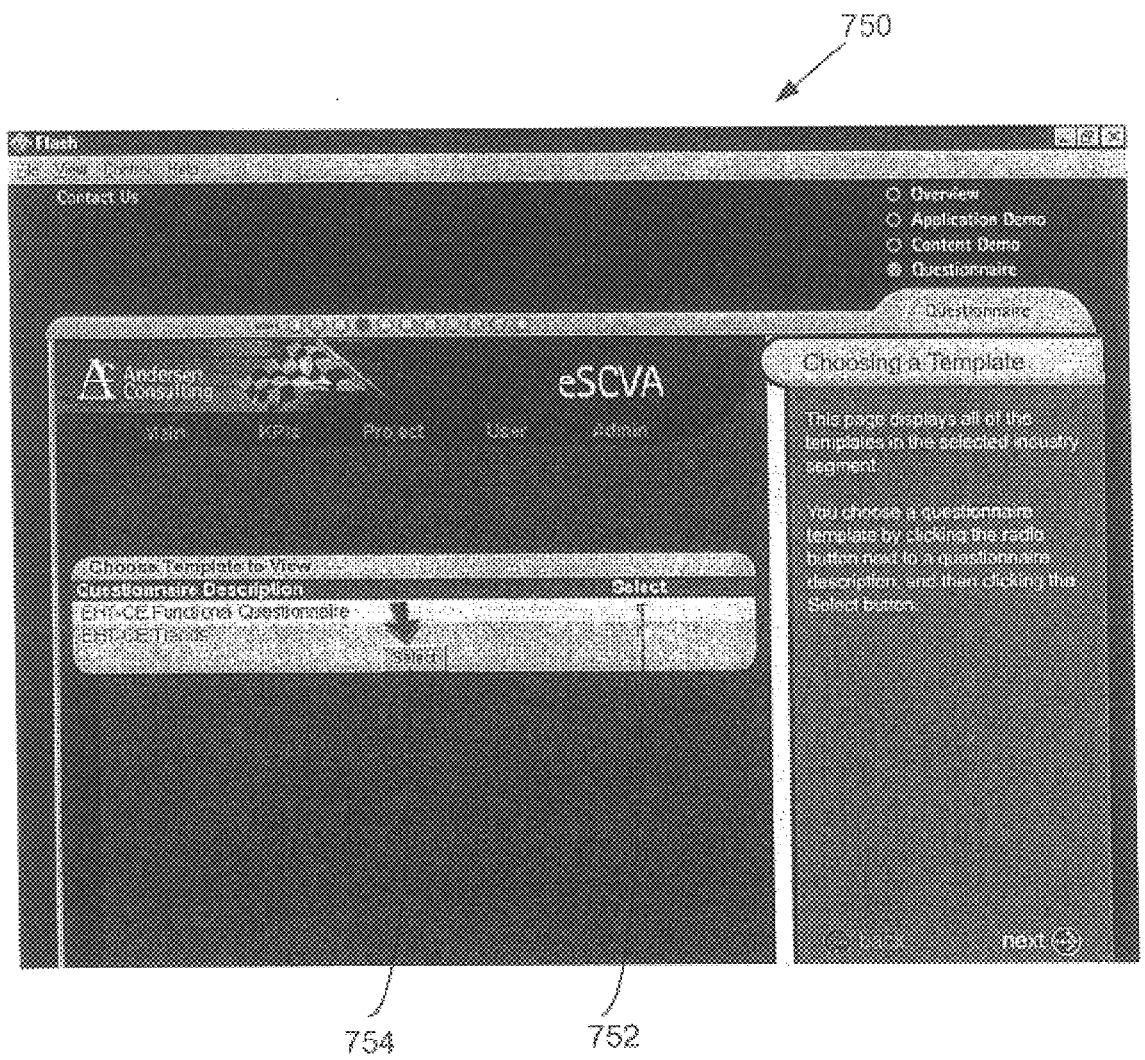
FIG. 7D illustrates an interface for choosing a template in accordance with one embodiment of the present invention.

FIG. 7D illustrates an interface 750 for choosing a template in accordance with one embodiment of the present invention. This page 750 displays all of the templates in the selected industry segment. One may choose a questionnaire template by clicking a radio button 752 next to a questionnaire description, and then clicking a select button 754.

Figure 7E:
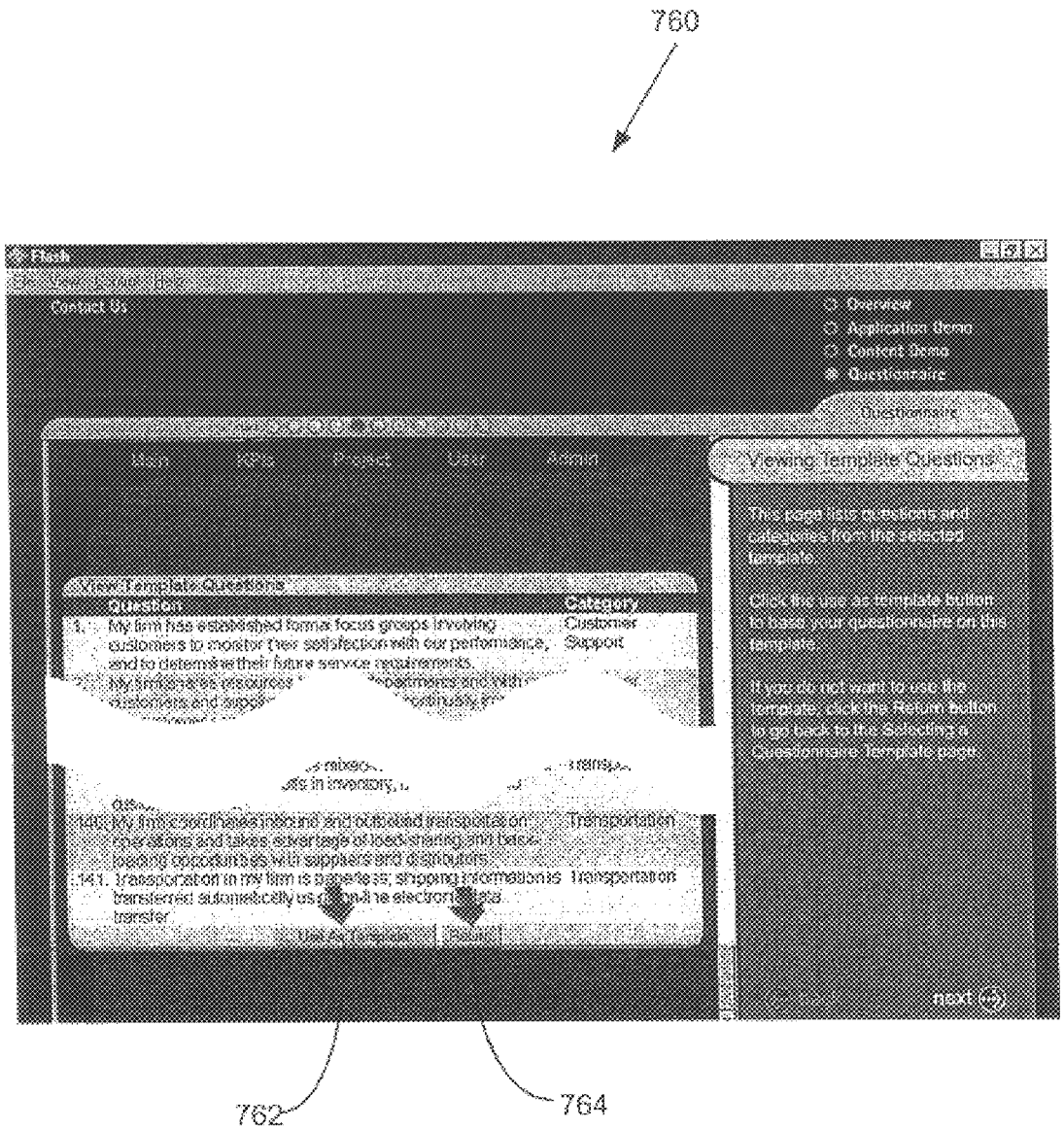
FIG. 7E illustrates an interface for viewing template questions in accordance with an embodiment of the present invention.

FIG. 7E illustrates an interface 760 for viewing template questions in accordance with an embodiment of the present invention. This page 760 lists questions and categories from the selected template. A user may click the use as template button 762 to base a questionnaire on this template. Also, if ones does not want to use the template, he or she may click the return button 764 to go back to the selecting a questionnaire template page of FIG. 7C.

Figure 7F:
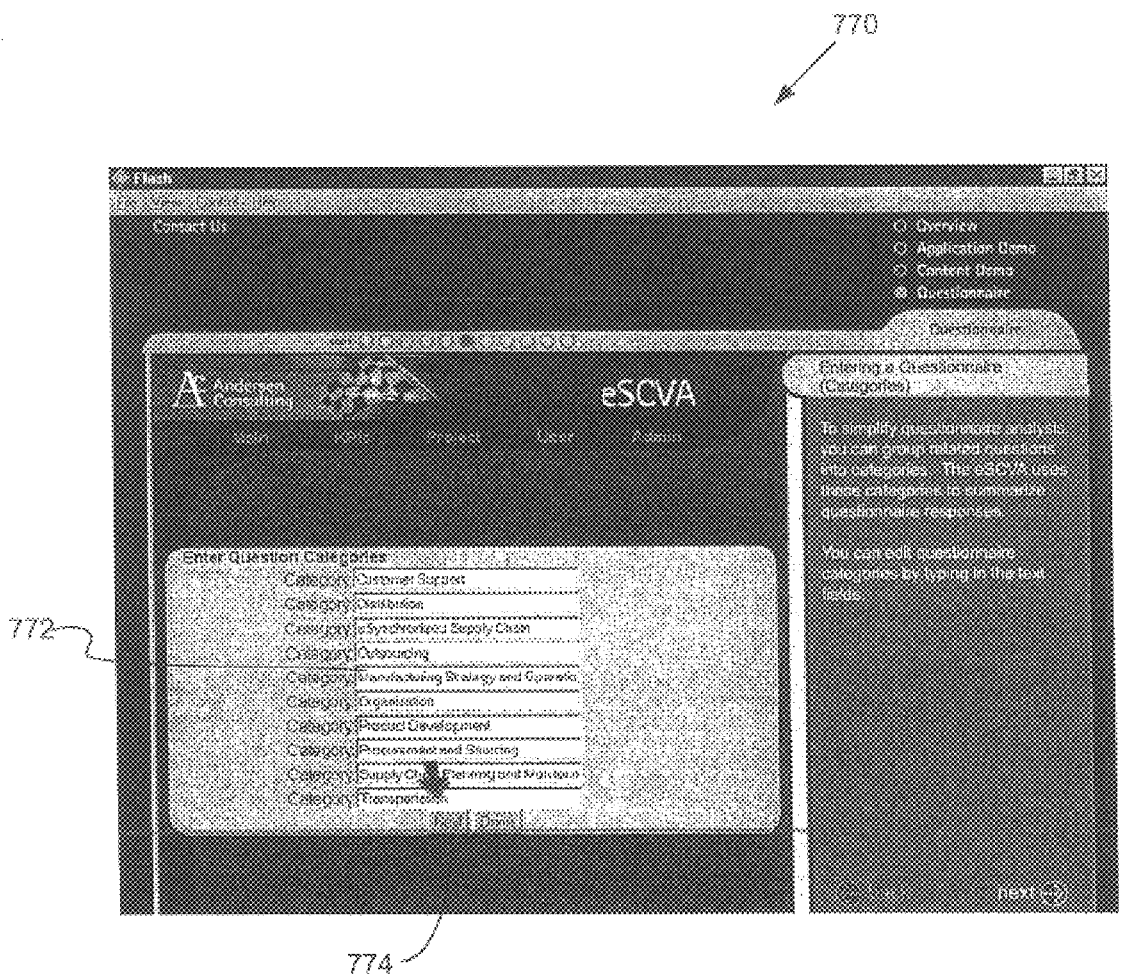
FIG. 7F illustrates an interface for entering a questionnaire (categories) in accordance with an embodiment of the present invention.
Figures 1, 7F:
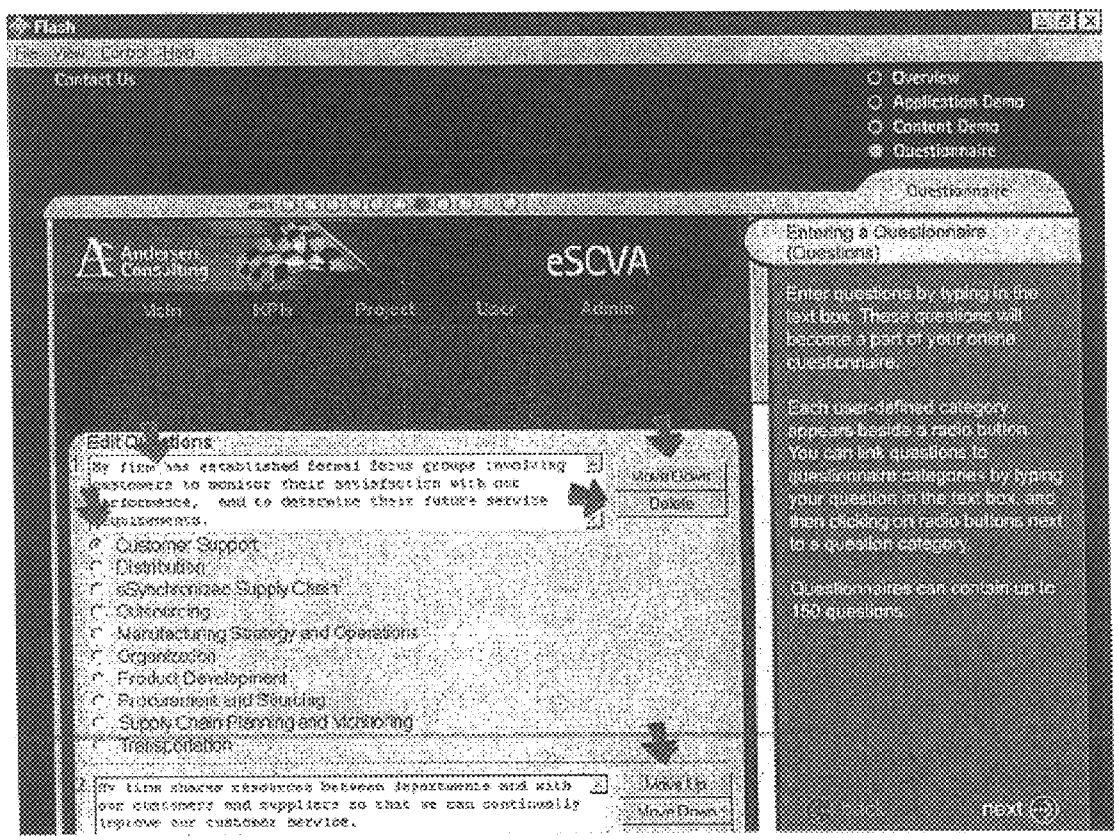

FIG. 7F illustrates an interface 770 for entering a questionnaire (categories) in accordance with an embodiment of the present invention. To simplify questionnaire analysis, one can group related questions into categories. The present invention uses these categories to summarize questionnaire responses. One can edit questionnaire categories by typing in the text fields 772. A next button 774 may be clicked to move to the questionnaire definition page.

FIG. 7F-1 illustrates an interface 775 for entering questions in accordance with one embodiment of the present invention. This is accomplished by typing in the text box. These questions become a part of the online questionnaire. A list of featured buttons is as follows:

Move Up:
    Click this button to reorder the question to the previous question number.
Move Down:
    Click this button to reorder the question to the next question number.
Delete:
    Click this button to remove the question from the questionnaire.
Text Box:
    One can add or edit questions in these text boxes.
Radio Buttons:
    Click this radio button to associate a question with a question category.

Figure 7G:
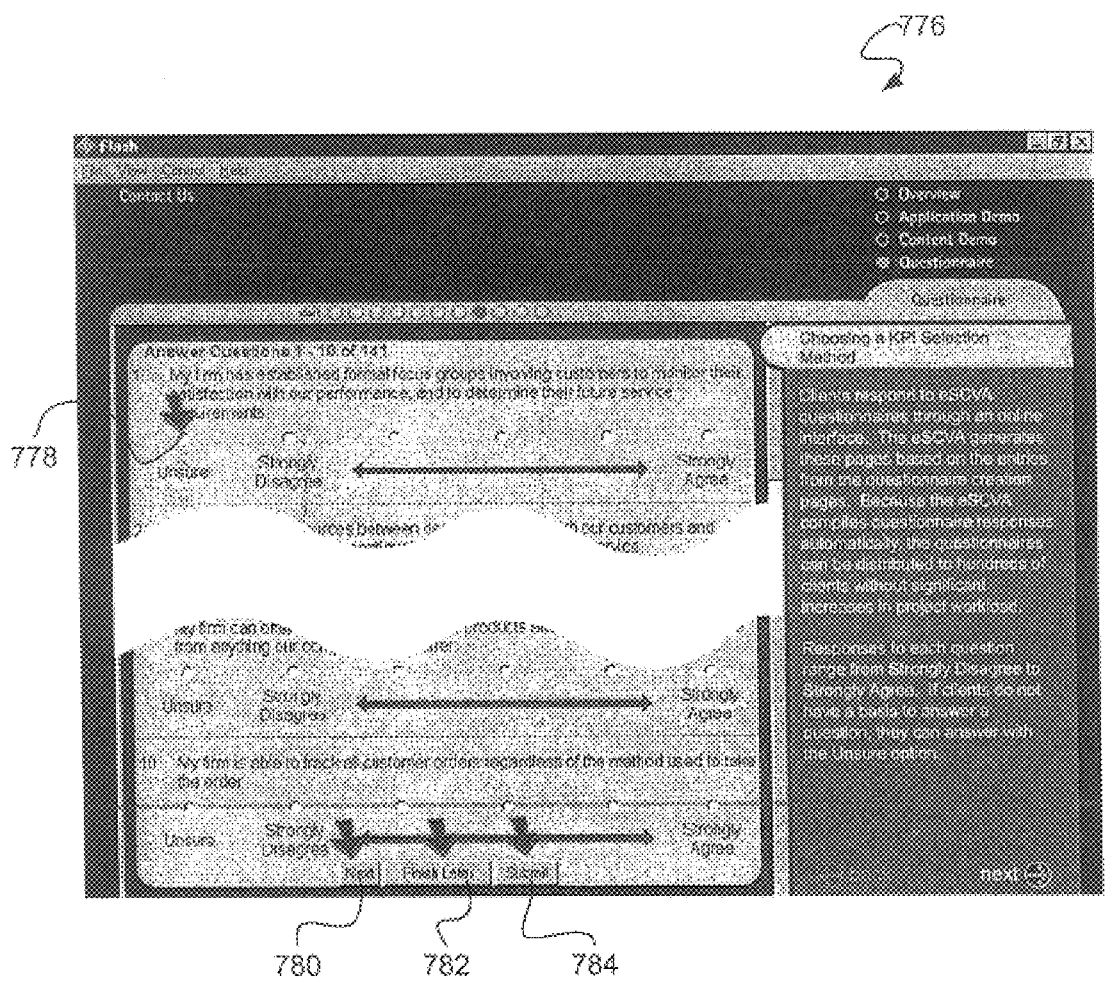
FIG. 7G illustrates an interface for choosing a key performance indicator selection method in accordance with an embodiment of the present invention.

FIG. 7G illustrates an interface 776 for choosing a key performance indicator selection method in accordance with an embodiment of the present invention. Clients respond to questionnaires through an online interface 776. The present invention generates these pages based on the entries from the questionnaire creation pages. Because the present invention compiles questionnaire responses automatically, the questionnaires can be distributed to hundreds of clients without significant increases in project workload.

Responses to each question range from Strongly Disagree to Strongly Agree. If clients do not have a basis to answer a question, they can answer with the Unsure option. A list of featured buttons is as follows:

Radio Buttons 778:
    Clients respond to the questionnaire by clicking on the radio buttons 778 beneath each question.
Navigation Buttons 780:
    Clients navigate through the questionnaire by clicking these buttons.
Finish Later Button 782:
    Click this button to save the question responses. This button gives one the option to work on the questionnaire at a later time.
Submit Button 784:
    Click this button to send and finalize questionnaire responses.

Figure 7H:
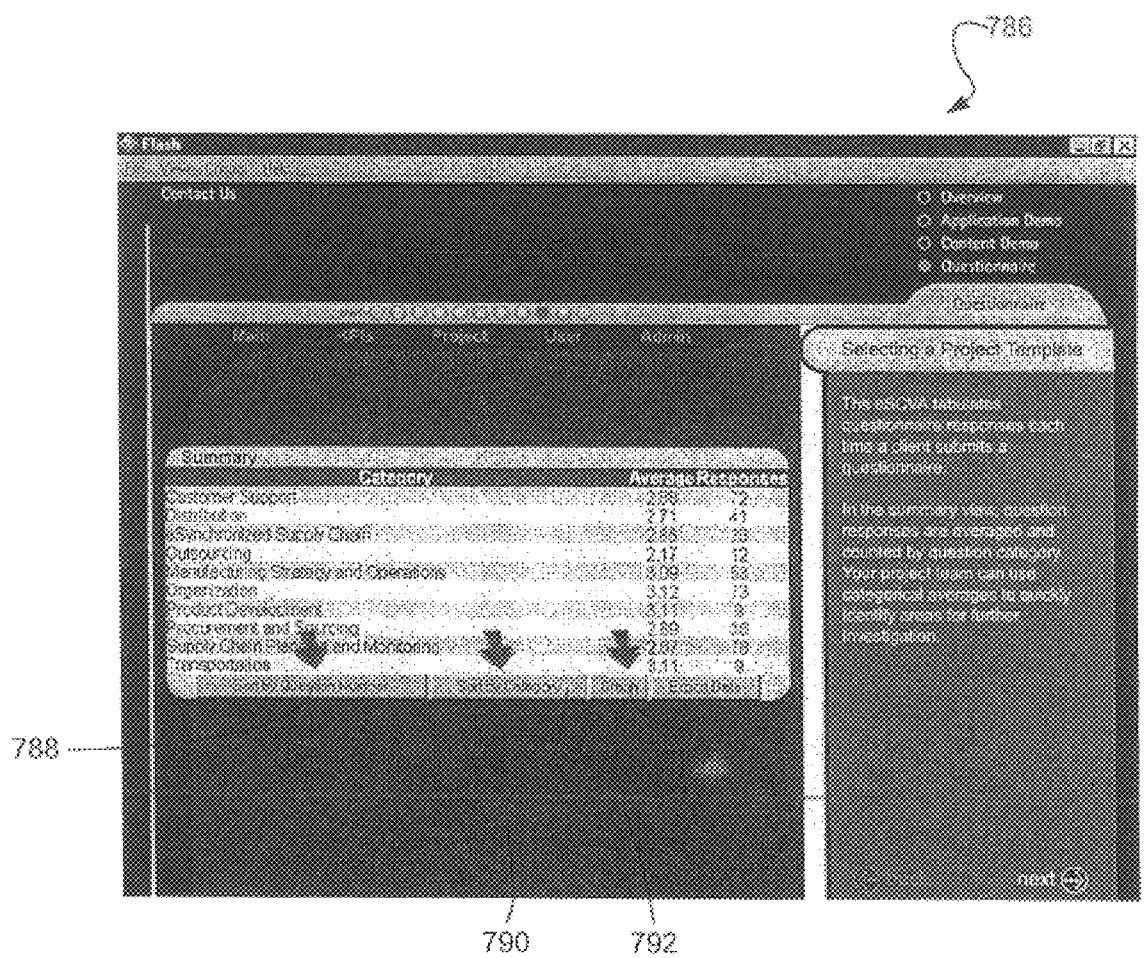
FIG. 7H illustrates an interface for selecting a project template in accordance with an embodiment of the present invention.

FIG. 7H illustrates an interface 786 for selecting a project template in accordance with an embodiment of the present invention. The present invention tabulates questionnaire responses each time a client submits a questionnaire.

In the summary view, question responses are averaged and counted by question category. A project team can use categorical averages to quickly identify areas for further investigation. A list of featured buttons is as follows:

Sort by Question Number Button 788:
    Click this button to display the results of each question ordered by question number.
Sort by Category Button 790:
    Click this button to display the results of each question ordered by question category.
Graph Button 792:
    Click this button to view graphs of the tabulated results.

Figure 8:
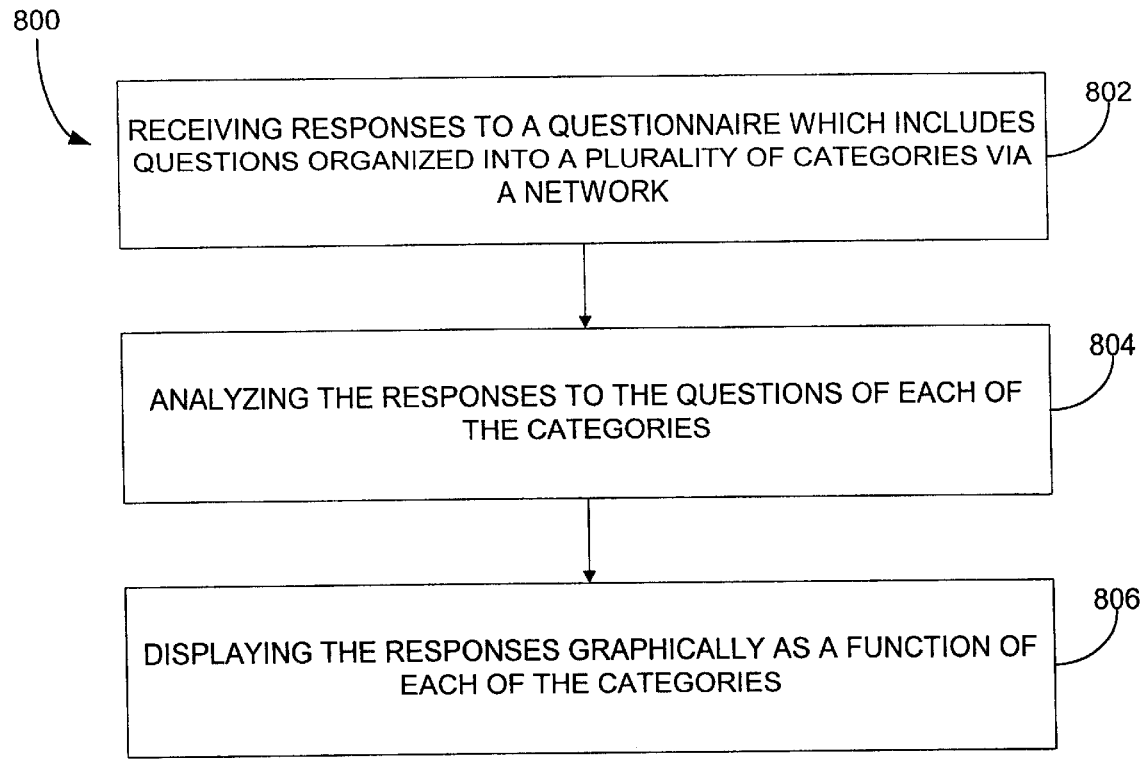
FIG. 8 is a flowchart illustrating a process for generating a questionnaire for assessment purposes in accordance with an embodiment of the present invention.

FIG. 8 is a flowchart illustrating a process 800 for viewing results of a questionnaire for assessment purposes in accordance with an embodiment of the present invention. In operation 802, responses to a questionnaire are received. Such questionnaire includes questions organized into a plurality of categories via a network. The responses to the questions of each of the categories are analyzed in operation 804. Then the responses are displayed graphically as a function of each of the categories in operation 806.

In one embodiment of the present invention, the assessment may be a supply chain value assessment. The responses may be displayed in the form of a chart. In another embodiment, the selection of one of the received questionnaires may be allowed for analysis purposes. The network may also include the Internet.

Figure 8A:
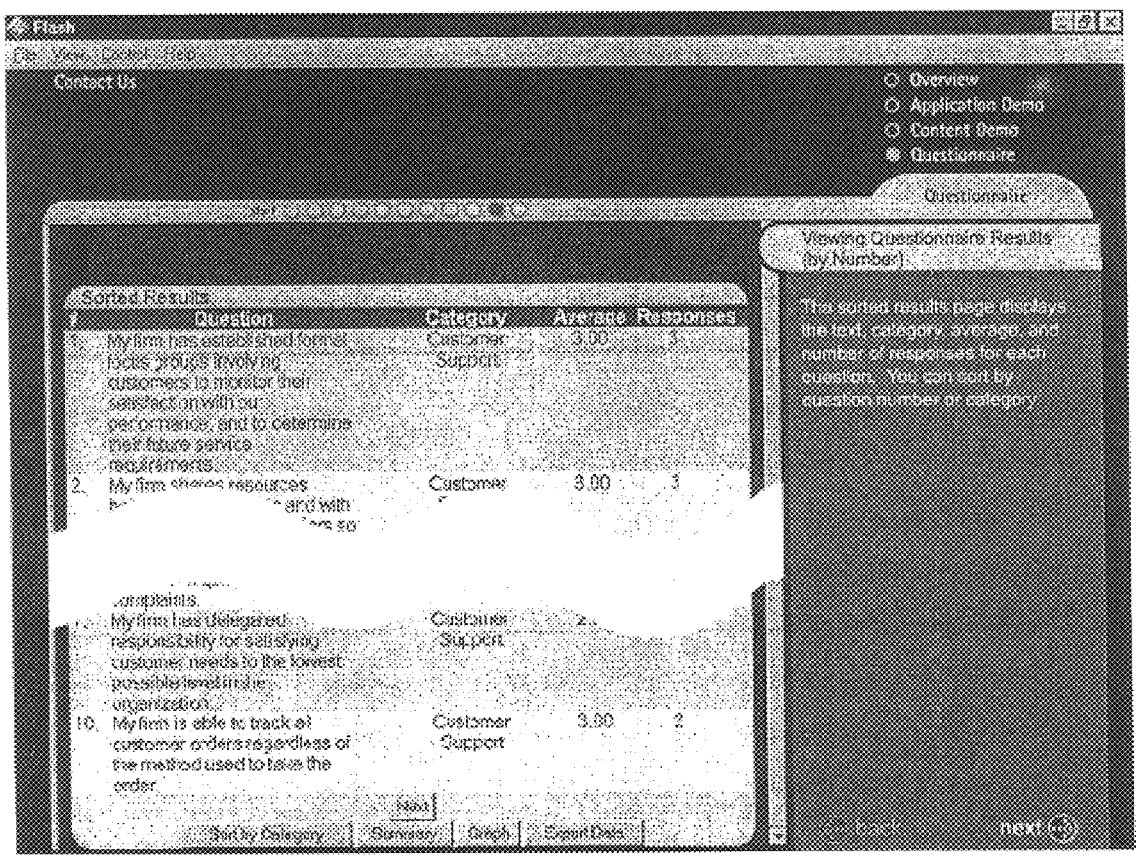
FIG. 8A illustrates an interface for viewing questionnaire results in accordance with an embodiment of the present invention.

FIG. 8A illustrates an interface 814 for viewing questionnaire results in accordance with an embodiment of the present invention. Note FIG. 8. The sorted results page displays the text, category, average, and number of responses for each question. One can sort by question number or category.

Figure 8B:
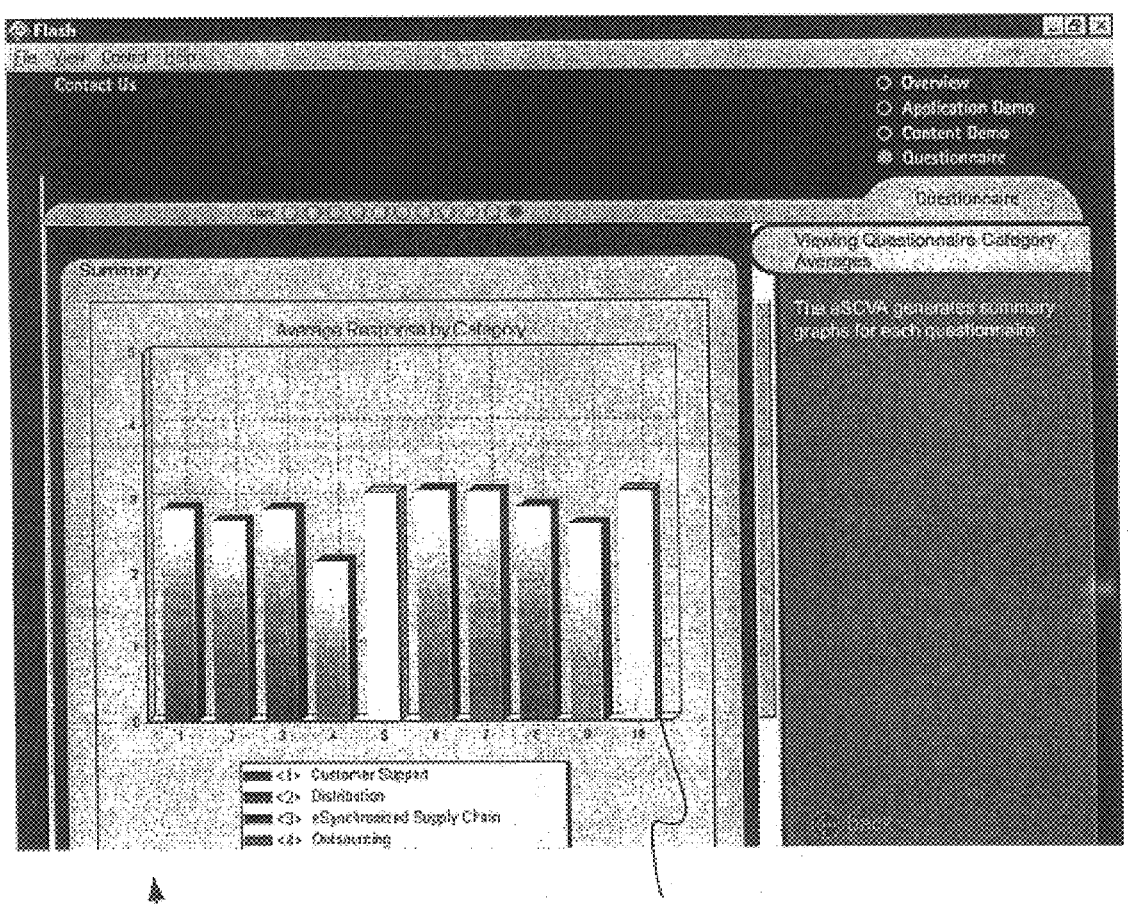
FIG. 8B illustrates an interface for viewing questionnaire category averages in accordance with an embodiment of the present invention.
Figure 9:
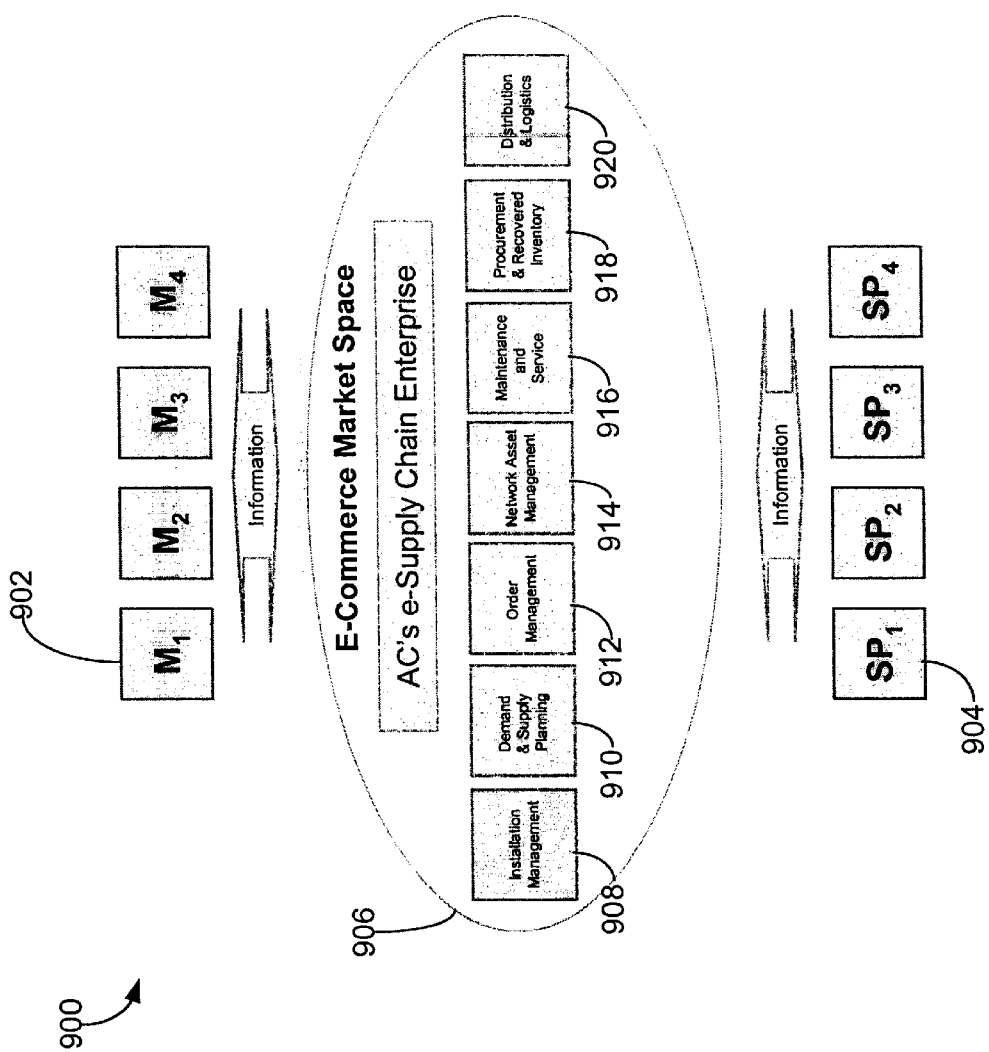
FIG. 9 illustrates an embodiment of a system for combined industry supply management between one or multiple manufacturers and one or many service providers and/or vendors and/or resellers.

FIG. 8B illustrates an interface 816 for viewing questionnaire category averages in accordance with an embodiment of the present invention. As illustrated in FIG. 8B, the present invention generates at least one summary graph 818 for each questionnaire and then displays the generated graph 818 on the interface 816. An exemplary supply chain model associated with the foregoing value assessment framework will now be set forth. FIG. 9 illustrates an illustrative embodiment of a system 900 for combined industry supply management between one or multiple manufacturers 902 and one or many service providers 904 and/or vendors and/or resellers, etc. For clarity, the majority of the following discussion will discuss service providers, but it should be kept in mind that the present invention will operate equally well with vendors, resellers, etc.

In more detail, the present invention manages the supply chain between the manufacturer(s) and service provider(s). The industry supply management is centralized in an eCommerce Market Space 906, which includes components that manage end-to-end supply chain information such as demand planning, order fulfillment, scheduling, inventory, etc. In embodiments of the present invention in which multiple manufacturers and service providers participate, some of the benefits of the present invention include: economies of scale are enabled, rationalization of procurement and inventory, rationalization of distribution and logistics facilities, and facilitation of the development of an industry-wide standard. More benefits will be set forth below in the discussion of FIG. 12.

Preferably, the group of manufacturers of such a system each hiss a common logistics profile and limitations. The manufacturers may focus on production core competence and would also be responsible for strategic and tactical optimization of network assets.

Also preferably, the group of service providers has common network profiles. The service providers may focus on customers, new businesses and channels, etc. Further, under the system of the present invention, the service providers would be allowed to migrate from operations focus to strategic technology and market management.

The components may include some or all of an installation management component 908, a demand and supply component 910, an order management component 912, a network asset management component 914, a maintenance and service component 916, a procurement and recovered inventory component 918, and/or a distribution and logistics component 920.

Figure 10:
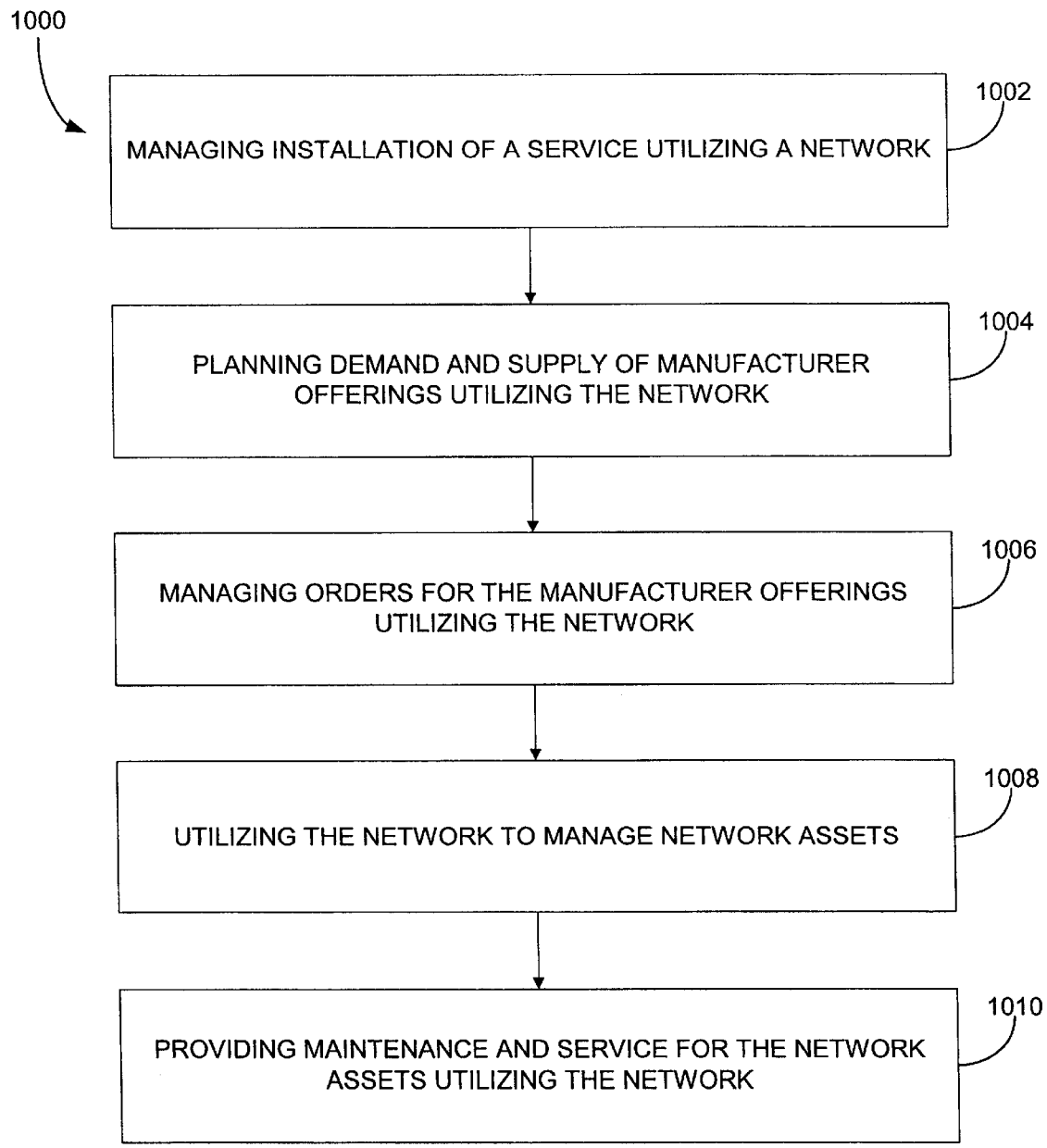
FIG. 10 is a flowchart for a process for affording a network-based supply chain framework in accordance with an embodiment of the present invention.

FIG. 10 illustrates a flowchart for a process 1000 for affording, a network-based supply chain framework in accordance with an embodiment of the present invention. Installation of a service is managed utilizing a network in operation 1002. Demand and supply of manufacturer offerings are planned utilizing the network in operation 1004 and orders for the manufacturer offerings are also managed utilizing the network in operation 1006. The network is also utilized to manage network assets including providing maintenance and service for the network assets utilizing the network (see operations 1008 and 1010).

Benefit Areas

Figure 11:
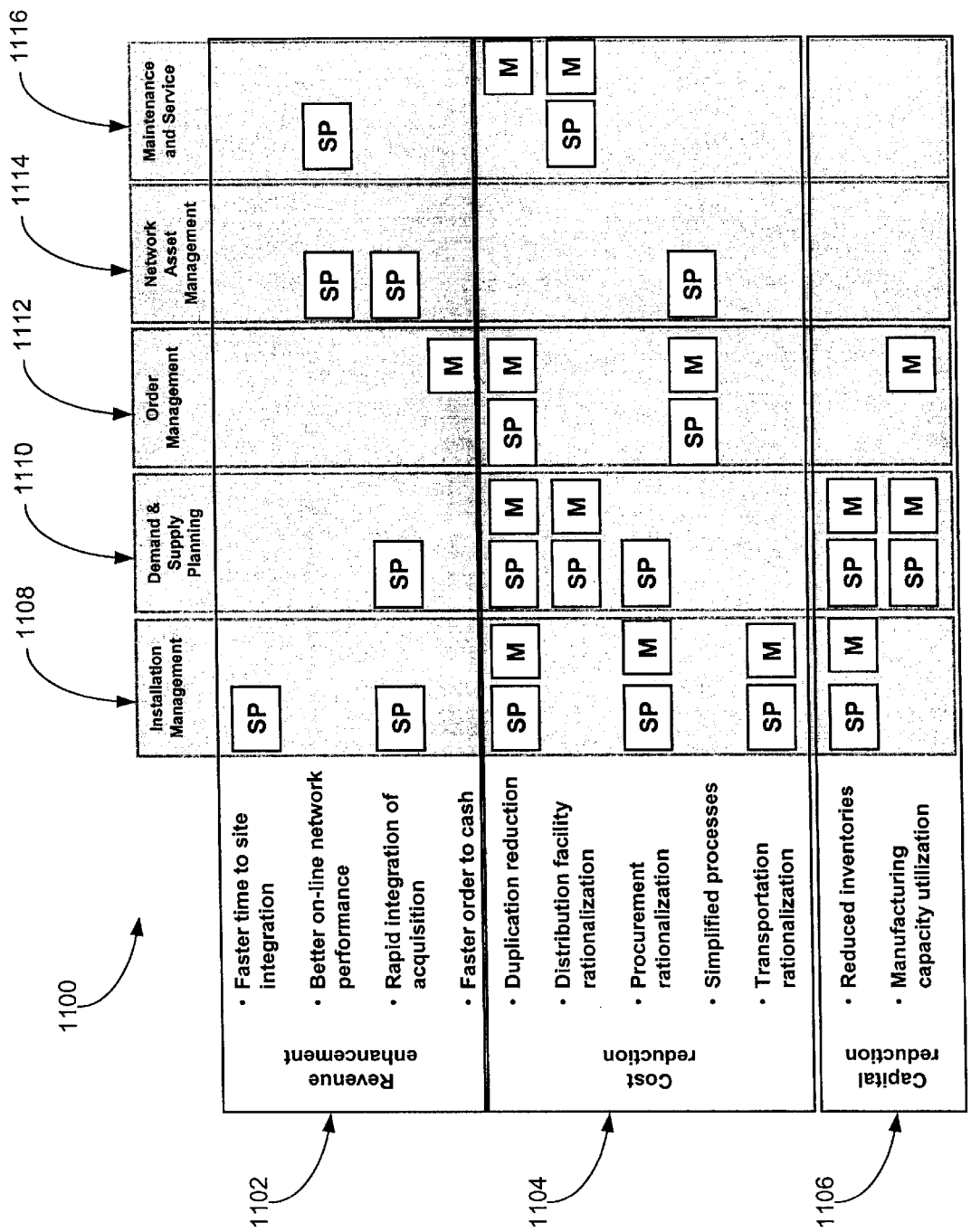
FIG. 11 is a chart illustrating the relations between benefit areas and components of the e-Commerce Market Space in accordance with an embodiment of the present invention.

FIG. 11 is a chart 1100 illustrating the relations between benefit areas and components of the e-Commerce Market Space in accordance with an embodiment of the present invention. The benefit areas include a revenue enhancement benefit area 1102, a cost reduction benefit area 1104, and a capital reduction benefit area 1106.

Each benefit area includes a number of associated benefits. Illustrative benefits associated with revenue enhancement 1102 include: (a) faster time to site integration; (b) better on-line network performance; (c) rapid integration of acquisition; and (d) faster order to cash. Illustrative benefits associated with cost reduction 1104 include: (a) duplication reduction; (b) distribution facility rationalization; (c) procurement rationalization; (d) simplified processes; and (e) transportation rationalization. Illustrative benefits associated with capital reduction 1106 include: (a) reduced inventories; and (b) manufacturing capacity utilization.

FIG. 11 also includes a plurality of columns for various components of the present invention. These columns may include an Installation Management component column 1108, a Demand and Supply Planning component column 1110, an Order Management component column 1112, a Network Asset Management component column 1114, and a Maintenance and Service component column 1116.

Displayed under each column in FIG. 11 are rectangular boxes that each has either a "SP" or an "M" displayed inside them. The "SP" boxes indicate that a particular benefit for that particular component may be attributed to a service provider. The "M" boxes indicate that a particular benefit for that particular component may be attributed to a manufacturer.

As an example, in an illustrative embodiment of the present invention, the Installation Management component, may include the following benefits to the service provider by looking at FIG. 11 in closer detail: faster time to site integration, rapid integration of acquisition, duplication reduction, procurement rationalization, transportation rationalization, and reduced inventories. In this illustrative embodiment, the Installation Management component may also include the following benefits to the manufacturer: duplication reduction, procurement rationalization, transportation rationalization, and reduced inventories.

With continuing reference to FIG. 11, in this illustrative embodiment of the present invention, benefits for the service provider under the Demand and Supply Planning component may include the following: rapid integration of acquisition, duplication reduction, distribution facility rationalization, procurement rationalization, reduced inventories, and manufacturing capacity utilization. Further, benefits for the manufacturer under the Demand and Supply Planning component in this illustrative embodiment of the present invention may include the following: duplication reduction, distribution facility rationalization, reduced inventories, and manufacturing capacity utilization.

With regards to the Order Management component for this illustrative embodiment, benefits for the service provider may include the following (as illustrated in FIG. 11): duplication reduction, and procurement rationalization. Benefits for the manufacturer under the Order Management component in this illustrative embodiment of the present invention may include: faster order to cash, duplication reduction, simplified processes, and manufacturing capacity utilization.

Turning now to the Network Asset Management component column, benefits for the service provider for the Network Asset Management component may include: better on-line network performance, rapid integration of acquisition, and simplified processes.

Lastly, in this illustrative embodiment of the present invention, benefits for the service provider under the Maintenance and Service component may include: better on-line network performance, and distribution facility rationalization. Benefits for the manufacturer under the Maintenance and Service component may include: duplication reduction, and distribution facility rationalization.

Figure 12:
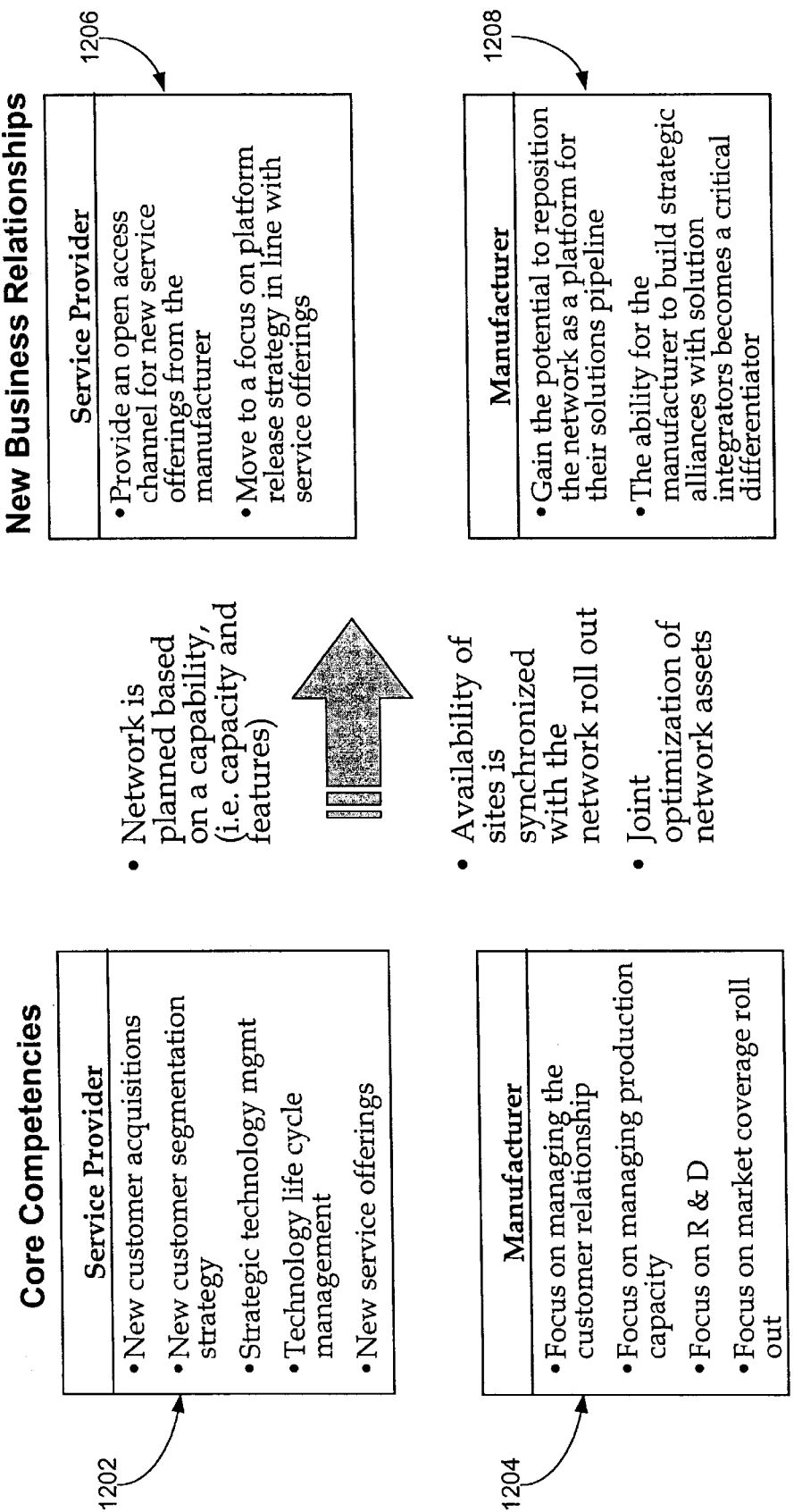
FIG. 12 is a schematic illustration of the relationship between areas of core competence of both operators and manufacturers for creating an environment for new business relationships in accordance with an embodiment of the present invention.

FIG. 12 is a schematic illustration of the relationship between areas of core competence of both operators and manufacturers for creating an environment for new business relationships in accordance with an embodiment of the present invention. In such an embodiment, core competencies of a service provider 1202 may include: new customer acquisitions, new customer segmentation strategy, technology life cycle management, and new service offerings. Core competencies of a manufacturer 1204 may include: focus on managing the customer relationship, focus on managing production capacity, focus on research and development ("R&D"), and focus on market coverage roll out. In such an embodiment, the network may be planned based on a capability, such as capacity and features. Availability of sites may be synchronized with the network roll out and network assets may be jointly optimized.

With continuing reference to FIG. 12, the creating of an environment for new business relationships with respect to the service provider 1206 provides an open access channel for new service offerings from the manufacturer so that focus may be moved on a platform release strategy in line with service offerings. The environment for new business relationships with respect to the manufacturer 1208 may allows for the gaining of the potential to reposition the network as a platform for their solutions pipeline where the ability for the manufacturer to build strategic alliances with solution integrators becomes a critical differentiator.

Figure 13:
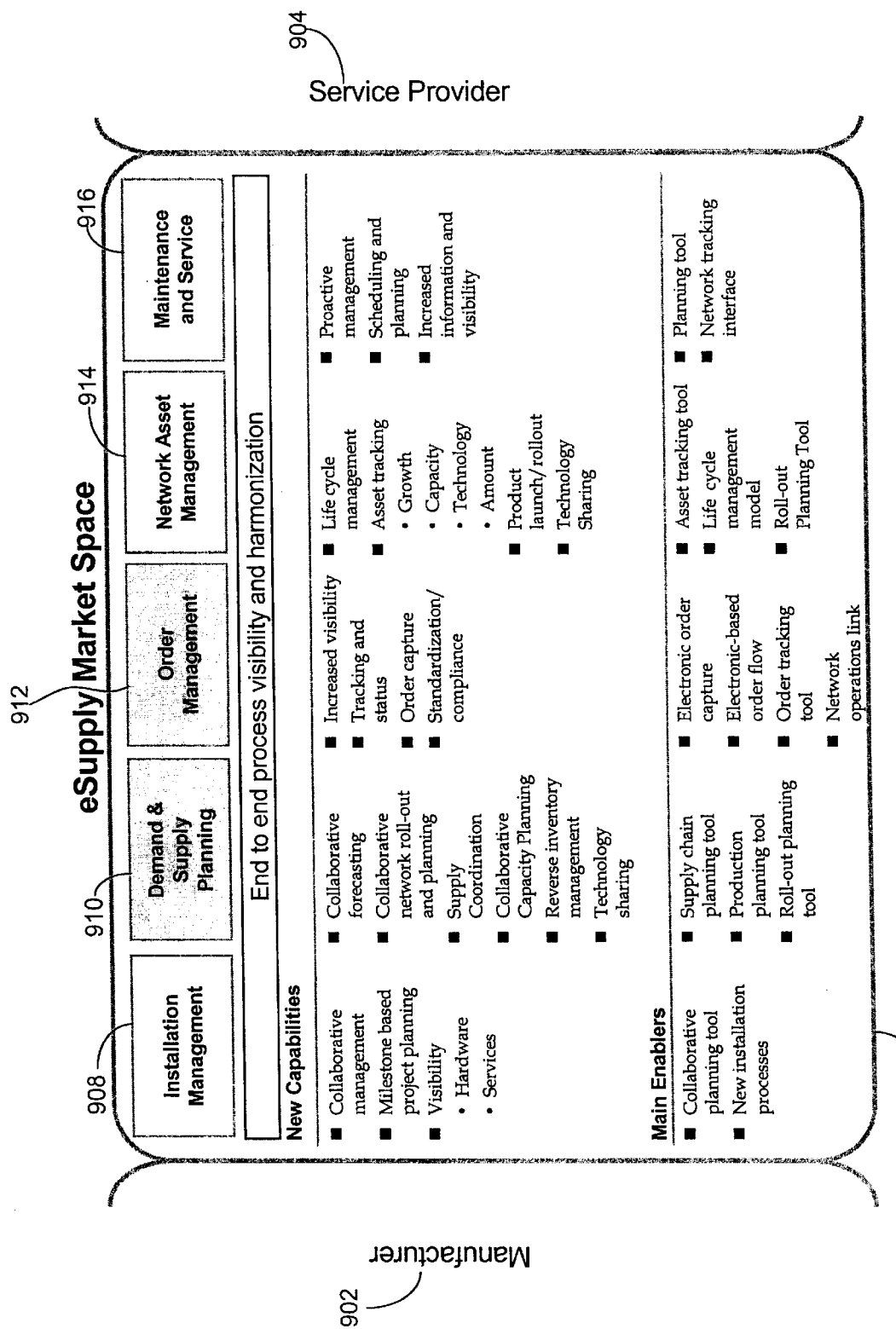
FIG. 13 illustrates some of the components in the eCommerce Market Space and illustrative capabilities of the components.

FIG. 13 illustrates some of the components in the eCommerce Market Space and illustrative capabilities of the components.

Installation Management 908

Figure 14:
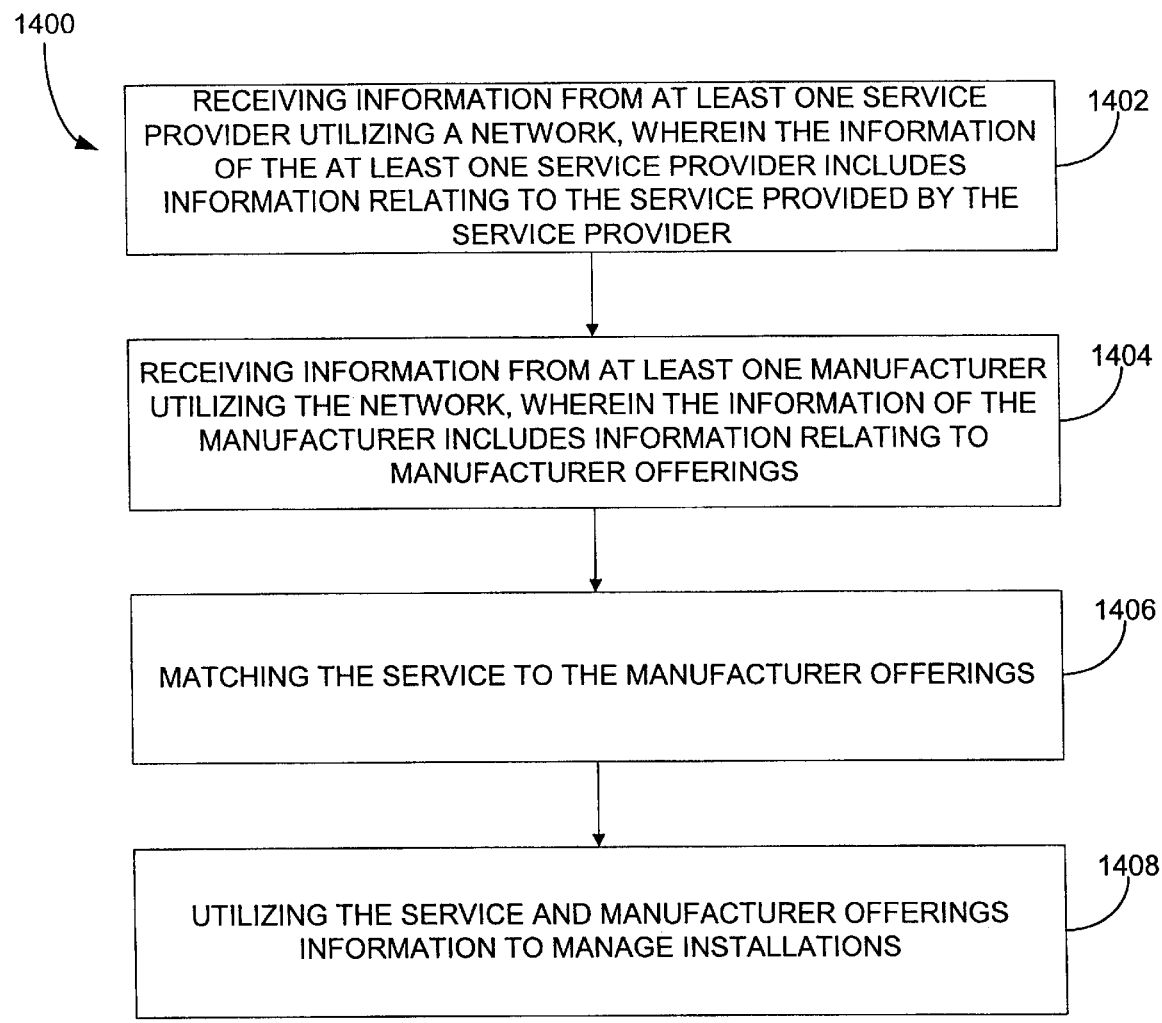
FIG. 14 is a flowchart illustrating a methodology for installation management utilizing a network in accordance with an embodiment of the present invention.

FIG. 14 illustrates a flowchart for a methodology 1400 for installation management utilizing a network in accordance with an embodiment of the present invention. In operation 1402, information is received from at least one service provider utilizing a network. This information includes information relating to the service provided by the service provider. Also received utilizing the network is information from at least one manufacturer in operation 1404. This information includes information relating to manufacturer offerings. The service is matched in operation 1406 to the manufacturer offerings and the service and manufacturer offerings information are utilized to manage installations in operation 1408.

In an embodiment of the present invention, collaboration between the matched service provider and the manufacturer may also be managed. In such an embodiment, the management of collaboration may include facilitating the transmitting of information between the matched service provider and the manufacturer utilizing the network. In an aspect of this embodiment, a collaborative planning tool may be provided for managing the collaboration between the matched service provider and the manufacturer.

In another embodiment of the present invention, milestone based project planning may be facilitated between the matched service provider and the manufacturer. In a further embodiment, the manufacturer offerings of the matched manufacturer may be displayed to the matched service provider and services provided by the matched service provider may be displayed to the matched manufacturer utilizing the network.

In an aspect of the present invention, the information of the manufacturer may include information relating to the availability of the manufacturer offerings. In such an aspect, the service provider may be notified of the availability of the manufacturer offerings that match the service installation information.

In one example of the present invention particularly applicable to installation of communication lines between telecommunications providers and their suppliers, a method is provided for use in cooperation with a computer having memory in a Synchronous Optical Network (SONET) for generating an optimized transition plan for the placement of Self-Healing Rings (SHR) and the routing of point-to-point demand in accordance with projected customer demand over a selected multi-period time interval.

SONET is both a standard and a set of specifications for building high speed, digital communications networks that run over fiber optic cables while interfacing with existing electrical protocols and asynchronous transmission equipment. Fiber optics has revolutionized telecommunications in view of the large bandwidth availability (currently estimated in the hundreds of gigabits per second) which continues to increase with technological advances such as wave-division multiplexing and similar developments in light polarization and dispersion-shifted fibers.

As those skilled in the art will recognize, SONET specifies a digital hierarchy based on Optical Carrier (OC) rather than electrical levels. SONET does define Synchronous Transport Signals (STS), however, which are electrical interfaces used as the multiplexing mechanisms within SONET Network Elements (NE). Network elements combine STS-1s as needed up to STS-N where N is the number of STS-1s, then convert the total electrical multiplex to an optical carrier and transmit it over optical fiber. SONET is multiplexed at the byte level, allowing services to be dynamically placed into the broadband STS for transport. The basic SONET of 64 Kbps per byte is the same speed as the conceptual voice channel DS0 allowing SONET to easily integrate all currently used digital services into the optical hierarchy.

One of the principal benefits of SONET is that it allows for the direct multiplexing of current network services, such as DS1, DS1C, DS2, and DS3 into the synchronous payload of STS-1. As those skilled in the art will recognize, the above rates, as in the case of most defined rates, were developed based on existing transmission systems. For example, the DS1 and DS2 signal rates (1.544 million bits per second and 6.312 million bits per second) are the transmission rates of the T1 and T2 wire pair carrier systems. Initially, one multiplexer, called an M12, was used to combined four DS1 channels into a DS2, and a second multiplexer, called an M23, was used to combine seven DS2 channels into a DS3. Presently, most networks use a single multiplexer termed an M13, which combines twenty-eight DS1 channels into a DS3. Of course, one of the key attributes of these previous multiplexer designs is that they permit DS1 signals to be timed independently, i.e. asynchronous multiplexing. Bits can therefore be sent at different transmission rates because individual channels need not be synchronized to a common timing source.

The asynchronous DS3 multiplexing standard was implemented in the days when most networks utilized analog technology and the few digital systems in existence generated their own clocking systems. Significantly, the transmission specifications for DS1 signals specify that the bit rate is 1.544 million bits per second, plus or minus 75 bps. To compensate for this range, additional bits must therefore be "stuffed" into each DS1 signal before they are multiplexed to a higher rate. Again, as those skilled in the art will recognize, while bit stuffing supports independently clocked input signals, it also makes it nearly impossible to locate individual DS1 or DS0 channels within a DS3 bit stream. To extract a single channel, a DS3 signal would need to first be demultiplexed through M13 components into twenty-eight DS1s before the channels could be switched or rearranged. As a result, the process of adding or deleting channels is expensive.

In contrast to asynchronous multiplexing, the SONET standard defines a viable alternative which supports greater capacity and efficiency. In the SONET multiplexing format, the basic signal transmission rate—STS-1—operates at 51.84 million bits per second. AN STS-1 can carry 28 DS1 signals or one asynchronous DS3. STS-1 signals are then multiplexed to produce higher bit rates—STS-2, STS-3, etc. As referenced above, the other term used to define the SONET signal levels is optical carrier. The bit rates are the same in each case, so the bit rate of the STS-1 equals the bit rate of the OC-1. The only difference is the type of signal that is being referenced. For example, if the signal is in an electrical format, it is referred to as an STS. Similarly, if the signal is in an optical format—compatible with a fiber medium—it is referred to as an OC.

The SONET standards define an alternative to asynchronous DS3 multiplexing, which describes how to divided STS signals into lower speed increments, i.e. virtual tributaries. The major advantage of synchronous multiplexing is that when DS1 and other low-speed channels are multiplexed directly into the STS format, the lower speed channels can be identified and reconfigured for drop-and-insert. As a result, the drop-and-insert process can be done simpler with less expense of hardware then the back-to-back M13 multiplexers used in asynchronous multiplexing.

Because of the large bandwidth availability in fiber, and the growing volume of data traffic, disruptions from link and node failures due to cable cuts, for example, become increasingly serious. Network survivability has therefore become a major concern for SONET designers and has fueled interest in what is known in the art as "ring" architectures. Such architectures take advantage of the capability provided by synchronous multiplexing in SONET to eliminate the need to backhaul traffic to central hubs. Thus, at each switching office, the SONET transport node directly accesses the required time slots in the bit stream through the use of modified Add-Drop Multiplexers (ADM). The SONET ring topology permits the creation of highly survivable networks which are viewed in the communications industry as essential for obtaining business for critical data communications.

In most cases, the deployment of SONET rings results in cost savings since it is far less expensive for carriers to install a fiber ring then to deploy point-to-point links. Consider, for example, a rural route, where linking remote terminals to a central office in a point-to-point application would require six multiplexers—one at each site and at the Central Office (CO) for each route—and six fibers, two to each site. In a ring topology, all that is required is one multiplexer at the CO and two fibers that go through a multiplexer at each site for a total of four multiplexers and two fibers. Significantly, in the ring topology, working or service traffic is routed in one direction only. If that fiber fails, traffic is rerouted on a protection fiber to flow in the opposite direction. In this manner, working traffic bypasses the failure to get to its proper destination.

Against this background, it is readily seen that there is significant debate in the communications industry regarding the type and location of rings, and in particular, Self-Healing Rings (SHR) to deploy. As those skilled in the art will recognize, the directionality of service routing and the protection mechanism are key attributes that distinguish different self-healing ring architectures. For example, a unidirectional ring routes service traffic in only one direction of the ring. On the other hand, a bidirectional ring routes the components of a duplex circuit in opposite directions on the ring. Similarly, in a path-switched ring, traffic is protected on a per path basis, and the switching is based on the health of each individual path where it exits the ring. Still further, in a line-switched ring, switching is based on the health of the line between each pair of nodes. Thus, when a line is faulty, the entire line is switched off to a protection loop at the failure's boundaries.

The method and system of this example of the present invention utilizes selected mixed-integer programs to efficiently model the information obtained during the iterative steps of the present invention in cooperation with a computer having sufficient memory. Such steps include the determination of nodes within the SONET under review, identification of the number of periods within the selected time interval, the determination of demand between nodes over this time period, preferably in units of DS3, and the determination of discounted add-drop costs for a plurality of selected Add/Drop Multiplexers (ADM's) and related components based upon projected availability. If the number of nodes under review is small, once this information is determined, then the optimized discounted fixed and interconnection costs for this plurality of ADM's may be determined in accordance with a first selected mixed integer program. An electrical signal may thereafter be generated for receipt by the computer memory corresponding to a set of logical self-healing rings with preliminary, albeit detailed, routing information. In contrast, when the number of nodes under review is large, a heuristic approach is required.

In the heuristic approach, the user is required to load traffic to existing rings by repetitively identifying the smallest point-to-point demand between nodes on existing rings and assigning this demand to the rings until no demand left may be routed. Thereafter, a proposed ring is created by identifying the greatest unsatisfied point-to-point demand between two adjacent nodes and assigning the nodes to the ring. At this point, new proposed rings may either be randomly generated until all demand has been satisfied or, in the alternative, existing rings may be expanded. If the latter step is selected, expansion is carried out by repetitively calculating the largest unsatisfied demand of neighbor nodes for each of the proposed rings and identifying a plurality of neighbor nodes having the greatest unsatisfied demand. At that point, a determination may be made regarding the deficit of each of the proposed rings as well as the identification of a plurality of proposed rings with the greatest deficit.

Finally, one of the rings with the greatest deficit may be assigned to one of the neighbor nodes and inter-ring traffic may be loaded until all demand has been routed. Traffic is loaded through a process of repetitively identifying demand that can be routed the greatest distance through the smallest number of proposed rings and assigning that demand accordingly. At this point, an electrical signal is summarily generated also for receipt by said computer memory and corresponding to a set of logical self-healing rings with preliminary routing information.

Once logical rings have been determined, whether in accordance with a mixed integer program or through repetitive iterations such as in the heuristic approach, the placement of physical self-healing rings and optimal traffic routing may thereafter be determined by retrieving the logical SHR and preliminary routing information from memory and maximizing the percentage of demand covered and minimizing the total inter-ring traffic cost. This is accomplished through modeling the same in accordance with yet another mixed integer program and generating a corresponding electrical signal for receipt by said computer memory.

Demand and Supply Planning 910

Figure 15:
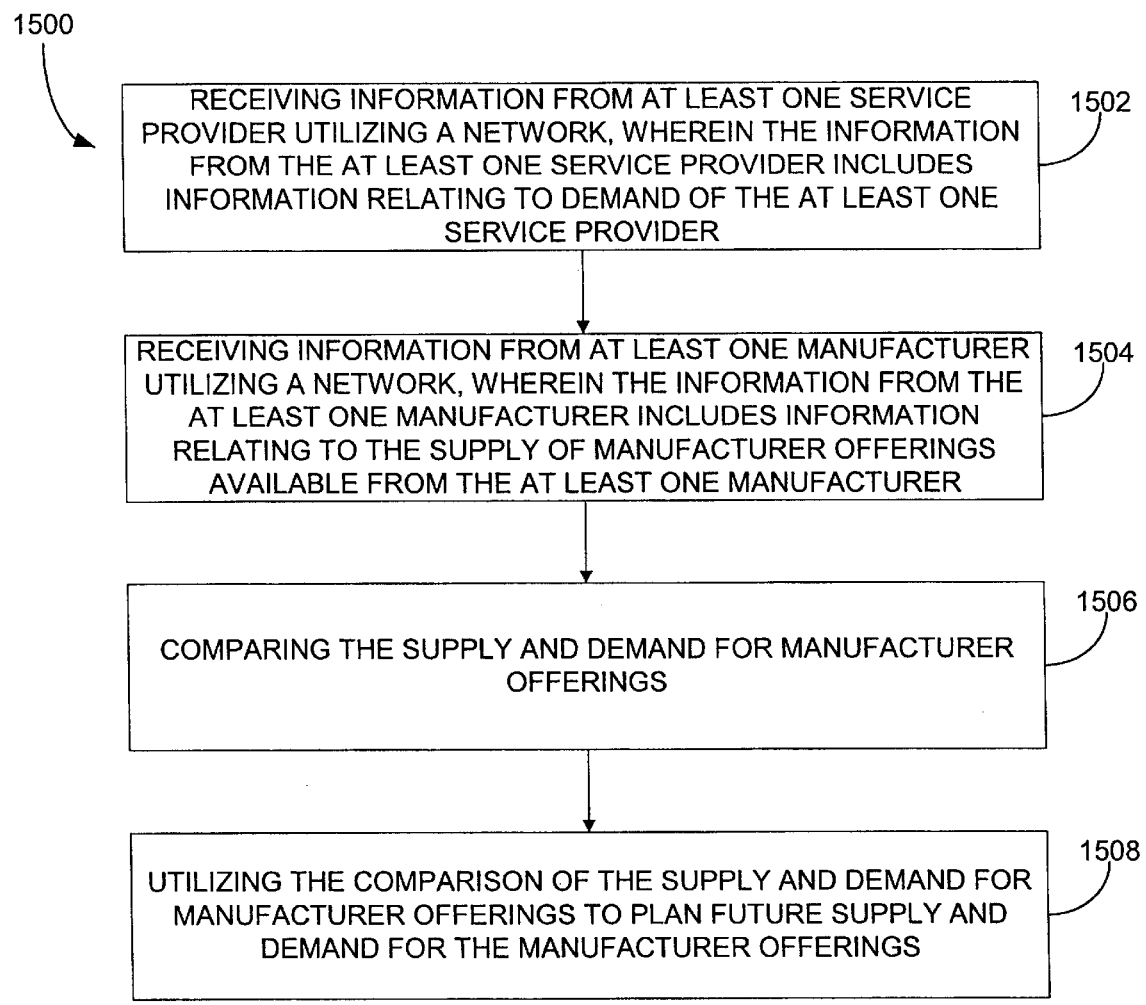
FIG. 15 is a flowchart depicting a process for demand and supply planning utilizing a network.

In accordance with an embodiment of the present invention, FIG. 15 illustrates a flowchart for a process 1500 for demand and supply planning utilizing a network where information from one or more service providers relating to demand of the service providers is received utilizing the network in operation 1502. Received in operation 1504 utilizing the network is information from one or more manufacturers relating to the available supply of manufacturer offerings. The supply and demand for manufacturer offerings are compared to one another in operation 1506 and this comparison is used in operation 1508 to plan future supply and demand for the manufacturer offerings.

In an embodiment of the present invention, collaborative forecasting may also be facilitated between service providers and manufacturers utilizing the network. In another embodiment of the present invention, collaborative network roll-out and planning utilizing the network may be facilitated between service providers and manufacturers. As an option, a roll-out planning tool may be provided for facilitating collaborative network roll-out and planning between the service providers and the manufacturers utilizing the network. In a further embodiment of the present invention, the supply of manufacturer offerings between manufacturers and service providers may be coordinated utilizing the network. In such an embodiment, a supply chain planning tool may be provided for coordinating the supply of manufacturer offerings between the manufacturers and the service providers utilizing the network.

In even another embodiment of the present invention, collaborative capacity planning may also be facilitated between service providers and manufacturers utilizing the network. In one aspect of this embodiment, a production planning tool may be provided for facilitating the collaborative capacity planning. In yet a further embodiment of the present invention, reverse inventory management may be conducted between the at least one service provider and the at least one manufacturer utilizing the network. Also, the sharing of technology between service providers and manufacturers may be facilitated utilizing the network.

One exemplary embodiment of the present invention is adapted primarily for monitoring and controlling customer power demand in a utility such as electric, gas, and water. In particular, this embodiment of the present invention is designed for the collection and transmission of user demand requirements and the control of user demand for utility services.

Domestic residential demand for electric power is growing at approximately 2% annually. Although utility companies can maintain pace with this growth by constructing more peaking and power plants, this is not necessarily in the best interest of the utility companies and society at large. The factors of cost, fuel availability, and environmental concerns of both the utility company and the public in general have prompted a shift of emphasis from building additional generation capacity for satisfying the increasing demand to developing and employing a method and means of efficiency improvements, production facility optimization, and electrical conservation through demand side management. Implicit in this is the fact that not all electric power costs the same to generate. Power generated during peak times is more expensive than "base-line" power. For demand side management, utility companies will charge on a cost basis rather than an average use basis that has existed in the past.

Heretofore, systems have been proposed for communicating utility usage at a customer's home to a central office. For example, U.S. Pat. No. 4,086,434 discloses a remote condition reporting system including a microprocessor with memory and a firmware program, telephone dialing equipment, a clock, and a plurality of inputs from meter readings and the outputs of sensors. The system initiates telephone calls to the utility company central offices at predetermined intervals to report utility usage including time of day power usage metering.

This embodiment of the present invention includes a monitoring and control system in which communication occurs through a fully distributed digital telecommunications switch without a centralized routing and handling facility. The distribution network is deployable to large numbers of residential and commercial customers for bi-directional real-time communication. While initially designed for use with an electric power utility, the invention is applicable in monitoring and controlling demand for other utilities such as gas or water, as well as for data services.

A controlled load management and feedback system includes a power company central computer facility, a plurality of home monitoring and control networks, and one or more wide band distribution networks interconnecting home monitoring and control networks and the central computer facility. The distribution networks connect to one or more central computer systems through substation gateways via high-speed digital lines.

The home monitoring and control network is located and operated within the power utility customer's home and includes electrical control, monitoring, and measurement devices which allow the utility to monitor electrical consumption in real time, assist the customer in optimizing electrical power consumption, and communicate real-time consumption and changes in consumption to the power utility via the distribution network. Further, the home network permits automatic meter reading and remote service disconnect and reconnect.

The distribution network includes a wire-based (hybrid fiber/coaxial cable) distribution system and an intelligent utility unit (IUU), which interfaces with the home network. The IUU controls, communicates, and configures devices within the home network, and communicates information from the home network back to the utility central computer via the distribution system. The distribution network is configured in cells or small hubs which support 250–2,000 users at a time.

The utility central computer includes a T-based communication digital backbone network which communicates with a distribution network through gateways typically located within a power substation. The backbone network consolidates traffic from different substations and routes the traffic to the utility host computer, thus providing access to every user on the system. The host computer is able to forecast trends and predict when demand will exceed supply, thus allowing corrective action to be taken. The computer can also generate reports for utility management and consumers showing usage and savings through demand management.

Order Management 912

Figure 16:
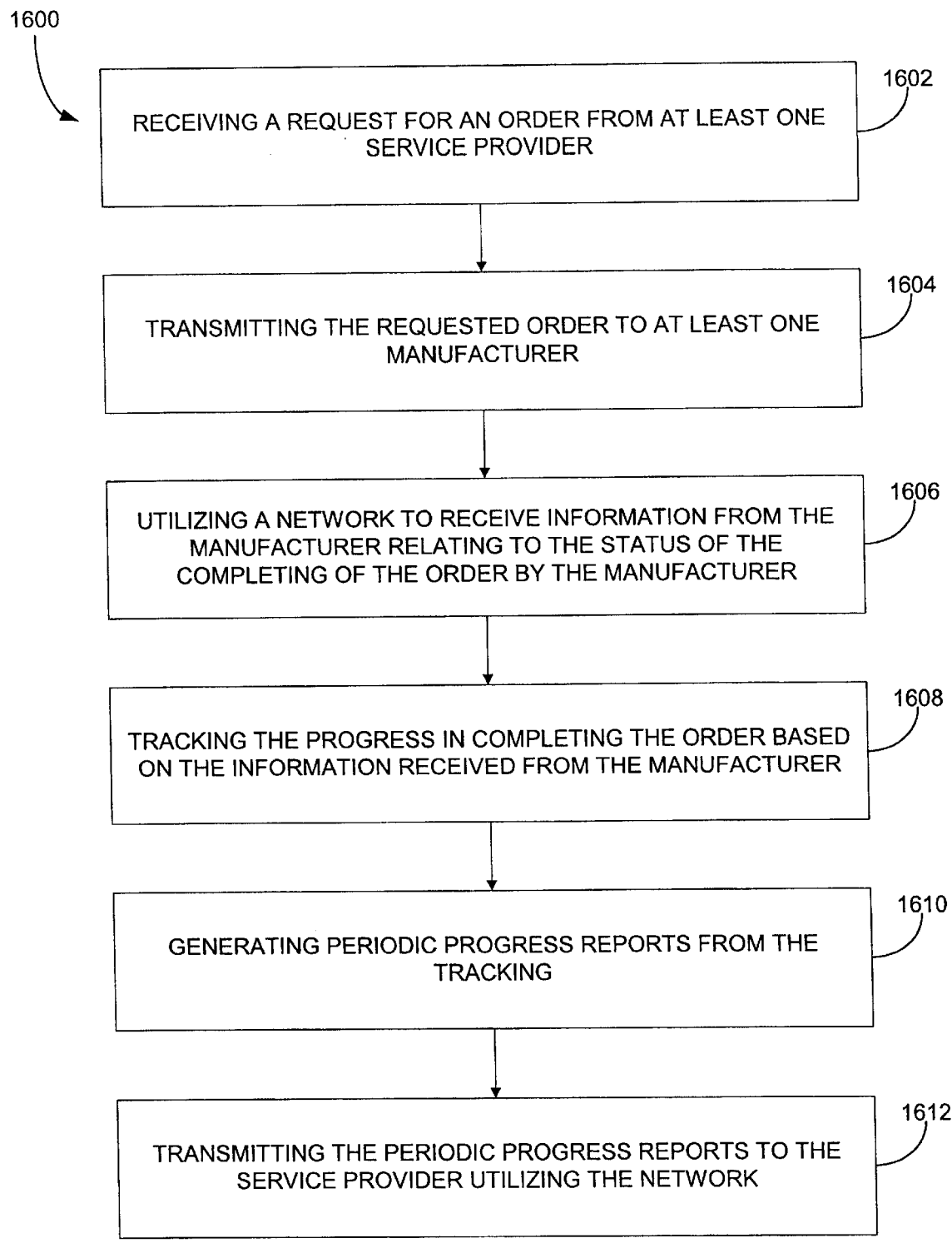
FIG. 16 illustrates a flowchart for a methodology for managing orders in a network-based supply chain in accordance with an embodiment of the present invention.

FIG. 16 illustrates a flowchart for a methodology 1600 for managing orders in a network-based supply chain in accordance with an embodiment of the present invention. When a request for an order is received from a service provider in operation 1602, the request is subsequently transmitted to one or more manufacturers in operation 1604. A network is utilized in operation 1606 to receive information from the manufacturer relating to the status of the completing of the order by the manufacturer. The manufacture's progress in completing the order is tracked in operation 1608 based on the information received from the manufacturer. Periodic progress reports are generated from the tracking and then transmitted to the service provider utilizing the network in operations 1610 and 1612.

In an aspect of the present invention, the order request may be received from the service provider utilizing the network. Similarly, in another aspect of the present invention, the requested order may be transmitted to the at least one manufacture utilizing the network. As an option, an order tracking tool may be provided from tracking the completion of the order.

In one embodiment of the present invention, the network may also be utilized to receive information from suppliers of the manufacturer relating to the status of delivering supplies to the manufacturer as well as to track the progress in supplying the manufacturer based on the information received from the at least one supplier.

In such an embodiment, the periodic progress reports may also include information relating to the tracking of the at least one supplier. In yet a further aspect of the present invention, a network operations link may be provided for linking to the at least one service provider and the at least one manufacturer.

An illustrative embodiment of the present invention unitarily and automatically manages ordering processes based on order information supplied by a particular department or section. In order to achieve this, there is provided an order management system for automatically placing an order with one of a plurality of suppliers when order information is input by one of a plurality of orderers.

Accordingly, this embodiment of the present invention includes a terminal unit provided to each of the orderers. The terminal unit includes means for inputting the order information, which is then transmitted to a communication network. A central management unit receives the order information from the terminal unit through the communication network. The central management unit includes collection processing means for managing order history information and section information with respect to each orderer. The collection processing means calculates a total cost of previous orders based on the order history information of one of the orderers sending the order information and order information sent from the one of the orderers. The central management unit also includes order permission means for permitting an execution of an ordering process when the calculated total of the previously ordered costs is within a budget of the orderer. The budget may be included in the section information.

Since an ordering process is executed only when the total cost of the previous orders for each of the orderers which may correspond to each department or section in a company, each department or section placing an order can be prevented from exceeding their budget.

The central management unit may further include a supplier selecting process for calculating a total cost of previously received order for each of the suppliers based on the order history information and the order information, and for selecting one of the suppliers whose total cost of previously received orders is within an order limit. Thus, exceeding the order limit previously set to each of the suppliers is prevented.

Additionally, the supplier selecting process may select one of the suppliers based on the order history information so that each of the suppliers equally receives orders. Optionally, the supplier selecting process manages supplier information including an order prohibition flag which represents a prohibition of placing an order with a supplier indicated by the order prohibition flag. As another option, the supplier selecting process selects one of the suppliers offering the lowest price when an item to be ordered is supplied by a plurality of suppliers.

The order management system according to the present invention may further comprise an ordering process for placing an order through the communication network with the suppliers based on the order information.

According to one embodiment of the present invention, an order management process automatically places an order with one of a plurality of suppliers when order information is input by one of a plurality of orderers. The order management process is performed in an order management system which has a plurality of terminal units provided to the respective orderers and a central management unit connected to each of the terminal units. During the management process, order information from one of the terminal units us sent to the central management unit. A total cost of previous orders is calculated based on order history information of one of the orderers sending the order information and order information sent from the one of orderers by managing the order history information and section information with respect to each of the orderers. An execution of an ordering process is permitted when the calculated total cost of previous orders is within a budget of the orderer. The budget may be included in the section information.

According to this embodiment of the invention, since an ordering process is executed only when the total cost of the previous orders for each of the orderers which may correspond to each department or section in a company, each department or section placing an order is prevented from exceeding their budget.

Optionally, the order management process may include calculating a total cost of previously received orders for each of the suppliers based on the order history information and the order information as well as selecting one of the suppliers whose calculated total cost of previously received orders is within an order limit. Thus, exceeding the order limit previously set to each of the suppliers can be prevented.

Additionally, the order management process may further include selecting the one of the suppliers based on the order history information so that each of the suppliers equally receives orders. As an option, an order to be placed with a supplier may be prohibited by indication by an order prohibition flag included in supplier information. As another option, one of the suppliers offering the lowest price may be selected when an item to be ordered is supplied by a plurality of suppliers. As yet another option, the order management process may further include automatically placing an order with the suppliers based on the order information through a communication network connecting the central management unit to each of the suppliers. It should be noted that the order management process may be performed by a combination of a general purpose computer and a processor readable medium such as a memory provided in the computer or a CD-ROM, disk, tape, etc. which stores program information used by the computer.

Network Asset Management 914

Figure 17:
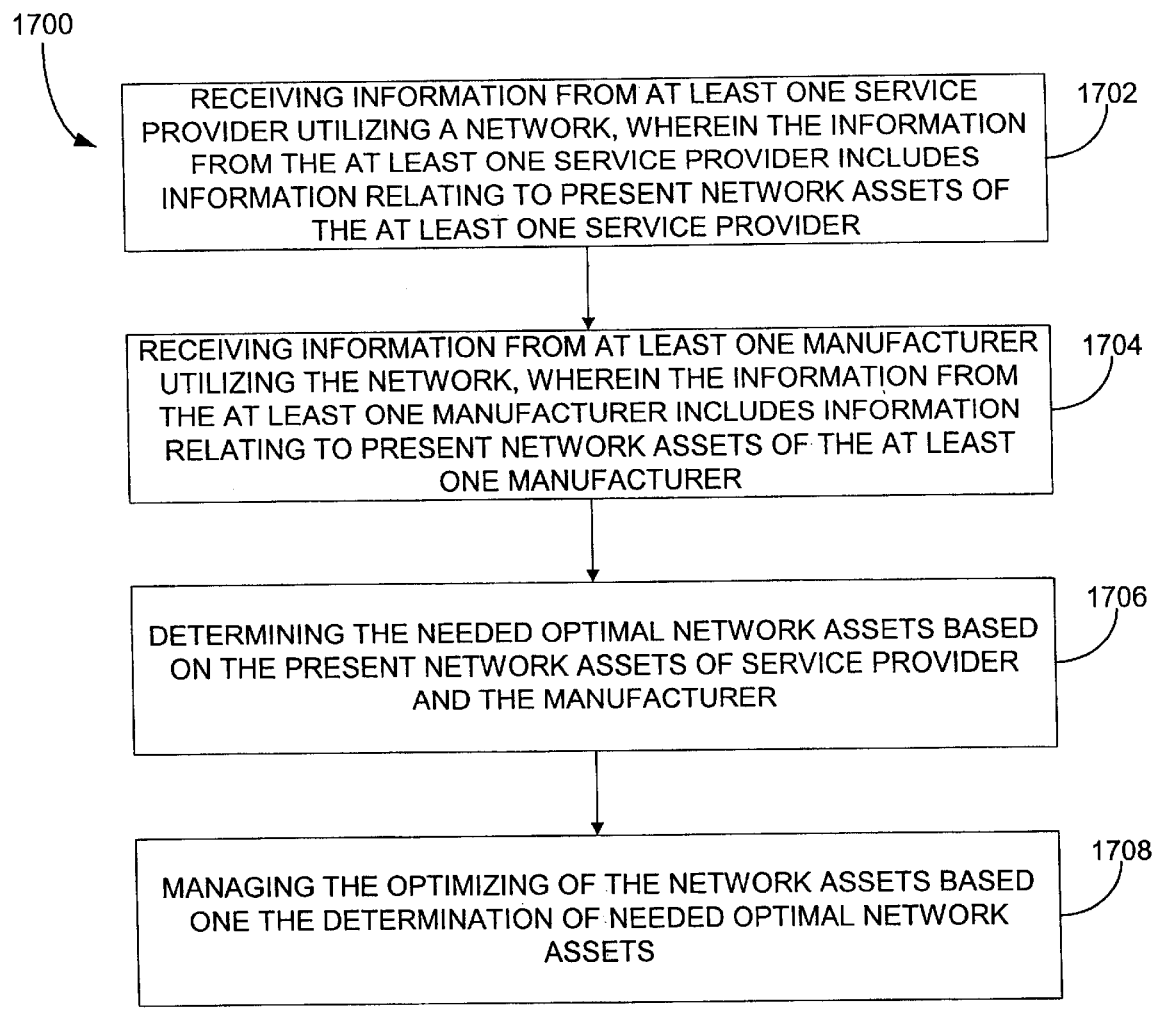
FIG. 17 illustrates a flowchart for a process for managing assets in a network-based supply chain in accordance with an embodiment of the present invention.

FIG. 17 illustrates a flowchart for a process 1700 for managing assets in a network-based supply chain in accordance with an embodiment of the present invention. Utilizing a network, information is received information from at least one service provider in operation 1702. This information includes information relating to present network assets of the service provider. Information is also received utilizing the network from at least one manufacturer in operation 1704. The information from the manufacturers includes information relating to present network assets of the manufacturers. In operation 1706, a determination is made for optimal network assets needed for the service provider and manufacturer based on the present network assets of service provider and the manufacturer. Based on this determination, the optimizing of the network assets is managed in operation 1708.

In an embodiment of the present invention, the life cycle of network assets of the service providers and the manufacturers may also be managed utilizing the network. In an aspect of this embodiment, a life cycle management model may be utilized for managing the life cycle of the network assets. In an additional embodiment of the present invention, the sharing of technology between the service providers and the manufacturers may be facilitated utilizing the network utilizing the network.

In another embodiment of the present invention, network assets of the service providers and the manufacturers may be tracked utilizing the network. The network assets may be tracked according to: growth of the network asset, capacity of the network asset, technological level of the network asset, and/or amount of the network asset. In one aspect of this embodiment of the present invention, an asset tracking tool may be utilized for tracking the network assets.

In yet a further embodiment of the present invention, the roll-out of services provided by the service providers and manufacturer offerings provided by the manufacturers may be managed utilizing the network based on the received present network asset information. In such an embodiment, a roll-out planning tool may be utilized for managing the roll-out of services provided by the service providers and manufacturer offerings provided by the manufacturers.

Maintenance and Service 916

Figure 18:
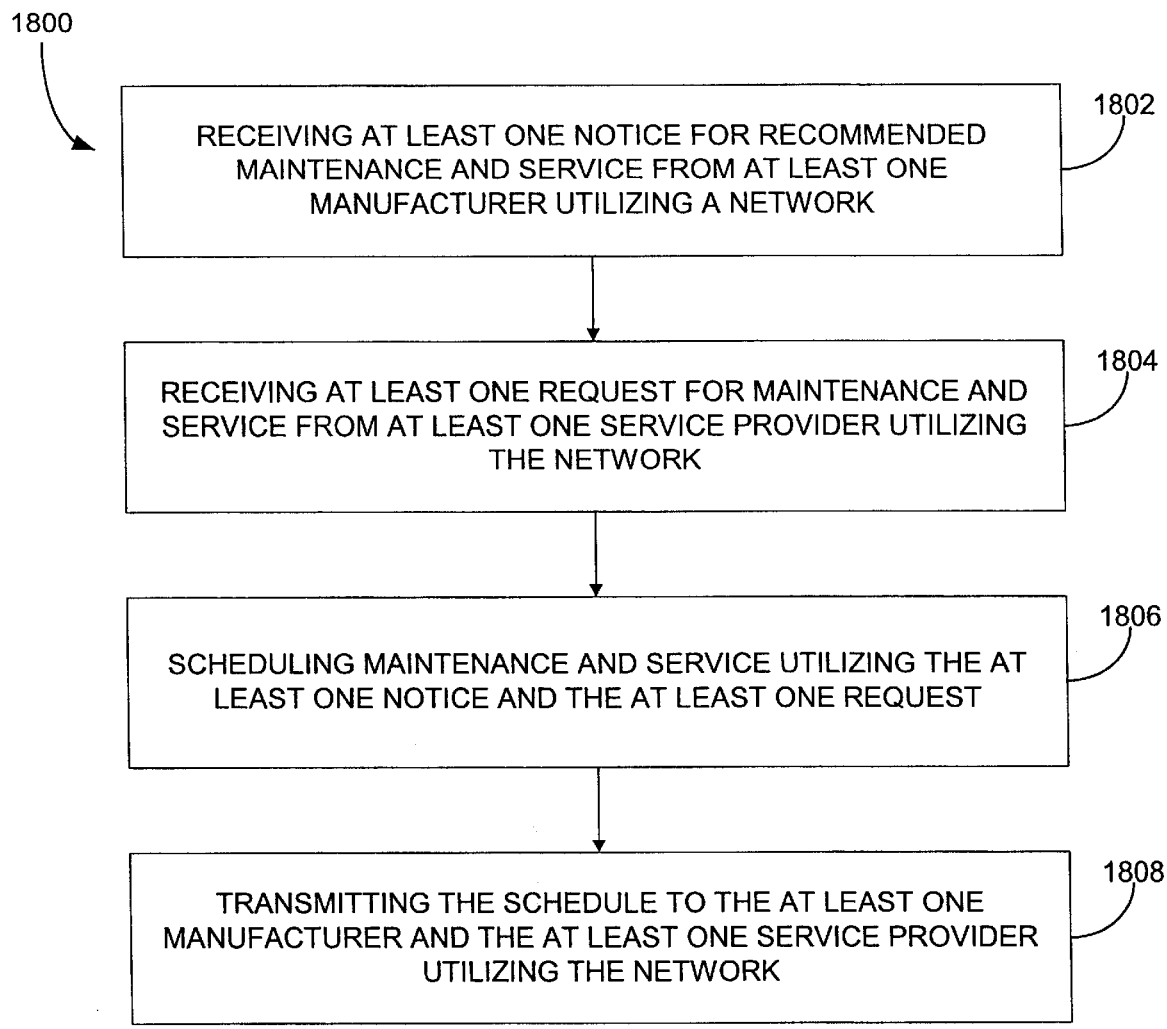
FIG. 18 illustrates a flowchart for a methodology for providing maintenance and service in a network-based supply chain in accordance with an embodiment of the present invention

FIG. 18 illustrates a flowchart for a methodology 1800 for providing maintenance and service in a network-based supply chain in accordance with an embodiment of the present invention. In operation 1802, one or more notices recommended maintenance and service are received utilizing a network from at one or more manufacturers. In operation 1804, one or more requests for maintenance and service are received utilizing the network from one or more service providers. Maintenance and service is scheduled in operation 1806 utilizing the notices and the requests. The schedule is transmitted to the manufacturers and the service providers utilizing the network in operation 1808.

In an embodiment of the present invention, the availability of the manufacturers to perform maintenance and service may be monitored utilizing the network. In this embodiment, the manufacturers are scheduled to perform maintenance and service based on their availability. In another embodiment of the present invention, the progress of the manufacturers in completing scheduled maintenance and service may be monitored utilizing the network. The schedule may then be adjusted according to the progress of the manufacturers. The adjusted schedule is then transmitted utilizing the network to the manufacturers and the service providers.

In an aspect of the present invention, a scheduling and planning tool may be provided for scheduling maintenance and service. In another aspect of the present invention, a network tracking interface may-be provided for monitoring the progress of the manufacturers in completing scheduled maintenance and service. In a further aspect of the present invention, the network may comprise a wide-area network.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for generating a data request graphical user interface for network utilized project assessment of a supply chain value system comprising the steps of
    (a) providing a user accessible database storing one or more than one cross-industry key performance indicator;
    (b) receiving selection data designating one or more than one selected key performance indicator from the database;
    (c) displaying a request form based upon the received selection data wherein the request form comprises a plurality of raw data fields for collecting information required to calculate project key performance indicators for the project assessment;
    (d) receiving raw data in the raw data fields in response to displaying the request form;
    (e) storing the received raw data in a database; and
    (f) using the stored data in an assessment of a project.

2. A method as recited in claim 1, further comprising the step of providing access to detailed descriptions of each of the key performance indicators.

3. A method as recited in claim 1, further comprising the step of calculating project key performance indicators based upon the received raw data.

4. A method as recited in claim 1, wherein the request form is capable of being temporarily stored with the stored data for allowing a user to enter remaining data at a later date.

5. A method as recited in claim 1, wherein the request form may only be edited by an authorized user.

6. A method as recited in claim 1, wherein an identification of a user is verified prior to the storage of the data in the database.

7. A computer program embodied on a computer readable medium for generating a data request graphical user interface during project assessment comprising:
    (a) an access module for providing a user accessible database storing one or more than one cross-industry key performance indicator;
    (b) an indicator module for receiving selection data designating one or more than one selected key performance indicator from the database;
    (c) a display module for displaying a request form based upon the received selection data wherein the request form comprises a plurality of raw data fields for collecting information required to calculate project key performance indicators for the project assessment;
    (d) a raw data module for receiving raw data in the raw data fields in response to displaying the request form;
    (e) a storage module for storing the received raw data in a database; and
    (f) an assessment module for using the stored data in an assessment of a project.

8. A computer program as recited in claim 1, further comprising a description module for providing access to detailed descriptions of each of the key performance indicators.

9. A computer program as recited in claim 1, further comprising a calculation module for calculating project key performance indicators based upon the received raw data.

10. A computer program as recited in claim 1, wherein the request form is capable of being temporarily stored with the stored data for allowing a user to enter remaining data at a later date.

11. A computer program as recited in claim 1, wherein the request form may only be edited by an authorized user.

12. A computer program as recited in claim 1, wherein an identification of the user is verified prior to the storage of the data in the database.

13. A system for generating a data request graphical user interface during project assessment comprising:
    (a) means for providing a user accessible database storing one or more than one cross-industry key performance indicator;
    (b) means for receiving selection data designating one or more than one selected key performance indicator from the database;
    (c) means for displaying a request form based upon the received selection data wherein the request form comprises a plurality of raw data fields for collecting information required to calculate project key performance indicators for the project assessment;

(d) means for receiving raw data in the raw data fields in response to displaying the request form;

(e) means for storing the received raw data in a database; and (f) means for using the stored data in an assessment of a project.

14. A system as recited in claim 1, further comprising means for providing access to detailed descriptions of each of the key performance indicators.

15. A system as recited in claim 1, further comprising means for calculating project key performance indicators based upon the received raw data.

16. A system as recited in claim 1, wherein the request form is capable of being temporarily stored with the stored data for allowing a user to enter remaining data at a later date.

17. A system as recited in claim 1, wherein the request form may only be edited by an authorized user.

18. A system as recited in claim 1, wherein an identification of the user is verified prior to the storage of the data in the database.

* * * * *